(12) United States Patent
Zhang et al.

(10) Patent No.: US 9,715,524 B1
(45) Date of Patent: Jul. 25, 2017

(54) NATURAL LANGUAGE COMPREHENSION SYSTEM

(71) Applicant: VIA Technologies, Inc., New Taipei (TW)

(72) Inventors: Guo-Feng Zhang, Shanghai (CN); Yi-Fei Zhu, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 15/462,926

(22) Filed: Mar. 20, 2017

Related U.S. Application Data

(62) Division of application No. 14/144,557, filed on Dec. 31, 2013, now Pat. No. 9,646,000.

(30) Foreign Application Priority Data

| Dec. 31, 2012 | (CN) | .......................... 2012 1 0593064 |
| May 17, 2013 | (CN) | .......................... 2013 1 0184544 |
| Dec. 13, 2013 | (CN) | .......................... 2013 1 0690513 |

(51) Int. Cl.
G06F 17/30 (2006.01)
G06F 17/27 (2006.01)

(52) U.S. Cl.
CPC ...... *G06F 17/30401* (2013.01); *G06F 17/271* (2013.01); *G06F 17/2785* (2013.01); *G06F 17/30312* (2013.01); *G06F 17/30864* (2013.01)

(58) Field of Classification Search
CPC .............................................. G06F 17/30401
USPC ....................................................... 707/706
See application file for complete search history.

(56) References Cited

U.S. PATENT DOCUMENTS

| 8,634,947 B1 * | 1/2014 | Kleinpeter ........ G06F 17/30752 700/94 |
| 2004/0117189 A1 * | 6/2004 | Bennett ................... G06F 17/27 704/270.1 |
| 2006/0020643 A1 * | 1/2006 | Locke ............... G06F 17/30575 |
| 2008/0155426 A1 * | 6/2008 | Robertson ......... G06F 17/30864 715/738 |
| 2008/0294674 A1 * | 11/2008 | Reztlaff, II ....... G06F 17/30613 |
| 2011/0320440 A1 * | 12/2011 | McDonald .......... G06F 17/3089 707/723 |
| 2012/0078936 A1 * | 3/2012 | Kuo .................. G06F 17/30867 707/766 |
| 2012/0117057 A1 * | 5/2012 | Adimatyam ....... H04N 21/4147 707/723 |

(Continued)

*Primary Examiner* — Mahesh Dwivedi
(74) *Attorney, Agent, or Firm* — Jianq Chyun IP Office

(57) ABSTRACT

A search method, a search system, and a natural language comprehension system are provided. The search system includes a structured database and a search engine. The structured database stores a plurality of records, each of which has a title field and a content field. The title field includes at least one sub-field, and each sub-field includes an indication field and a value field. The indication field stores indication data, the value field stores value data, and the content field stores detailed content data. The search engine conducts a full-text search to the records in the structured database according to a keyword derived from a user's request formation, and a search result is transmitted to a knowledge comprehension assistance module, so as to recognize the user's intention. After the user's intention is recognized, information associated with the recognized user's intention is transmitted back to the user.

7 Claims, 18 Drawing Sheets

(56) References Cited

U.S. PATENT DOCUMENTS

2012/0296913 A1* 11/2012 Ash .................. G06F 17/30619
707/741
2016/0217181 A1* 7/2016 Kadouch ........... G06F 17/30643

* cited by examiner

| Request information | Possible intention syntax data | Intention data | Keyword |
|---|---|---|---|
| what is the weather going to be tomorrow in Shanghai | <queryweather>,<city>=Shanghai,<Time>=Tomorrow | <queryweather> | Shanghai, Tomorrow |
| I want to see Let the Bullets Fly | <readbook>,<bookname>=Let the Bullets Fly | <readbook> | Let the Bullets Fly |
|  | <watchfilm>,<filmname>=Let the Bullets Fly | <watchfilm> | Let the Bullets Fly |
| I want to listen to Days When We Were Together | <playmusic>,<singer>=When We Were Together, <Songname>=Days | <playmusic> | When We Were Together, Days |
|  | <playmusic>,< songname>=Days When We Were Together | <playmusic> | Days When We Were Together |

FIG. 2

| Record | Title field | Content field |
|---|---|---|
| | 310 / 312 | |
| 1 | singerguid: Andy Lau\| songnameguid: Days When We Were Together\| songtypeguid: HK and Taiwan, Cantonese, pop | Contents of Lyrics |
| 2 | directorguid: Xiaogang Feng \| actorguid: Ge You, Shu Qi \| filecomanyguid: Huayi Brothers Media \| filmtitleguid: If You Are the One | Synopsis |
| 3 | peoplenameguid: Harry Potter\| peoplebirthdayguid: 1980,7,31\| peoplecontributionguid: Fight against and Kill Voldemort \| peopletypeid: Enchanter, Wizard, Virtual | Biography |
| 4 | peoplenameguid: Hua Sheng\| peoplebirthday: xxxx,xx,xx \| peoplecontribuitionguid: Invented Movable-type Printing \| peopletypeguid: scientist, ancient times | Biography |
| 5 | directorguid: Jiang Wen \| actorguid: Jiang Wen \| filmnameguid: Let the Bullets Fly | Synopsis |
| 6 | singerguid: Jam Hsiao, Aska Yang, Gary Chaw \| songnameguid : Betrayal | Lyrics of Betrayal |
| 7 | singerguid : Jam Hsiao \| songnameguid : Betrayal | Lyrics of Betrayal |

FIG. 3A

| Record | Title field | | | Content field | Source field | Popularity field | Preference field | Dislike field |
|---|---|---|---|---|---|---|---|---|
| 1 | singerguid: Andy Lau\| songnameguid: Days When We Were Together\| songtypeguid: HK and Taiwan, Cantonese, pop | | | Contents of Lyrics | | | | |
| 2 | directorguid: Xiaogang Feng \| actorguid: Ge You, Shu Qi \| filecomanyguid: Huayi Brothers Media \| filmtitleguid: If You Are the One | | | Synopsis | | | | |
| 3 | peoplenameguid: Harry Potter\| peoplebirthdayguid: 1980,7,31\| peoplecontributionguid: Fight against and Kill Voldemort \| peopletypeid: Enchanter, Wizard, Virtual | | | Biography | | | | |
| 4 | peoplenameguid: Hua Sheng\| peoplebirthday: xxxx,xx,xx \| peoplecontribuitionguid: Invented Movable-type Printing \| peopletypeguid: scientist, ancient times | | | Biography | | | | |
| 5 | directorguid: Jiang Wen \| actorguid: Jiang Wen \| filmnameguid: Let the Bullets Fly | | | Synopsis | | | | |
| 6 | singerguid : Jam Hsiao, Aska Yang, Gary Chaw \| songnameguid : Betrayal | | | Lyrics of Betrayal | | | | |
| 7 | singerguid : Jam Hsiao \| songnameguid : Betrayal | | | Lyrics of Betrayal | | | | |
| 8 | Booknameguid : Romance of the Three Kingdoms \| | | | Introduction of Romance of the Three Kingdoms | AAA | 2 | 20 | 1 |
| 9 | TVnameguid : Romance of the Three Kingdoms \| | | | Introduction of Romance of the Three Kingdoms | BBB | 5 | 8 | 20 |
| 10 | filmnameguid : Romance of the Three Kingdoms \| | | | Introduction of Romance of the Three Kingdoms | CCC | 8 | ... | ... |
| 11 | singerguid: Andy Lau\| songnameguid: Forget-Love Potion\| songtypeguid: Mandarin, pop | | | Contents of Lyrics | ... | ... | ... | ... |
| 12 | singerguid: E-jun Lee\| songnameguid: Forget-Love Potion\| songtypeguid: Mandarin, pop | | | Contents of Lyrics | ... | ... | ... | ... |
| 13 | ⋮ | | | ⋮ | ⋮ | ⋮ | ⋮ | ⋮ |

FIG. 3B

| Record | Sub-field 1 | Sub-field 2 | Sub-field 3 | Sub-field 4 | ... |
|---|---|---|---|---|---|
| 1 | singerguid | songnameguid | songtypeguid | N/A | |
| 2 | director | actorguid | filmnameguid | filmnameguid | N/A |
| ... | ... | ... | ... | ... | ... |
| 6 | singerguid | songnameguid | N/A | | |
| ... | ... | ... | ... | ... | ... |

FIG. 3C

| Keyword | Preference field (individual) | Dislike field (individual) | 872 ... | Preference field (public) | Dislike field (public) | 874 ... |
|---|---|---|---|---|---|---|
| ... | ... | ... | ... | ... | ... | ... |
| Romance of the Three Kingdoms, book — 832 | 20 | 1 | ... | 5 | 3 | ... |
| Romance of the Three Kingdoms, TV drama — 834 | 8 | 20 | ... | 80 | 20 | ... |
| Romance of the Three Kingdoms, music — 836 | 1 | 8 | ... | 2 | 10 | ... |
| Romance of the Three Kingdoms, film | 0 | 0... | ... | 40 | 30 | ... |
| ... | ... | ... | ... | ... | ... | ... |
| Andy Lau, Forget-Love Potion — 838 | 3 | 0 | ... | 50 | 2 | ... |
| E-jun Lee, Forget-Love Potion | 1 | 0 | ... | 3 | 1 | ... |
| ... | ... | ... | ... | ... | ... | ... |

FIG. 8B

NATURAL LANGUAGE COMPREHENSION SYSTEM

CROSS-REFERENCE TO RELATED APPLICATION

This application is a divisional application of and claims the priority benefit of U.S. application Ser. No. 14/144,557, filed on Dec. 31, 2013, now allowed. The prior U.S. application Ser. No. 14/144,557 claims the priority benefits of China application serial no. 201210593064.8, filed on Dec. 31, 2012, China application serial no. 201310184544.3, filed on May 17, 2013, and China application serial no. 201310690513.5, filed on Dec. 13, 2013. The entirety of each of the above-mentioned patent applications is hereby incorporated by reference herein and made a part of specification.

BACKGROUND OF THE INVENTION

Field of the Invention

The invention relates to a search technique. More particularly, the invention relates to a search method, a search system and a natural language comprehension system.

Description of Related Art

In the field of natural language recognitions, computers usually use certain syntax to capture and recognize user's intentions or information within his/her inputs. Accordingly, computers are able to determine user's intentions if there are sufficient data relating to sentences input by users stored in databases of the computers.

Conventionally, a built-in phrase list including specific idioms indicating certain intentions or information is often applied to compare with user sentences, and every user is asked to express his/her intentions with the uses of the well-defined specific idioms within the phrase list, such that his/her intentions may be correctly recognized by computers. However, it is rather unreasonable and/or unpractical if the user is forced to remember every idiom included in the phrase list. For instance, if a user intends to learn the weather conditions, he/she may be asked to input "what is the weather tomorrow (or the day after tomorrow) in Shanghai (or Beijing)"? In case the user uses another colloquial expression instead, e.g., "how is Shanghai tomorrow?" this expression may be interpreted as "there is a place called 'tomorrow' in Shanghai" because the word "weather" is not shown in his/her sentence. Thereby, the user's intention may be misunderstood by computers. In addition, user's sentences are usually complicated and diverse, and sometimes his/her inputs may be erroneous, which needs fuzzy matching processes for further identifications. Obviously, those phrase lists established under this conventionally rigid input-rule usually conduct disappointing analysis results.

From another perspective, one syntactic structure/sentence may refer to different intentions even if all possible principles of natural language analyses are applied to recognize users' intentions. For instance, if the user sentence is "I want to see the Romance of the Three Kingdoms", he/she may intend to watch the film of "Romance of the Three Kingdoms" or read the book of "Romance of the Three Kingdoms". Under such a scenario, the user has to make a further selection between these two matches. Sometimes, it will be redundant and inefficient for a user to make selection among meaningless matches. For instance, if a user's sentence is "I want to see One Million Star", it is unnecessary to recognize the user's intention as a book or a painting of "One Million Star" (because "One Million Star" is a very famous TV show among Chinese).

Moreover, in most cases, search results obtained from a full-text search are non-structured data, which usually contains separate and unrelated information therein. For instance, if a user inputs a keyword in a search engine (e.g., Google or Baidu) for searches, search results in webpages usually include separate and diverse information waiting for user's identifications. The only way for the user to find out useful information contained in the search results is to browse and/or look into those webpages one-by-one. It is really a time-cost approach for the user to browse those search results, and, sometimes, he/she may skip or miss his/her desired information inadvertently. The uses of the search results obtained conventionally are accordingly limited.

SUMMARY OF THE INVENTION

An embodiment of the invention provides a search method and a search system whereby a full-text search is conducted in a structured database, such that any search result obtained through the full-text search is a meaningful and structured data.

An embodiment of the invention provides a natural language comprehension system that recognizes a user's intention included in his/her request information through a full-text search in a structured database.

In an embodiment of the invention, a search system that includes a structured database and a search engine is provided. The structured database stores a plurality of records. The search engine is configured to conduct a full-text search in the structured database. Value data stored in each record of the structured database are correlated, and the value data in each record may be used to collectively demonstrate a user's intention included in the request information. After the search engine conducts the full-text search in the structured database and after the value data in the record are matched with user's intention, indication data corresponding to the value data are output used for confirming user's intention included in the request information.

In an embodiment of the invention, a natural language comprehension system includes a natural language processor, a knowledge comprehension improving module, and a search system. The natural language processor is configured to parse a user's request information to obtain at least one possible intention syntax data, and each of the possible intention syntax data comprises at least one keyword and intention data. The knowledge comprehension improving module coupled to the natural language processor is configured to obtain confirmative intention syntax data from the possible intention syntax data so as to demonstrate user's intention included in the user's request information. The search system includes a structured database and a search engine, wherein the structured database stores a plurality of records and the search engine conducts a full-text search in the structured database. The knowledge comprehension assistance module transmits the at least one keyword to the search system and obtains the confirmative intention syntax data through a response from the search system.

A search method according to the invention is firstly to provide a structured database, wherein the structured database stores a plurality of records. A full-text search is then conducted in the structured database.

According to an embodiment of the invention, each record includes a title field, wherein the title field includes at least one sub-field, and each of the sub-fields includes an indication field and a value field. The indication field stores indication data and the value field stores value data.

According to an embodiment of the invention, each record further includes a content field, and each content field stores detailed content data thereof.

According to an embodiment of the invention, a first special character is used to separate two neighboring sub-fields if there are a lot of sub-fields stored in a title field of a record, and a second special character is used to separate the indication field and the value field within a sub-filed.

According to an embodiment of the invention, the digit number employed for each sub-field of the title field is fixed.

In an embodiment of the invention, a search system that includes a structured database and a search engine is provided. The structured database is configured to store at least one record, wherein each record includes at least one fields, and data stored in the fields collectively demonstrate a category of associated record. The search engine is configured to conduct a full-text search in the structured database according to a keyword included in request information. If at least one record stored in the structured database matches the keyword, associated indication data of the matched record are output for the purpose of confirming user's intention.

In an embodiment of the invention, a search method includes the steps of: inputting a keyword and conducting a full-text search in a structured database according to the keyword. The keyword is generated from a user's request information, and the structured database stores at least one record. Each of the records includes at least one field, and data stored in the fields collectively describe a category of associated record. When at least one record stored in the structured database matches the keyword, indication data corresponding to the keyword within the matched record are output for confirming user's intention included in the user's request information.

In view of the above, the keywords included in the user's request information are applied to conduct a full-text search to the records in the structured database, wherein the records have specific data structures, so as to recognize the user's intention corresponding to the user's request information.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 2 is a diagram illustrating a parsed result obtained by a natural language processor which parses various request information from a user according to an embodiment of the invention.

FIG. 3A is a schematic diagram illustrating a plurality of records stored into a structured database according to an embodiment of the invention, wherein the records have specific data structures.

FIG. 3B is a schematic diagram illustrating a plurality of records stored into a structured database according to another embodiment of the invention, wherein the records have specific data structures.

FIG. 3C is a schematic diagram illustrating indication data stored in an indication data storage system according to an embodiment of the invention.

FIG. 8B is a schematic diagram illustrating a plurality of records stored in a structured database used for outputting report answers according to user's preferences, wherein the records have specific data structures.

DETAILED DESCRIPTIONS OF EMBODIMENTS

The use of the conventional phrase list is subject to rigid input rules, and therefore is incapable of recognizing diverse user's input sentences, which usually introduces difficulties in searching and acquiring user's desired information raised from incorrect recognitions to user's intentions, or delivers unnecessary information to the user due to insufficient recognition capabilities. The conventional search engines may merely provide search results that contain separate data with little relevance, such that any user has to browse the search results one-by-one to capture his/her desired information therefrom, thus resulting in time waste and even missing information. In view of the above, a search method and associated search system that provides structured data are introduced herein. Specifically, different types of data are respectively stored into different specific fields. Thereby, when a user conducts searches based on his/her input information by using natural languages, the user's intentions may be promptly and correctly determined, and the desired information may then be provided to the user. Alternatively, more accurate information may be provided to the user for further selections if more determinations are needed.

Figure 1:
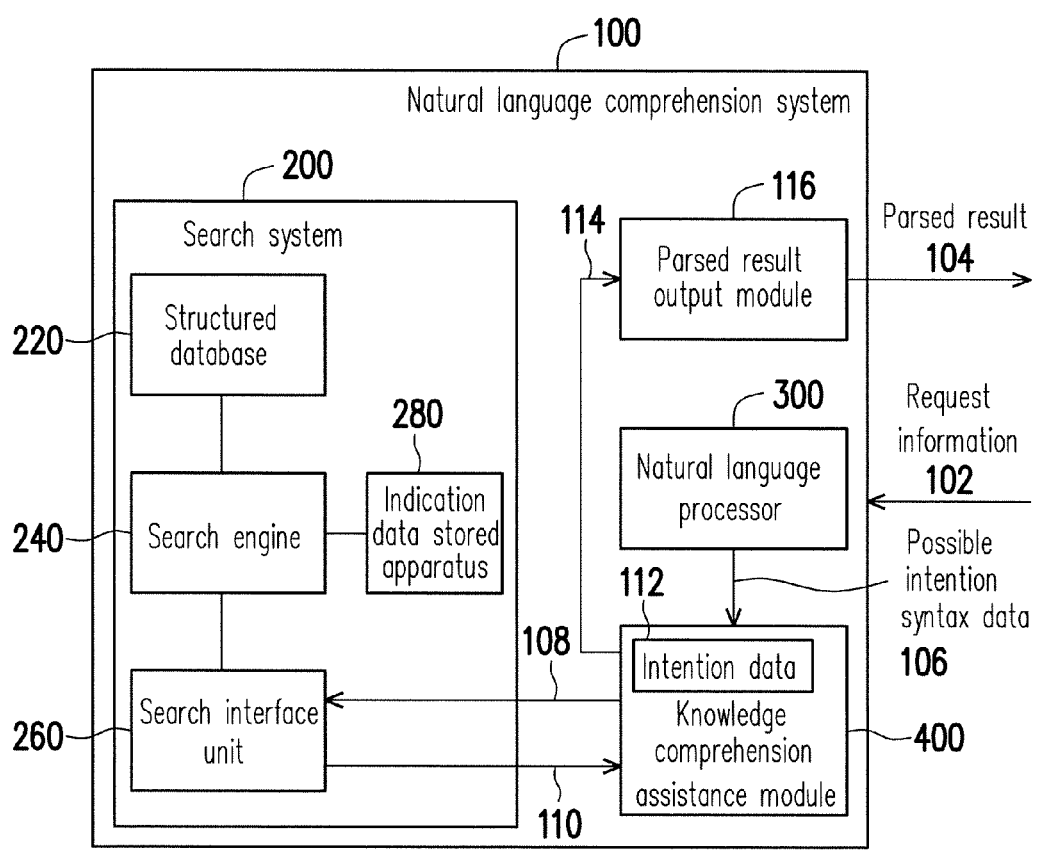
FIG. 1 is a block diagram illustrating a natural language comprehension system according to an embodiment of the invention.

FIG. 1 is a block diagram illustrating a natural language comprehension system according to an embodiment of the invention. With references to FIG. 1, the natural language comprehension system 100 includes a search system 200, a natural language processor 300, and a knowledge comprehension assistance module 400 coupled to the search system 200 and the natural language processor 300. The search system 200 includes a structured database 220, a search engine 240, and a search interface unit 260, wherein the search engine 240 is coupled to the structured database 220 and the search interface unit 260. In the present embodiment, the search system 200 is equipped with the search interface unit 260, which should not be construed as a limitation to the invention. That is, in another embodiment of the invention, there may be no search interface unit 260 in the search system 200, and the search engine 240 conducts a full-text search to the structured database 220 after receiving keyword 108 from API (Application Interface) calls.

When a user sends his/her request information 102 to the natural language comprehension system 100, the natural language processor 300 parses the request information 102 and sends a parsed possible intention syntax data 106 associated with the request information 102 to the knowledge comprehension assistance module 400. The possible intention syntax data 106 include a keyword 108 and an intention data 112. The knowledge comprehension assistance module 400 obtains and then sends the keyword 108 included in the possible intention syntax data 106 to the search system 200, while the intention data 112 are stored in the knowledge comprehension assistance module 400. After the search engine 240 in the search system 200 conducts a full-text search in the structured database 220 according to the keyword 108, a response result 110 of the full-text search is transmitted back to the knowledge comprehension assistance module 400. The knowledge comprehension assistance module 400 may compare the response result 110 with the intention data 112 stored in the knowledge comprehension assistance module 400 to obtain a confirmative intention syntax data 114, which are then directed to a parsed result output module 116 for further processing. According to the confirmative intention syntax data 114, the parsed result output module 116 delivers a parsed result 104 to a server (not shown). The server finally sends required data to the user if the required data are found by means of the parsed result 104 (detailed explanations will be given in the following paragraphs). Note that the parsed result 104 may include the keyword 108, parts of the information within a record (e.g., the serial number of each record 302), or all information of the record (e.g., a record shown in FIG. 3A/FIG. 3B) associated with the keyword 108, etc. Besides, the parsed result 104 may be directly converted into a speech output to the user by the server in one embodiment. Additionally, the parsed result 104 may be processed in a certain manner (which will be elaborated hereinafter), and a speech output corresponding to the processed parsed result 104 may be output to the user, finally. People skilled in the art are able to modify the way of outputting the information through the search system 200 based on various applications and/or demands, and the invention is not limited thereto.

The parsed result output module 116 may be combined with other modules as applications. For instance, in an embodiment of the invention, the parsed result output module 116 may be integrated into the knowledge comprehension assistance module 400. In another embodiment, the parsed result output module 116 may be separated from the natural language comprehension system 100 and is located in the server (that exemplarily contains the natural language comprehension system 100), and thus the server may directly receive and process the confirmative intention syntax data 114. In addition, the intention data 112 may be stored in a storage apparatus within the knowledge comprehension assistance module 400, in the natural language comprehension system 100, in the server (that exemplarily contains the natural language comprehension system 100), or in any storage apparatus that may be accessed by the knowledge comprehension assistance module 400. The invention is not limited thereto. Besides, the natural language comprehension system 100 that includes the search system 200, the natural language processor 300, and the knowledge comprehension assistance module 400 may be constituted by hardware, software, firmware, or a combination thereof, which should not be construed as limitations to the invention.

The natural language comprehension system 100 may be configured in a cloud server, a LAN server, a personal computer (PC), a mobile computer device (e.g., a notebook computer), or a mobile communication apparatus (e.g., a cell phone). The components of the natural language comprehension system 100 or those of the search system 200 may not be integrated into one machine. That is, the components of the natural language comprehension system 100 or those of the search system 200 may be located in different apparatuses or systems, and may communicate with each other according to different communication protocols. For instance, the natural language processor 300 and the knowledge comprehension assistance module 400 may be configured in an identical smart phone, while the search system 200 is configured in a cloud server. Alternatively, the search interface unit 260, the natural language processor 300, and the knowledge comprehension assistance module 400 may be arranged in an identical notebook computer, while the search engine 240 and the structured database 220 may be configured in a LAN server. Additionally, when the natural language comprehension system 100 is configured in a server (i.e., a cloud server or a LAN server), the search system 200, the natural language processor 300, and the knowledge comprehension assistance module 400 may be configured in different computer hosts, while information and data transmissions among the search system 200, the natural language processor 300, and the knowledge comprehension assistance module 400 may be coordinated by the main system of the server. Certainly, according to applications and/or actual demands, two or all of the search system 200, the natural language processor 300, and the knowledge comprehension assistance module 400 may be integrated in a computer host, which should not be construed as a limitation to the invention.

As described herein, the user is able to send his/her request information to the natural language processor 300 in various manners, e.g., by way of speech inputs or textual descriptions. For instance, if the natural language comprehension system 100 is located in a cloud server or in a LAN server (not shown), the user may input the request information 102 through a mobile device (e.g., a cell phone, a personal digital assistant (PDA), a tablet PC, or any other similar system). Through telecommunication links provided by telecommunication service providers, the request information 102 may be transmitted to the natural language comprehension system 100 in a server, and therefore the natural language processor 300 may parse the request information 102. After the server confirms the user's intention, the parsed result 104 corresponding to the user's intention generated by the parsed result output module 116 may be processed by the server, and finally the information requested by the user may be transmitted back to user's mobile device. For instance, the request information 102 from the user is a question (e.g., "what is the weather going to be tomorrow in Shanghai") requesting the natural language comprehension system 100 to provide an answer. After the natural language comprehension system 100 parses the request information 102 and realizes that the user intends to learn the weather in Shanghai tomorrow, in one embodiment, the natural language comprehension system 100 may output associated searched weather data as the output result 104 to the user through the parsed result output module 116. In addition, if the request information 102 from the user is "I want to watch Let the Bullets Fly (a Chinese movie)" or "I want to listen to Days When We Were Together (a Chinese song)", the natural language processor 300 may obtain a possible intention syntax data 106 including associated keyword 108 and intention data 112 after parsing the request information 102, and then a full-text search may be conducted in the structured database 220 by the search engine 240 to recognize and confirm user's intention.

Particularly, when the user's request information 102 is "what is the weather going to be tomorrow in Shanghai," the natural language processor 300, after parsing the request information 102, may obtain a possible intention syntax data 106:

"<queryweather>,<city>=Shanghai,<time>=tomorrow"

In an embodiment of the invention, if the natural language comprehension system 100 clearly recognizes the user's intention, the parsed result output module 116 of the natural language comprehension system 100 may directly output the parsed result 104 to the server, and the server may search associated weather data requested by the user and then transmit the searched weather data to the user. Additionally, if the user's request information 102 is "I want to see the Romance of the Three Kingdoms," the natural language processor 300 may obtain three possible intention syntax data 106 after parsing the request information 102:

"<readbook>,<bookname>=Romance of the Three Kingdoms";

"<watchTV>,<TVname>=Romance of the Three Kingdoms"; and

"<watchfilm>,<filmname>=Romance of the Three Kingdoms".

Since the keywords 108 (i.e., "Romance of the Three Kingdoms") in the possible intention syntax data 106 may refer to different categories, i.e., book (<readbook>), TV drama (<watchTV>), and film (<watchfilm>), which indicates a request information 102 may derive many possible intention syntax data 106 after parsing. The knowledge comprehension assistance module 400 needs more parsing procedures to identify user's request information 102. Moreover, if the user inputs "I want to see Let the Bullets Fly," two possible intention syntax data 106 (as provided below) may be derived because "Let the Bullets Fly" may refer to a film or a book:

"<readbook>,<bookname>=Let the Bullets Fly"; and
"<watchfilm>,<filmname>=Let the Bullets Fly".

The keyword 108 (i.e., "Let the Bullets Fly") in the possible intention syntax data 106 may also refer to two fields i.e., book (<readbook>), and film (<watchfilm>). The above-mentioned possible intention syntax data 106 may be further parsed by the knowledge comprehension assistance module 400 to obtain a confirmative intention syntax data 114 to clarify the user's intention. When the knowledge comprehension assistance module 400 parses the possible intention syntax data 106, the knowledge comprehension assistance module 400 may transmit the keyword 108 (e.g., "Romance of the Three Kingdoms" or "Let the Bullets Fly") to the search system 200 through the search interface unit 260. The structured database 220 in the search system 200 stores a plurality of records, wherein each record has a specific data structure. The search engine 240 may conduct a full-text search in the structured database 220 according to the keyword 108 received through the search interface unit 260 and then deliver a response result 110 back to the knowledge comprehension assistance module 400. The knowledge comprehension assistance module 400 may then obtain a confirmative intention syntax data 114 based on the response result 110. Details of conducting the full-text search in the structured database 220 to derive the confirmative intention syntax data 114 will be described below with reference to FIG. 3A and FIG. 3B.

The natural language comprehension system 100 described herein is capable of capturing the keywords 108 included in the request information delivered from users and of determining the categories associated with the keywords 108 by conducting associated full-text search in the structured database 220. For instance, if the user inputs "I want to watch the Romance of the Three Kingdoms," the possible intention syntax data 106 fallen into three different categories (book, TV drama, and film) may be correspondingly obtained. The natural language comprehension system 100 may further parse the possible intention syntax data 106 to recognize and ascertain the user's intention. Accordingly, the user may express his/her intention or deliver information colloquially and easily without using any specific term or expression, e.g., those words, phrases, or sentences, recorded in the conventional phrase list.

FIG. 2 is a schematic diagram illustrating a parsed result obtained by a natural language processor 300 which parses various request information from a user according to an embodiment of the invention.

As shown in FIG. 2, when the user's request information 102 is "what is the weather going to be tomorrow in Shanghai," the natural language processor 300 may obtain a possible intention syntax data 106 shown in the following after parsing the request information 102:

"<queryweather>,<city>=Shanghai,<time>=tomorrow"

Here, the intention data 112 are "<queryweather>", and the keywords 108 are "Shanghai" and "tomorrow." Since there is only one intention syntax data 106 (inquiring about the weather <queryweather>) obtained after the natural language processor 300 parses the request information 102 in an embodiment of the invention, the knowledge comprehension assistance module 400 may directly capture keywords 108 "Shanghai" and "tomorrow" therefrom and then send associated parsed result 104 associated with these two keywords to the server so as to search information regarding the weather (e.g., the parsed result 104 may be used for inquiring about the weather conditions in Shanghai tomorrow, such as weather, temperature, and so forth). Accordingly, the knowledge comprehension assistance module 400 may be unnecessary to conduct a full-text search in the structured database 220 to recognize the user's intention if the knowledge comprehension assistance module 400 considers the only one intention syntax data 106 parsed by the request information 102 is able to show what the user's intention is. Certainly, in an embodiment of the invention, the full-text search may still be conducted to the structured database 220 to further recognize and ascertain the user's intention, and people skilled in the art may modify the embodiments according to applications and/or actual demands.

If the user's request information 102 is "I want to see Let the Bullets Fly," two possible intention syntax data 106 may be derived from the user's request information 102:

"<readbook>,<bookname>=Let the Bullets Fly"; and
"<watchfilm>,<filmname>=Let the Bullets Fly".

According to these two corresponding intention data 112 "<readbook>" and "<watchfilm>" and the same keyword 108 "Let the Bullets Fly", the user's intention may be interpreted as "read the book of Let the Bullets Fly" or "watch the film of Let the Bullets Fly." To further recognize and ascertain the user's intention, the keywords 108 "Let the Bullets Fly" are transmitted to the search interface unit 260 through the knowledge comprehension assistance module 400, and the search engine 240 conducts a full-text search in the structured database 220 according to the keywords 108 "Let the Bullets Fly," so as to determine whether "Let the Bullets Fly" refers to a book or film.

Additionally, if the user's request information 102 is "Days When We Were Together," two possible intention syntax data 106 may be derived from the user's request information 102:

"<playmusic>,<singer>=When We Were Together, <songname>=Days";
"<playmusic>,<songname>=Days When We Were Together"

According to the same intention data 112 "<playmusic>" and the two sets of corresponding keywords 108, i.e., "When We Were Together" and "Days" as well as "Days When We Were Together," the user's intention may be interpreted as "listen to the song 'Days' performed by the music artist 'When We Were Together'" and "listen to the song 'Days When We Were Together'", respectively. The knowledge comprehension assistance module 400 may transmit the first set of keywords 108 "When We Were Together" and "Days" and the second set of keywords 108 "Days When We Were Together" to the search interface unit 260 to make sure whether a song entitled "Days" and performed by the music artist "When We Were Together" actually exists (i.e., to recognize and ascertain the user's intention implied by the first set of keywords 108), and also make sure whether a song entitled "Days When We Were Together" exists (i.e., to recognize and ascertain the user's intention implied by the second set of keywords 108). Note that the formats and the names corresponding to the possible intention syntax data 106 and the intention data 112 are not limited to those described herein.

FIG. 3A is a schematic diagram illustrating a plurality of records stored into a structured database 220 according to an embodiment of the invention, wherein the records have specific data structures as shown therein.

In general, according to conventional methods of conducting full-text searches, the search results (e.g., obtained through Google or Baidu) are non-structured data and are thus separate and unrelated. Any user has to browse the search results one-by-one so as to find out information he/she wants, which is rather inconvenient and is not user-friendly. By contrast, in the invention, search efficiency and accuracy is guaranteed by means of a structured database because associated value data in each record of the structured database are correlated, and those value data within a record collectively demonstrate the category of the record belongs. When the search engine 240 conducts a full-text search in the structured database 220 and also when at least one value data in the record matches with the keyword, associated indication data corresponding to those matched value data may be output for the purpose of recognizing and ascertaining the user's intention included in the request information. Detailed implementations will be further described in the following embodiment.

According to an embodiment of the invention, each record 302 stored in the structured database 220 includes a title field 304 and a content field 306, wherein the title field 304 includes a plurality of sub-fields 308, and each of which includes an indication field 310 and a value field 312. Within each record 302, the indication field 310 serves to store an indication data, and the value field 312 serves to store a value data. Record 1 shown in FIG. 3A is exemplified to explain more detailed hereinafter. Three sub-fields 308 in the title field 304 of Record 1 respectively store:

"singerguid: Andy Lau";
"songnameguid: Days When We Were Together"; and
"songtypeguid: HK and Taiwan, Cantonese, pop";

Each indication field 310 of these three sub-fields 308 respectively stores associated indication data "singerguid," "songnameguid," and "songtypeguid," and the corresponding value field 312 respectively stores the value data "Andy Lau," "Days When We Were Together," and "HK and Taiwan, Cantonese, pop." The indication data "singerguid" demonstrates the value data "Andy Lau" is a singer's name, the indication data "songnameguid" demonstrates the value data "Days When We Were Together" is a song name, and the indication data "songtypeguid" demonstrates the value data "HK and Taiwan, Cantonese, pop" is a song type. The indication data may be represented by different digit numbers or characters, which should not be construed as a limitation to the invention. The content field 306 of Record 1 may store lyrics of the song "Days When We Were Together" or other data related to this song (e.g., the composer/lyricist of the song). Note that the data stored in the content field 306 of each record as shown in FIG. 3A are merely exemplary, and whether the stored data are authentic or not should not be construed as a limitation to the invention.

In the previous embodiment, each record includes the title field 304 and the content field 306, and each sub-field 308 in the title field 304 includes an indication field 310 and a value field 312. However, these fields 304 and sub-fields 308 should not be construed as limitations to the invention, and the record 302 may not contain the content field 306 or even the indication field 310 in some embodiments.

Besides, in an embodiment of the invention, a first special character is stored as a separation between two neighboring sub-fields 308 so as to separate data of any two neighboring sub-fields 308, and a second special character is stored as a separation between the indication field 310 and the value field 312 within a sub-field 308 so as to separate the indication data in the indication field 310 from the value data in the value field 312. For instance, as shown in FIG. 3A, the second special character ":" (Colon) serves to separate the indication data "singerguid" from the value data "Andy Lau," to separate the indication data "songnameguid" from the value data "Days When We Were Together," and to separate the indication data "songtypeguid" from the value data "HK and Taiwan, Cantonese, pop". In Record 1, the first special character "|" (Dash) is applied to separate two neighboring sub-fields 308 within a record 302. Note that those special characters applied to separate the stored data are not limited to those described herein.

In another aspect, according to an embodiment of the invention, the digit number of each sub-field 308 in the title field 304 may be fixed. For instance, each sub-field 308 may use 32 characters and the indication field 310 may need 7 or 8 digits (for directing to 128 or 256 different indication data), which indicates digit numbers may be fixed in the invention. Besides, the first and second special characters respectively need fixed digit numbers as presentations. Therefore, after the digit numbers of the indication field 310 (e.g., 8 digits), first special character (i.e., one character or 8 digits), and the second special character (i.e., one character or 8 digits) are subtracted from the total digit number of the sub-field 308, the remaining digit number of the sub-field 308 may be applied for storing value data of the value field 312. Please note the digit numbers of the sub-field 308 is fixed, and the data sequentially stored in each sub-field 308, i.e., the indication data in the indication field 310, the first special character, the value data in the value field 312, and finally the second special character, all have fixed digit numbers as well. Accordingly, the value data in the value field 312 may be directly obtained by skipping proper digits. For example, if the value data "Andy Lau" in the first sub-field 308 are retrieved, the search system 200 may skip the digits associated with the indication field 310 (e.g., the first eight digits), the second special character (e.g., the consecutive 8 digits used for representing a colon), and also the first special character (e.g., the last 8 digits used for representing a dash) within the first sub-field 308. At this example, there are 32−3=29 characters being applied to store the value data (i.e., "Andy Lau") in the value field 312. The number "3 (also 1+1+1)" here refers to the character of the indication data in the indication field 310 (the first "1" of "3", since the size of 8 digits is equivalent to that of one character), the first special character (the second "1" of "3"), and the second special character (the last "1" of "3"). Subsequently, category determinations may then be made by comparing those retrieved value data 312 with keyword 108. After the retrieved value data 312 is compared with the keywords 108 (regardless of whether the comparison results are successful or not), the next value data 312 in the sub-field 308 may be retrieved in the same manner (e.g., the value data "Days When We Were Together" in the second sub-field 308 of Record 1 are then retrieved) for further comparison. The keyword 108 may be firstly compared with the value data retrieved from Record 1, and after all the value data of Record 1 are compared, the value data of the first sub-field 308 of Record 2 (e.g., "Xiaogang Feng") is then compared with the keyword 108. All comparisons may continue until those value data of all records are compared with the keyword 108.

Note that the digit number of each sub-field 308, and also digit numbers of those fields within the sub-field 308, including the digit numbers of the indication field 310, the first special character, and the second special character, may be changed according to practical applications and/or actual demands. The invention is not limited thereto. The comparison between the keyword 108 and the retrieved value data 312 is exemplified in the previous embodiment and should not be construed as a limitation to the invention. In another embodiment, the full-text search may be conducted by comparing the keyword 108 with all contents of the records 302 character-by-character. Besides, the way of skipping the digits of the indication field 310, the second special character, and the first special character may be achieved by means of bit-shift operations (e.g., division) under hardware, software, or a combination thereof. Any people skilled in the art may make necessary modifications based on his/her practical applications and/or actual demands. In another embodiment, the title field 304 may not include the first and second special characters, and each sub-field 308 in the title field 304 may be established by using a fixed digit number such that the indication field 310 in the sub-field 308 may be established by means of another fixed digit number different from that of the sub-field 308. Since the digit numbers of both the sub-field 308 and the indication field 310 are fixed, the indication data or the value data in each sub-field 308 may be directly retrieved by skipping certain digit numbers through bit-shift operations (e.g., division).

When the digit number of each sub-field 308 is fixed, a counter may be used in the search system 200 (or in a server having the natural language comprehension system 100) to register which sub-field 308 is compared currently. Additionally, another counter may be employed to store the order of the record which is compared currently. For instance, a first counter is applied to show the order of the currently compared record, and a second counter is applied to show the order of the currently compared sub-field. If the data in the third sub-field 308 (i.e., "filenameguid: Huayi Brothers Media") of Record 2 shown in FIG. 3A are compared currently, the value stored by the first counter is 2 indicating the currently compared record is Record 2, and the value stored by the second counter is 3 indicating the currently compared sub-field is the third one. For the purpose of reserving most digits of sub-field 308 as the storage of the value data 312, the indication field 310 merely contains 7 or 8 digits in the embodiment. And, the stored indication data (by means of 8 digits) in the indication field 310 may act as an indicator/pointer for retrieving actual indication data from an indication data storage apparatus 280. In one embodiment, the indication data are stored in tables; however, any kind of data structures may be applied to store the indication data of the invention as long as the indication data is accessible by the search system 200. Practically, the value data may be directly retrieved for comparison, and the indication data may be directly retrieved according to the values of these two counters if a matched comparison result is found. This retrieved indication data may be served as the response result 110 and may then be transmitted to the knowledge comprehension assistance module 400 for further processing. For instance, when the data in the second sub-field 308 (i.e., "songnameguid: Betrayal") of Record 6 are compared and matched with the keyword 108, the current values of the first/second counters are 6/2, respectively. Therefore, according to these two counter values, the indication data may be obtained by searching associated table as shown in FIG. 3C stored in the indication data storage apparatus 280, and the table indicates that the indication data in the second sub-field of Record 6 are "songnameguid." In a further embodiment of the invention, all digits in the sub-field 308 may be applied to store the value data if the digit number for each sub-field 308 is fixed. Thereby, the indication field 312, the first special character, and the second special character may be completely removed. In this case, the search engine 240 is aware that it goes to the next sub-field after passing a fixed digit number, and the value of the second counter increases one thereafter. Certainly, the value of the first counter will increase one when searching the next record. In one embodiment, any record of the structured database 220 may be designed to have an identical size and numbers of sub-fields 308 within a record may be fixed to a predetermined number, such that the search engine 240 is aware it goes to the end of a record if identical-sized data having has been parsed for the record. In another embodiment, a third special symbol, e.g., a period or the like, is placed at the end of a record such that the search engine 240 is aware it goes to the end of a record whenever this predetermined symbol is found. Thereby, more digits may be applied to store the value data.

Another example is provided herein to explain the process of transmitting the response result 110 back to the knowledge comprehension assistance module 400 for further processing after the matched comparison result is found. According to the data structure of the records 302, in one embodiment of the invention as shown above, if the user's request info' illation 102 is "I want to see Let the Bullets Fly," two possible intention syntax data 106 may be derived from the user's request information 102:

"<readbook>,<bookname>=Let the Bullets Fly"; and
"<watchfilm>,<filmname>=Let the Bullets Fly";

According to the keyword 108 "Let the Bullets Fly" received through the search interface unit 260, the search engine 240 conducts a full-text search to the title field 304 of each record stored in the structured database 220 shown in FIG. 3A. In the title field 304 of Record 5, the value data "Let the Bullets Fly" are found, and thus a matched result is obtained. The search system 200 then transmits the indication data "filmnameguid" (in the third sub-title filed of the title field 304 in Record 5) as the response result 110 back to the knowledge comprehension assistance module 400. Since the third sub-title field in Record 5 includes the indication data "filmnameguid" corresponding to the value data "Let the Bullets Fly," the knowledge comprehension assistance module 400 is able to compare the indication data "filmnameguid" with the previously stored intention data 112 "<watchfilm>" and "<readbook>" in the possible intention syntax data 106, so as to determine the confirmative intention syntax data 114 corresponding to the request information 102 is "<watchfilm>,<filmname>=Let the Bullet Fly" (because of the word "film"). That is, the data "Let the Bullets Fly" described in the user's request information 102 refer to the name of a film, and the user's intention contained in the request information 102 is to watch the film "Let the Bullets Fly" instead of reading the book "Let the Bullets Fly." The confirmative intention syntax data 114 "<watchfilm>,<filmname>=Let the Bullet Fly" is then directed to the parsed result output module 116 for further processes.

Relevant explanations are further provided in the following example. If the user's request information 102 is "I want to listen to Days When We Were Together," two possible intention syntax data 106 may be derived from the user's request information 102:

"<playmusic>,<singer>=when we were together, <songname>=days"; and
"<playmusic>,<songname>=Days When We Were Together";

The search engine 240 then conducts a full-text search in the title field 304 of the records stored in the structured database 220 as shown in FIG. 3A according to the two sets of keywords 108 received through the search interface unit 260:

"When We Were Together" and "Days"; and
"Days When We Were Together"

During the full-text searches, no matched result corresponding to the first set of keywords 108 (i.e., "When We Were Together" and "Days") is found in all records, but Record 1 corresponding to the second set of keywords 108 (i.e., "Days When We Were Together") is found. Hence, the search system 200 considers the indication data "songnameguid" (corresponding to the second set of keywords 108) in the title field 304 of Record 1 as the response result 110 and then transmits back to the knowledge comprehension assistance module 400. After receiving the indication data "songnameguid" corresponding to the value data "Days When We Were Together," the knowledge comprehension assistance module 400 compares the intention data 112 (i.e., <singer>, <songname>, etc.) in the possible intention syntax data 106 (i.e., "<playmusic>,<singer>=When We Were Together, <songname>=Days" and "<playmusic>,<songname>=Days When We Were Together") with the indication data "songnameguid" and then observes that the user's request information 102 does not contain any data relating to singer named "Days" but relating to a song titled "Days When We Were Together" (because only <songname> is successfully matched). Through this comparison procedure, the knowledge comprehension assistance module 400 is able to determine required confirmative intention syntax data 114 corresponding to the request information 102 is "<playmusic>, <songname>=Days When We Were Together," and the user's intention included in the request information 102 is to listen to the song "Days When We Were Together."

In another embodiment of the invention, the searched response result 110 may be a completely matched record completely matching the keywords 108 or a partially matched record partially matching the keywords 108. For instance, if the user's request information 102 is "I want to listen to Betrayal of Jam Hsiao," the natural language processor 300 may obtain two possible intention syntax data 106 after parsing the request information 102:

"<playmusic>,<singer>=Jam Hsiao, <songname>=Betrayal";
"<playmusic>,<songname>=Betrayal of Jam Hsiao";

and the natural language processor 300 transmits two sets of keywords 108 to the search interface unit 260:

"Jam Hsiao" and "Betrayal"; and
"Betrayal of Jam Hsiao";

According to the keywords 108 received through the search interface unit 260, the search engine 240 conducts a full-text search to the title field 304 of each record 302 stored in the structured database 220 shown in FIG. 3A. During the full-text search, no matched result corresponding to the second set of keywords 108 (i.e., "Betrayal of Jam Hsiao") is found in the title fields 304 of all records 302, but Records 6 and 7 corresponding to the first set of keywords 108 (i.e., "Jam Hsiao" and "Betrayal") are matched. Record 6 is a partially matched record since merely "Jam Hsiao" of the first set of keywords 108 matches the value data "Jam Hsiao" in Record 6 but "Betrayal" of the first set of keywords does not match other value data "Aska Yang" and "Gary Chaw". By contrast, Record 7 is the completely matched record because the first set of keywords 108 "Jam Hsiao" and "Betrayal" are both found in the first and second value data of Record 7 (because both "Jam Hsiao" and "Betrayal" are successfully matched). Note that Record 5 corresponding to the request information 102 "I want to watch Let the Bullet Fly" and Record 1 corresponding to the request information 102 "I want to listen to Days When We Were Together" are also a partially matched record. In an embodiment of the invention, when the search interface unit 260 outputs a plurality of response results 110 to the knowledge comprehension assistance module 400, the search interface unit 260 may sequentially output the completely matched records and then those partially matched records since the priority of the completely matched records may be set as higher than that of the partially matched records. Hence, when the search interface unit 260 outputs the response results 110 associated with Record 6 and Record 7, the output priority of Record 7 is greater than that of Record 6 because all value data "Jam Hsiao" and "Betrayal" in Record 7 are successfully matched, while the value data "Aska Yang" and "Gary Chaw" in Record 6 are not matched. In other words, since the priority of a matched record is higher than others if this record matches with the keywords 108 to a greater extent, the knowledge comprehension assistance module 400 is advantageous to search or determine required confirmative intention syntax data 114 efficiently. In another embodiment, indication value of the matched record with the highest priority among all matched records may be directly output as the response result 110 (and may be the confirmative intention syntax data 114 later). The above descriptions should not be construed as limitations to the invention. In another embodiment, as long as any matched record is found, associated indication value of this matched record is output without considering its priority, so as to expedite the search processes. For instance, if the request information 102 is "I want to listen to Betrayal of Jam Hsiao," and a matched result is found in Record 6, corresponding indication data in Record 6 are output as the response result 110 immediately. In another embodiment, associated operation(s) for the record having the highest priority may be directly performed and then provided to the user. For instance, if the record "play the film of Romance of the Three Kingdoms" has the highest priority, the film "Romance of the Three Kingdoms" may be directly played. Moreover, if the record "play the song of Betrayal performed by Jam Hsiao" has the highest priority, the song "Betrayal" performed by Hsiao may be directly played. Note that the above descriptions are merely descriptive but not restrictive.

In yet another embodiment of the invention, if the user's request information 102 is "I want to listen to Betrayal of Andy Lau," one of the corresponding possible intention syntax data 106 may be:

"<playmusic>,<singer>=Andy Lau, <songname>=Betrayal";

If the keywords 108 "Andy Lau" and "Betrayal" are input to the search engine 240 through the search interface unit 260, no matched result will be found in the database show in FIG. 3A. In yet another embodiment of the invention, the keywords 108 "Andy Lau" and "Betrayal" may be respectively input to the search engine 240 through the search interface unit 260, and a result indicating that "Andy Lau" is a singer's name (the indication data "singerguid") and another result indicating that "Betrayal" is a song title (the indication data "songnameguid", while the song may be performed by Gary Chaw or by Jam Hsiao, Aska Yang, and Gary Chaw together) may be respectively obtained. Alternatively, the natural language comprehension system 100 may further remind the user of "whether the song Betrayal is performed by Jam Hsiao (according to the matched result of Record 7)" or "whether the song Betrayal is performed by Jam Hsiao, Aska Yang, and Gary Chaw together (according to the matched result of Record 6)".

In yet another embodiment of the invention, each record stored in the structured database 220 may further include a source field 314 and a popularity field 316. As shown in FIG. 3B, each record stored in the structured database 220 not only has the fields shown in FIG. 3A but also owns the source field 314, the popularity field 316, the preference field 318, and the dislike field 320. The source field 314 of each record 302 stores an indication/pointer regarding where the source structured database the record 302 is from (please note only one structured database 220 is shown in the drawings, but there may be various structured databases actually), the user who provides the record 302, or the server which provides information relating to the record 302.

According to the preferences derived from the request information 102 previously provided by the user, the search system 200 may search a certain structured database. For instance, when the keyword 108 included in the request information 102 are applied to conduct a full-text search and a matched result is found, the popularity value of the matched record will increase one automatically. The popularity field 316 of each record 302 stores a search popularity or a popularity value of the record 302, which may refer to the number of matches or the matching probability of the record 302 regarding the request information 102 provided by an identical user, all users of a special group, or all users during a time interval. Thereby, the knowledge comprehension assistant module 400 is able to determine the user's intention according to current popularity. The ways of employing the preference field 318 and the dislike field 320 will be introduced later in the following paragraphs. Specifically, if the user's request information 102 is "I want to see the Romance of the Three Kingdoms," the natural language processor 300 may obtain many possible intention syntax data 106 after parsing the request information 102:

"<readbook>,<bookname>=Romance of the Three Kingdoms";

"<watchTV>,<TVname>=Romance of the Three Kingdoms"; and

"<watchfilm>,<filmname>=Romance of the Three Kingdoms".

In one embodiment, if the search system 200 browses and gathers statistic historical records (i.e., the number of times of selecting the record 302 by a certain user, as stored in the popularity field 316) associated with the user's request information 102, the search system 200 may conduct a search in the structured database specifically storing the film and concludes that the most of the user's requests are to watch films (assumed there is only one record respectively relating to book, TV, and film for "Romance of the Three Kingdoms", and the value of the popularity field 316 for watching film is higher than that for watching TV and reading book), and thereby the knowledge comprehension assistance system 400 may determine that "<watchfilm>, <filmname>=Romance of the Three Kingdoms" as the confirmative intention syntax data 114 (after a response result 110 indicating such a conclusion is received). In yet another embodiment, the search system 200 may browse and gather statistic for those popularity field 316 of all matched records for further identifications if there are a lot of records indicating the identical category. For example, if there are more than one records in the structure database 220 relating to respectively relating to book, TV, and film for "Romance of the Three Kingdoms", the search system 200 may gather statistics of those matched so as to find which category having the largest value. For example, if there are 5, 13, 16 matched records relating to book, TV, and film for "Romance of the Three Kingdoms", and the summation of the values of these five popularity field 316 relating to book is 30, the summation of the values of these thirteen popularity field 316 relating to TV is 18, the summation of the values of these sixteen popularity field 316 relating to drama is 25, the search system 200 may select a matched record having the largest popularity field 316 among the five one relating to book for "Romance of the Three Kingdoms". Associated indication value (may also include the value stored in the source field 314) of this selected record may then be directed to the knowledge comprehension assistance module 400 for further processing. In one embodiment, the value stored in the source field 314 may show the code indicating where to find the database specifically storing the film. Moreover, the code stored in the source field 314 may be delivered to the knowledge comprehension assistance system 400 as a part of the response result 110 so as to show to the user where to obtain the drama for playback. The way to change the value stored in the popularity field 316 may be varied according to different computer systems equipped with the natural language comprehension system 100, and the invention is not limited thereto. Besides, the value of the popularity field 316 may gradually decrease as time goes by, so as to indicate that the user's is gradually no longer interested in the record 302. The invention is not limited thereto as well.

In another embodiment of the invention, the user may particularly enjoy watching a TV drama of "Romance of the Three Kingdoms" during a certain period of time. Since "Romance of the Three Kingdoms" is a long-running drama, and the user is not able to watch all episodes at one time, the user may repeatedly select the TV drama of "Romance of the Three Kingdoms" within a period of time. If the value in the popularity field 316 increases one every time when the TV drama of "Romance of the Three Kingdoms" is selected, the record 302 may be repeatedly matched. The search system 200 may learn it from browsing the data stored in the popularity field 316. In yet another embodiment, the data stored in the popularity field 316 may also be employed to represent the popularity of accessing the data provided by a certain provider, and a telecommunication service provider may store a code of the provider in the source field 314. For instance, assumed the "film drama of Romance of the Three Kingdoms" provided by a certain service provider is mostly selected. When a user inputs his/her request information 102 indicating "I want to see the Romance of the Three Kingdoms," the full-text search conducted to the structured database shown in FIG. 3B may find three matched results "read the book of Romance of the Three Kingdoms" (Record 8), "watch the TV drama of Romance of the Three Kingdoms" (Record 9), and "watch the film of Romance of the Three Kingdoms" (Record 10). However, since the data in the popularity field 316 show that watching the film drama of Romance of the Three Kingdoms is the most popular option (i.e., the values in the popularity fields of Records 8, 9, and 10 are 2, 5, and 8), the indication data of Record 10 may be firstly provided as the response result 110 and output to the knowledge comprehension assistance system 400 for determining the user's intention. In an embodiment of the invention, the data in the source field 314 may be simultaneously provided to the user, so as to show to the user the service provider who provides the film drama for watching (and he/she may link to this service provider to watch film drama). In another embodiment, if there are a lot of records providing "film of Romance of the Three Kingdoms" for user's watching, the search system 200 may deliver the data within the source field 314 of the record having the largest value in the popularity fields 316 among all records providing the same contents (i.e., providing "a film of Romance of the Three Kingdoms"). Note that the way of changing the value stored in the source field 314 may be varied according to different computer systems equipped with the natural language comprehension system 100, and the invention is not limited thereto. The information included in the popularity field 316, the preference field 318, and the dislike field 320 shown in FIG. 3B may be further divided into two parts respectively related to an individual user and all users. Furthermore, the information included in the popularity field 316, the preference field 318, and the dislike field 320 and related to the individual user may be stored in a user's cell phone, while the server may store the information included in the popularity field 316, the preference field 318, and the dislike field 320 and related to all users. Thereby, the personal information with respect to a user's selections or the intentions is merely stored in his/her own mobile communication apparatus (e.g., a cell phone, a tablet PC, a small notebook computer, and so on), and the server stores the information related to all users. The purposes of enhancing storage efficiencies for servers and ensuring privacies of user's personal information are thus achieved simultaneously.

Apparently, the value data in each record of the structured database described herein are correlated (e.g., the value data "Andy Lau," "Days When We Were Together," and "HK and Taiwan, Cantonese, pop" in Record 1 all serve to describe the category of Record 1), and the value data (accompanied with associated indication data) in each record collectively illustrate a user's intention corresponding to the user's request information (e.g., when the value data "Days When We Were Together" are matched with the keywords in the user's request information, it indicates that the user may intend to access the data in Record 1). Thereby, when the search engine 200 conducts the full-text search in the structured database 220 and also when the value data in a certain record are matched, the indication data (e.g., "song-nameguid") corresponding to the matched value data may be output as the response result 110, so as to determine the intention corresponding to the request information 102 (e.g., through comparison in the knowledge comprehension assistance module 400).

Figure 4A:
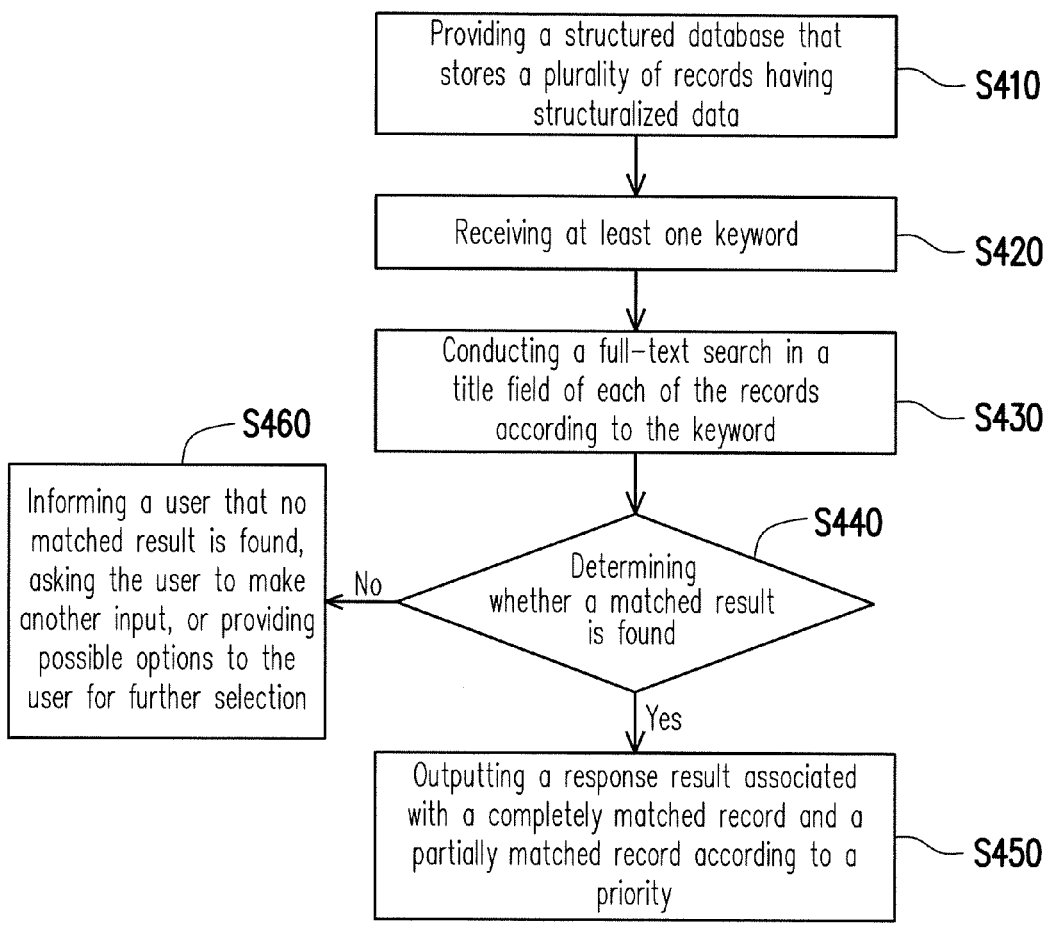
FIG. 4A is a flowchart illustrating a search method according to an embodiment of the invention.

Based on the contents disclosed or taught by the exemplary embodiments, FIG. 4A shows a flowchart illustrating a search method according to an embodiment of the invention. With reference to 4A, the search method includes the following steps.

In step S410, a structured database that stores a plurality of records having structuralized data is provided.

In step S420, at least one keyword is received.

In step S430, a full-text search is conducted to a title field of each record according to the keyword. For instance, the keyword 108 is input to the search interface unit 260, such that the search engine 240 may conduct the full-text search to the title fields 304 of the records 302 in the structured database 220. The actual search processes may be referred to descriptions associated with FIGS. 1 to 3A/3B, or may be modified without departing from the spirits and scopes of the invention.

In step S440, after the full-text search is conducted, the search engine 240 determines whether a matched result is found. For instance, the search engine 240 is applied to determine whether a matched result corresponding to the keywords 108 is found during the full-text search processes.

If there is a matched result, a response result according to completely matched record and a partially matched record are sequentially output in step S450. For instance, if the keyword 108 is matched with records in the structured database 220, the search interface unit 260 sequentially outputs the indication data corresponding to the completely matched records and then the indication data corresponding to those partially matched records. The indication data may be obtained through the indication data stored apparatus 280 shown in FIG. 3C and may act as the response result 110 being sent to the knowledge comprehension assistance system 400. In one embodiment, the response result 110 may further comprise information associate with the matched record, e.g., those values stored in the source field 314 and/or the content field 306, for further processing (such as shown for redirecting to associate database aforementioned).

The priority of the completely matched record is higher than that of the partially matched record in one embodiment.

From another perspective, if no matched result is found (e.g., the full-text search is conducted according to keywords "Andy Lau" and "Betrayal" such that no matched result is found), the natural language comprehension system 100 may inform the user such a mismatch situation and then terminate the search processes afterward. Alternatively, the user may be informed that no matched result is found and he/she may input another request again. Additionally, the natural language comprehension system 100 may also provide some possible options to the user for further selection (step S460).

The above-mentioned steps and processes are not limited to those described herein, and some of the steps and processes may be omitted. For instance, in an embodiment of the invention, a match determination module (not shown) located outside the search system 200 may be applied to determinate whether an outputting response result 110 indicates a completely or partial match record in the step S440. In another embodiment, the step S450 may be deleted.

Figure 4B:
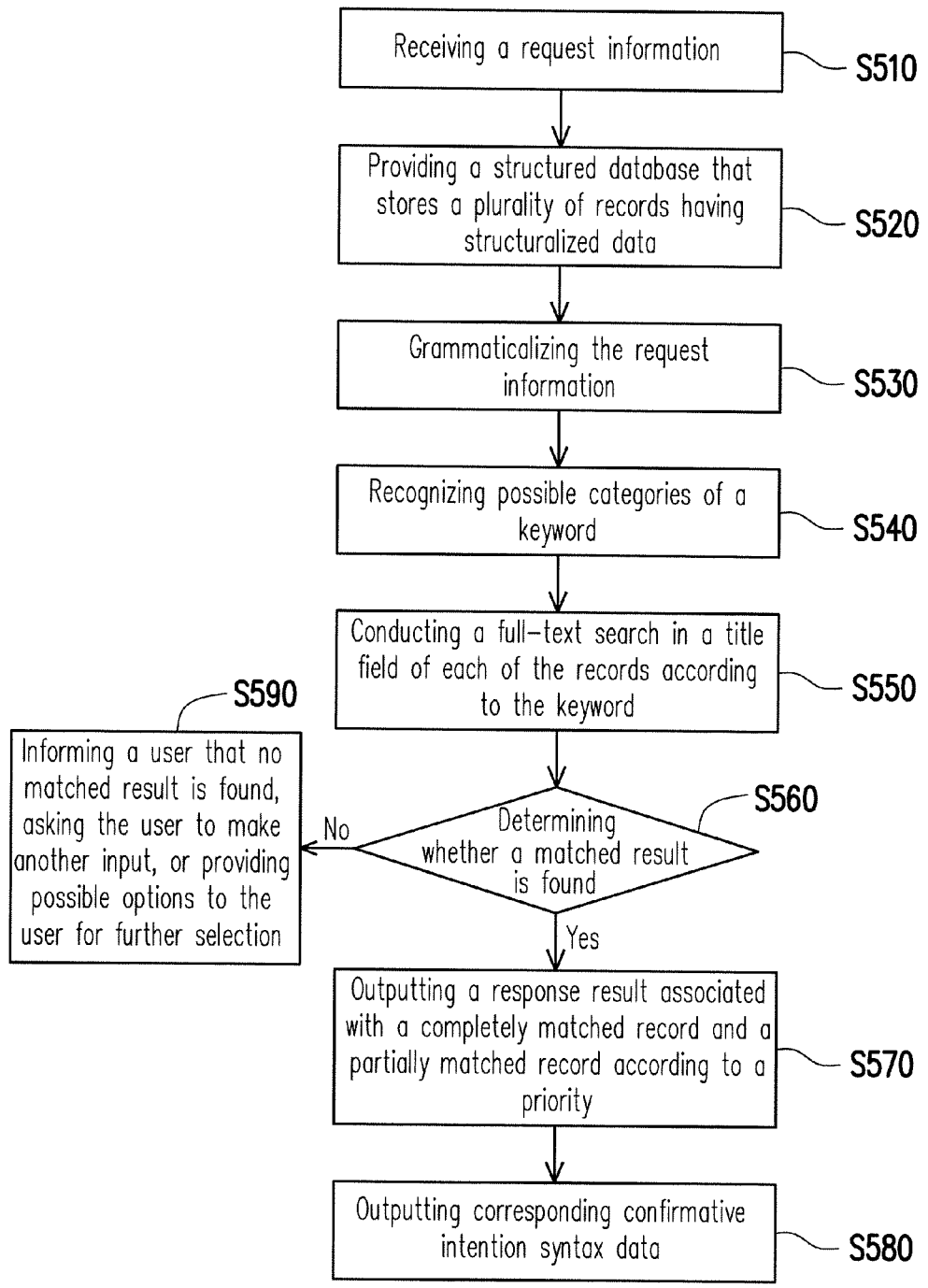
FIG. 4B is a flowchart illustrating a work process of a natural language comprehension system according to another embodiment of the invention.

Based on the contents disclosed or taught by the exemplary embodiments, FIG. 4B shows a flowchart illustrating a work process of the natural language comprehension system 100 according to another embodiment of the invention. With reference to FIG. 4B, the work process of the natural language comprehension system 100 includes the following steps.

In step S510, a user's request information is received. For instance, a user may transmit his/her request information 102 represented by means of speeches or textual contents to the natural language comprehension system 100.

In step S520, a structured database storing a plurality of records is provided.

In step S530, the request information is grammaticalized. For instance, after the natural language processor 300 parses the user's request information 102, the natural language processor 300 converts the parsed request information 102 into corresponding possible intention syntax data 106.

In step S540, possible categories associated with a keyword are recognized. For instance, the knowledge comprehension assistance system 400 may recognize the possible category of the keyword 108 in the possible intention syntax data 106 as, e.g., the keyword "Romance of the Three Kingdoms" a book, a film, or a TV drama.

In step S550, a full-text search is conducted in a title field 304 of each record according to the keyword 108. For instance, the keyword 108 is input via the search interface unit 260, such that the search engine 240 conducts the full-text search in the title field 304 of each record 302 stored in the structured database 220.

In step S560, after the full-text search is conducted, the search engine 240 may determine whether a matched result is found. For instance, the search engine 240 may determine whether a matched result (whatever completely or partially matched) corresponding to the keyword 108 is found after the full-text search is conducted.

If there is a matched result, in step S570, a completely matched record and a partially matched record acting as the response result 110 may be sequentially output. For instance, if the keywords 108 are matched with a record in the structured database 220, the search interface unit 260 may sequentially output the indication data corresponding to the completely matched records and then the partially matched records, wherein the output indication data are considered as the response result 110.

Here, the priority of the completely matched record is higher than that of the partially matched record.

In step S580, corresponding confirmative intention syntax data are sequentially output. For instance, the knowledge comprehension assistance module 400 outputs the confirmative intention syntax data 114 according to the sequentially output indication data, which may correspond to the completely matched record and the partially matched record, respectively.

From another perspective, if no matched result is found in step S560 (e.g., the full-text search is conducted according to "Andy Lau" and "Betrayal" and no matched result is found), a step similar to the step S460 is performed (i.e., the user may be informed of match failure, and the process is terminated here). Alternatively, the user may be informed by the disclosed system that no matched result is found and he/she may need to input another request. In one embodiment, the disclosed system may provide some possible options to the user for further selections (step S590).

The above-mentioned steps and processes are not limited to those described herein, and some of the steps and processes may be omitted.

In conclusion, the keywords included in the user's request information are captured, and the full-text search is conducted in the title fields of the records (having the structures illustrating in FIGS. 3A and 3B) in the structured database. If there is a matched result, the category of the keyword may be compared with intension data so as to recognize and ascertain the user's intention corresponding to the request information.

The structured database may be further applied to recognize speeches, which will be elaborated hereinafter. Specifically, descriptions are given for illustrating how the natural language comprehension system 100 is employed to revise an incorrect speech response according to user's successive speech input, and how the natural language comprehension system 100 is able to find possible report answers reported to the user for further selections.

As is discussed above, a common mobile communication apparatus is able to perform the natural language dialogue function, such that the user may communicate with the mobile communication apparatus by means of his/her own speeches. However, in the common mobile communication apparatus, if the user's speech input is unclear or unrecognized, the system may output a speech response unconformable to user's speech input which refers to different intentions or purposes. The user may receive speech responses unconformable to his or her intention during some dialogue scenarios. Therefore, a method and related natural language dialogue system for correcting speech responses are provided herein, and the disclosed natural language dialogue system is able to correct an erroneous speech response according to user's following speech inputs and then find additional possible report answers reporting to the user. In order to make the invention being more comprehensible, embodiments in accompanied with examples are described in the following paragraphs.

Figure 5A:
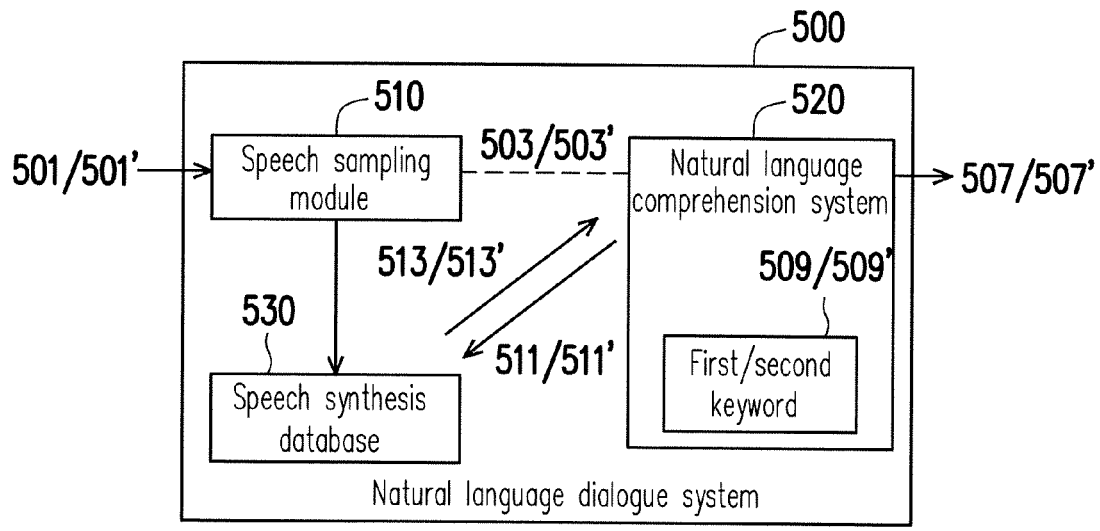
FIG. 5A is a block diagram illustrating a natural language dialogue system according to an embodiment of the invention.

FIG. 5A is a block diagram illustrating a natural language dialogue system according to an embodiment of the invention. With reference to FIG. 5A, the natural language dialogue system 500 includes a speech sampling module 510, a natural language comprehension system 520, and a speech synthesis database 530. According to an embodiment of the invention, the speech sampling module 510 receives a first speech input 501 (e.g., from a user), which is then parsed to generate a first request information 503. The natural language comprehension system 520 parses the first request information 503 and thereby obtains a first keyword 509 included in the first request information 503. After a first report answer 511 that matches the first request information 503 is found, the natural language comprehension system 520 performs a corresponding speech search in the speech synthesis database 530 according to the first report answer 511 so as to find a first speech 513. The natural language comprehension system 520 then generates a first speech response 507 (which is responsive to the first speech input 501) according the first speech 513, and finally outputs the first speech response 507 to the user. The first request information 503 may be considered as the request information 102 described and depicted in FIG. 1 and follow the same processing procedures afterward. That is, after the request information 102 is parsed, the possible intention syntax data 106 are generated, and the keyword 108 therein may be applied to conduct the full-text search in the structured database 220 to obtain a response result 110. This response result 110 is then compared with the intention data 112 in the possible intention syntax data 106, so as to generate required confirmed intention syntax data 114. The parsed result output module 116 then outputs the parsed result 104 that may serve as the first report answer 511 shown in FIG. 5A. Besides, the natural language comprehension system 520 is able to perform the corresponding speech search in the speech synthesis database 530 according to the first report answer 511 (because the parsed result 104 associated with the first report answer 511 may include data (e.g., the indication data stored in the indication field 310, the value data stored in the value field 312, and the data stored in the content field 306) of a completely/partially matched record 302). If the user considers the first speech response 507 output by the natural language comprehension system 520 does not match his/her first request information 503 included in the first speech input 501, he/she may input another speech, e.g., a second speech input 501'. Processing of the first speech input 501 by the natural language comprehension system 520 as described above is the same as that of the second speech input 501', so as to generate second request information 503'. The second request information 503' is parsed to obtain a second keyword 509' therein. After a second report answer 511' that matches the second request information 503 is found, the natural language comprehension system 520 searches and finds a corresponding second speech 513', generates a second speech response 507' corresponding to the second speech 513', and outputs the second speech response 507' to the user as a correction to the first report answer 511. Apparently, by adding new modules in the natural language comprehension system 100 of FIG. 1, the natural language comprehension system 520 is able to correct any incorrect speech response according to speech inputs from a user, which will be further explained below with reference to FIG. 5B.

The components of the natural language dialogue system 500 may be configured within an identical machine. For instance, the speech sampling module 510 and the natural language comprehension system 520 may be configured in the same electronic apparatus. Here, the electronic apparatus may be a mobile communication apparatus (e.g., a cell phone, a PDA phone, a smart phone, etc.) or an electronic apparatus with communication functions or communication software, such as a pocket PC, a tablet PC, a notebook computer, a PC, and so on. The invention is not limited thereto. Besides, those electronic apparatuses may be operated by an Android operating system, a Microsoft operating system, a Linux operating system, and so forth, which should not be construed as a limitation to the invention.

Certainly, the components of the natural language dialogue system 500 may also be configured in different apparatuses or systems and may be connected according to different communication protocols. For instance, the natural language comprehension system 520 may be configured in a cloud server or in a LAN server. The components of the natural language dialogue system 500 may also be positioned at different machines, e.g., the components of the natural language dialogue system 500 may be placed in the same machine where the speech sampling module 510 is located, or placed in a machine different from the machine where the speech sampling module 510 is located.

In an embodiment, the speech sampling module 510 receives the speech input. The speech sampling module 510 may be an apparatus receiving audio, e.g., a microphone, and the first/second speech input 501/501' may be a user's speech.

According to the present embodiment, the natural language comprehension system 520 may be implemented by means of hardware circuitry constituted by using logic gates. In another embodiment, the natural language comprehension system 520 may be implemented by computer programming codes. For instance, the natural language comprehension system 520 may be programmed by using a programming language and acting as an application or a driver operated by an operating system. Program codes of the natural language comprehension system 520 may be stored in a storage unit and executed by a processing unit (not shown in FIG. 5A). Another embodiment is further shown below to enable people skilled in the art to further comprehend the natural language comprehension system 520 described herein. Note that the embodiment provided herein is merely exemplary and should not be construed as a limitation to the invention, and the natural language comprehension system may be implemented under hardware, software, firmware, or a combination thereof.

Figure 5B:
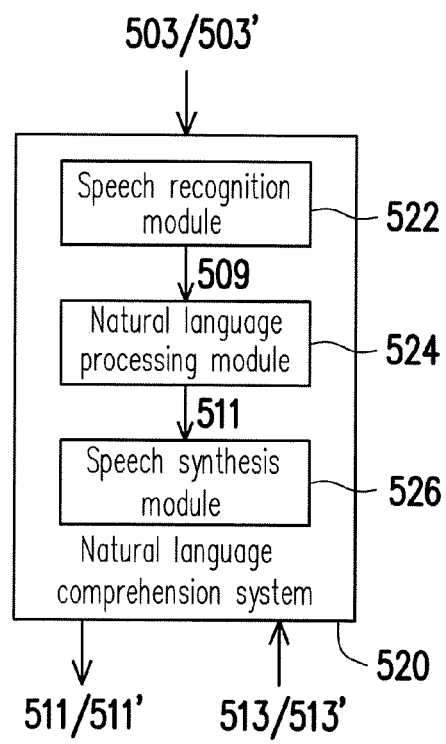
FIG. 5B is a block diagram illustrating a natural language comprehension system according to FIG. 5A of the embodiment of the invention.

FIG. 5B is a block diagram illustrating a natural language comprehension system 520 according to an embodiment of the invention. With reference to FIG. 5B, the natural language comprehension system 520 described in the present embodiment may include a speech recognition module 522, a natural language processing module 524, and a speech synthesis module 526. The speech recognition module 522 receives the request information 503/503' from the speech sampling module 510 (e.g., the first request information 503 parsed by the first speech input 501) and captures one or more first keywords 509 (e.g., the keyword 108 shown in FIG. 1A or other phrases) of the first speech input 501/501'. The natural language processing module 524 may further parse the first keyword 509 to obtain a candidate list having at least one report answer. The processing method described herein is similar to that depicted in FIG. 5A, e.g., a full-text search is conducted in the structured database 220 by the search system 200 shown in FIG. 1A. That is, after the response result 110 is obtained and compared with the intention data 116, a confirmative intention syntax data 114 are generated, and the report answer is generated by the parsed result output module 116 according to the parsed result (the confirmative intention syntax data 114) sent thereby. In the present embodiment, one report answer relatively conformable to the first speech input 501 is selected from all the report answers in the candidate list (e.g., the completely matched record may be selected), and the selected report answer serves as the first report answer 511. The report answer 511 is internally parsed and obtained by the natural language comprehension system 520, and therefore the parsed result must be converted into a speech output before it is output to the user, and finally the user may determine whether the speech output matches with his/her speech input. According to the first report answer 511, the speech synthesis module 526 conducts a search in a speech synthesis database 530 that records texts and corresponding speech information, such that the speech synthesis module 526 is able to find out required first speech 513 corresponding to the first report answer 511 and thereby create a synthesized first speech response 507. The synthesized first speech response 507 may then be output by the speech synthesis module 526 through the speech output interface (not shown) and broadcast to the user, wherein the speech output interface may be a speaker, an amplifier, a headset, or another similar device. When the speech synthesis module 526 conducts the search in the speech synthesis database 530 according to the first report answer 511, the format of the first report answer 511 may be converted, and then call the speech synthesis database 530 by means of interfaces (e.g., APIs) provided by the speech synthesis database 530. During associated calls to the speech synthesis database 530, whether a format conversion is required is determined according to the definitions of the speech synthesis database 530 and is well known to people skilled in the art. Therefore, no detailed description is provided hereinafter.

An example is given below for explanations. If the first speech input 501 from the user indicates "I want to see the Romance of the Three Kingdoms," the speech recognition module 522 receives the first request information 503 parsed from the first speech input 501 within the speech sampling module 510 and finally captures the first keyword 509 exemplarily including "Romance of the Three Kingdoms." The natural language processing module 524 may further parse the first keywords 509 including "Romance of the Three Kingdoms" (e.g., through conducting a full-text search in the structured database 220 by the search system 200 shown in FIG. 1A, comparing the intention data 112 with the response result 110 after the response result 110 is obtained to generate the confirmative intention syntax data 114, and outputting the parsed result 104 by the parsed result output module 116), generate the report answers having three intention options corresponding to "Romance of the Three Kingdoms," organize the report answers to generate a candidate list, and select the report answer (e.g., select Record 10 shown in FIG. 3B) having the largest value in the popularity field 316 from the three report answers included in the candidate list. The selected report answer is the first report answer 511. Here, each of the three intention options ("read the book," "watch the TV drama," and "watch the film") is assumed to correspond to one of the report answers. In an embodiment of the invention, the record having the largest popularity value in the popularity field 316 may be directly provided to the user (e.g., the song "Betrayal" performed by Jam Hsiao may be directly played as shown aforementioned), and the invention is not limited thereto.

Besides, the natural language processing module 524 may determine whether the first report answer 511 is correct by parsing the subsequently received second speech input 501' (by following the same mechanism feeding the speech input 501 into the speech sampling module 510). The second speech input 501' is provided by the user in response to the first speech response 507, which indicates whether the user considers the first speech response 507 is correct or not. After the second speech input 501' is parsed, the natural language processing module 524 may select another report answer from the candidate list as the second report answer 511' if the natural language processing module 524 recognizes the user considers the first report answer 511 is incorrect. For instance, after the first report answer 511 is removed from the candidate list, a second report answer 511' is then selected from those remaining report answers, and then the second speech 513' corresponding to the second report answer 511' is found by means of the speech synthesis module 526. Through the speech synthesis module 526, the synthesized second speech response 507' corresponding to the second speech 513' is generated and broadcast to the user.

For instance, if the user inputs "I want to see the Romance of the Three Kingdoms" and he/she actually intends to watch the TV drama of Romance of the Three Kingdoms, Record 10 (i.e., watch the film of Romance of the Three Kingdoms) previously output to the user and shown in FIG. 3B is not his/her desired report answer. Accordingly, the user may further input "I want to watch the TV drama of Romance of the Three Kingdoms" (clearly indicating the intention to watch "TV drama"), or input "I don't want to watch the film of Romance of the Three Kingdoms" (merely denying the current report answer) as the second speech input 501'. After the second speech input 501' is parsed to obtain the second request information 503' (or the second keywords 509), the natural language dialogue system 500 finds that the second keywords 509' in the second request information 503' include "TV drama" (clearly pointed out by the user) or "don't want to watch the film" (denied by the user). Therefore, the natural language dialogue system 500 determines that the first report answer 511 does not conform to the user's request. Accordingly, another report answer may be selected from the candidate list as the second report answer 511', and the corresponding second speech response 507' may be output. For instance, the second speech response 507' "I now play the TV drama of Romance of the Three Kingdoms for you" is output (if the user clearly indicates that he/she intends to watch the TV drama of Romance of the Three Kingdoms). Alternatively, the second speech response 507' "which option do you want" is output (if the user merely denies the current option), and in accompanied with other options in the candidate list are displayed for his/her further selection (e.g., selecting the second report answer 511' having the second largest popularity value in the popularity field 316 to the user). In another embodiment, if the user's second speech input 501' includes the "selection" information, e.g., if three options "read the book of Romance of the Three Kingdoms," "watch the TV drama of Romance of the Three Kingdoms," and "watch the film of Romance of the Three Kingdoms" are provided to the user for his/her selection, the user may input "I want to watch the film" as the second speech input 501'. At this time, the second request information 503' included in the second speech input 501' is parsed to learn the user's intention (e.g., the option "watch the film" selected by the user is found according to the second keyword 509'), the second speech response 507' "I now play the film of Romance of the Three Kingdoms for you" is output (if the user intends to watch the film of Romance of the Three Kingdoms), and the film is directly played to the user. Certainly, if the user inputs "I want the third option" (e.g., if the user selects to read the book), associated application corresponding to the third option is performed, i.e., the e-book of Romance of the Three Kingdoms is displayed and the second speech response 507' "You want to read the book of Romance of the Three Kingdoms" is played.

Figure 5C:
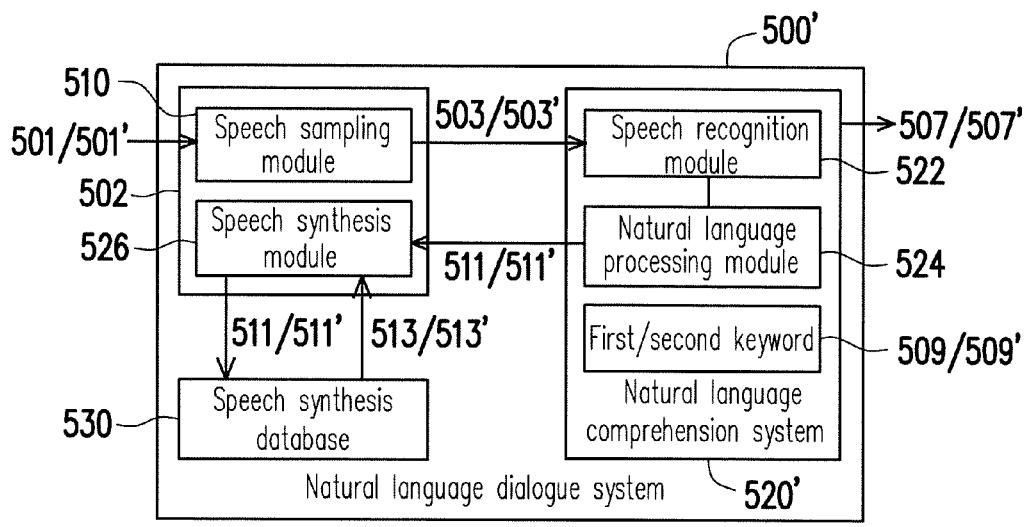
FIG. 5C is a block diagram illustrating a natural language dialogue system according to FIG. 5A of another embodiment of the invention.

According to the present embodiment, in the natural language comprehension system 520, the speech recognition module 524, the natural language processing module 524, the speech synthesis module 526, and the speech sampling module 510 may be configured in an identical machine. In other embodiments of the invention, the speech recognition module 522, the natural language processing module 524, and the speech synthesis module 526 may be separately arranged in different machines (e.g., a computer system, a server, or other similar devices/systems). For instance, in the natural language comprehension system 520' of FIG. 5C, the speech synthesis module 526 and the speech sampling module 510 may be configured in the same machine 502, while the speech recognition module 522 and the natural language processing module 524 may be configured in another machine. In addition, as shown in FIG. 5C, the natural language processing module 524 transmits the first report answer 511/the second report answer 511' to the speech synthesis module 526, and the first report answer 511/the second report answer 511' is then sent to the speech synthesis database 530 to search the first speech 513/the second speech 513' through which the first speech response 507/the second speech response 507' is generated.

Figure 6:
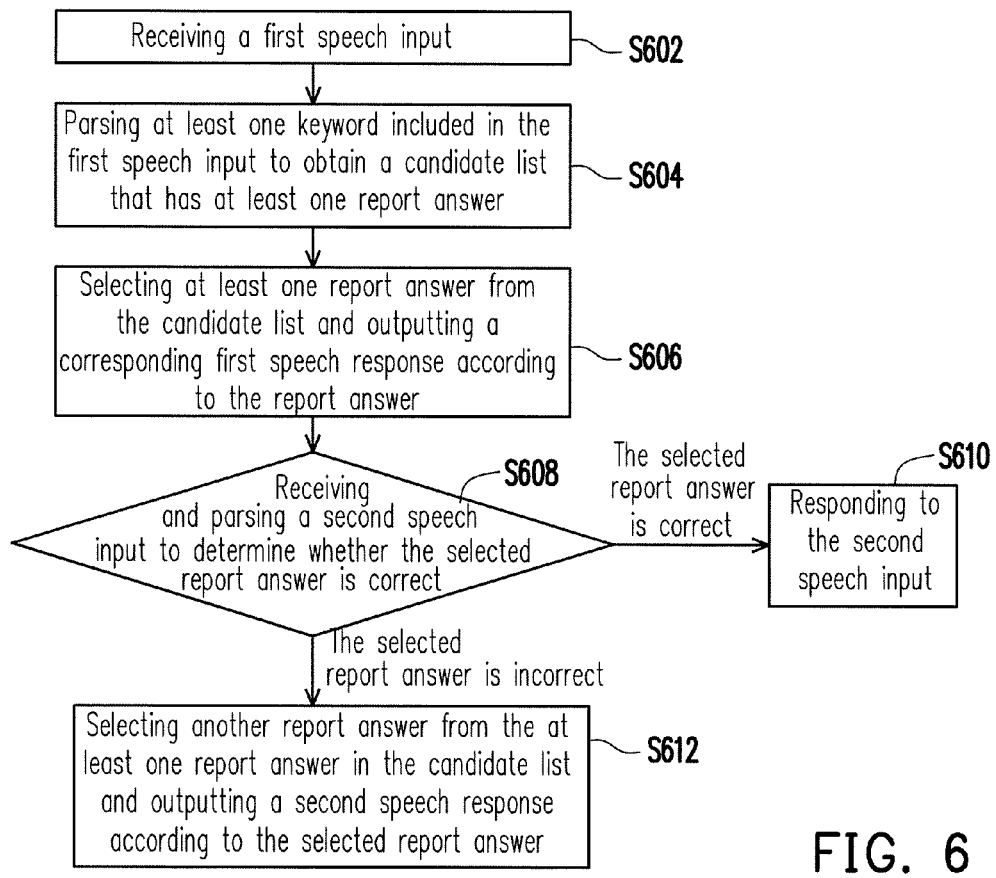
FIG. 6 is a flowchart illustrating a method for correcting a speech response according to an embodiment of the invention.

FIG. 6 is a flowchart illustrating a method for correcting the first speech response 507 according to an embodiment of the invention. According to the method for correcting the first speech response 507 described herein, when the user thinks that the first speech response 507 does not conform to his/her first request information 503, he/she further feeds the second speech input 501' into the speech sampling module 510, which is then parsed by the natural language comprehension system 520 such that the natural language dialogue system 500 recognizes the first speech response previously output to the use 507 does not conform to the his/her intention. At this time, the natural language comprehension system 520 may output the second speech response 507' to correct the first speech response 507. For the purpose of illustrations, the natural language dialogue system 500 shown in FIG. 5A is taken for example, while the method for correcting the first speech response 507 described herein is also applicable to the natural language dialogue system 500' shown in FIG. 5C.

With reference to FIG. 5A and FIG. 6, in step S602, the speech sampling module 510 receives the first speech input 501 (i.e., the first speech input 501 is fed to the speech sampling module 510). Here, the first speech input 501 is a user's speech, for instance, and the first speech input 501 may also include first request information 503 from the user. Specifically, the first speech input 501 from the user may be an interrogative sentence, an imperative sentence, or any sentence having request information, such as "I want to read the Romance of the Three Kingdoms," "I want to listen to the song of Forget-Love Potion," or "What is the temperature today?".

In steps S604, the natural language comprehension system 520 parses at least one first keyword 509 included in the first speech input 501 to obtain the candidate list, and the candidate list has at least one report answer. For instance, when the user's first speech input 501 indicates "I want to see the Romance of the Three Kingdoms," the first keywords 509 parsed and obtained by the natural language comprehension system 520 are "Romance of the Three Kingdoms" and "see." In another example, when the user's first speech input 501 indicates "I want to listen to the song of Forget-Love Potion," the first keywords 509 parsed and obtained by the natural language comprehension system 520 are "Forget-Love Potion," "listen," and "song."

According to the first keywords 509, the natural language comprehension system 520 may search the structured database 220 to obtain at least one search result (e.g., the parsed result shown 104 in FIG. 1) as report answers in the candidate list. The way of selecting the first report answer 511 from plural report answers may refer to that depicted in FIG. 1 and thus will not describe herein. Since the first keywords 509 may relate to different category or knowledge fields (such as films, books, music, or games) and the same category may be further classified into different sub-fields (e.g., different authors of a film or a book, different singers performing one song, different versions of a game, and so on), the natural language comprehension system 520 may search the structured database and obtain one or more search results (e.g., the parsed result 104) corresponding to the first keywords 509. Here, each search result may include the indication data and "other data" corresponding to the first keywords 509. For instance, if the keywords 108 "Jam Hsiao" and "Betrayal" is conducted as a full-text search to the structured database 220 shown in FIG. 3A/3B, two matched results (e.g., Records 6 and 7 shown in FIG. 3A) that respectively include the indication data "singerguid" and "songnameguid" stored in the indication field 310 are found. The "other data" refer to the keywords other than the first keywords 709 in the search results. For instance, if the keywords "Days When We Were Together" is used to conduct the full-text search to the structured database 220 shown in FIG. 3A and Record 1 is the matched result, "Andy Lau" and "HK and Taiwan, Cantonese, pop" are the so-called "other data." Additionally, if the first speech input 501 from the user has a plurality of first keywords 509, it indicates that the first request information 503 from the user is of high clarity, such that the natural language comprehension system 520 is able to parse the first speech input 501 and obtain the search result more closer to the first request information 503.

For instance, when the first keywords 509 are "Romance of the Three Kingdoms" (e.g., if the user inputs the speech input "I want to see the Romance of the Three Kingdoms"), the natural language comprehension system 520, after parsing the first keywords 509, may generate three possible intention syntax data 106 (as shown in FIG. 1):

"<readbook>,<bookname>=Romance of the Three Kingdoms";

"<watchTV>,<TVname>=Romance of the Three Kingdoms"; and

"<watchfilm>,<filmname>=Romance of the Three Kingdoms".

The search results are records corresponding to " . . . 'Romance of the Three Kingdoms' . . . 'book'" (i.e., the intention data are <readbook>), " . . . 'Romance of the Three Kingdoms' . . . 'TV drama'" (i.e., the intention data are <watchTV>), and " . . . 'Romance of the Three Kingdoms' . . . 'film'" (i.e., the intention data are <watchfilm>) (i.e., Records 8, 9, and 10 shown in FIG. 3B). Here, "TV drama," "book," and "film" are recited as the user's intentions. In another example, when the first keywords 509 are "Forget-Love Potion" and "music" (e.g., if the user inputs the speech input "I want to listen to the music of Forget-Love Potion"), the natural language comprehension system 520, after parsing the first keywords 509, may generate the following possible intention syntax data:

"<playmusic>,<songname>=Forget-Love Potion";

The search results are records corresponding to " . . . 'Forget-Love Potion' . . . 'Andy Lau'" (i.e., Record 11 shown in FIG. 3B) and " . . . 'Forget-Love Potion' . . . 'E-jun Lee'" (i.e., Record 12 shown in FIG. 3B), wherein "Andy Lau" and "E-jun Lee" (two Chinese singers) are corresponded to the user's intentions. That is, each search result may include the first keywords 509 and the intention data related to the first keywords 509, and the natural language comprehension system 520 may, according to the search result, convert the data in the search results into the report answers and also register the report answers into the candidate list for uses of the consecutive steps. Please note two requests "I want to listen to Andy Lau's Forget-Love Potion" and "I want to listen to Days When We Were Together" both employs the same sentence pattern in Chinese (i.e., " "劉德華的忘情水" " and ""一起走過 的日子 ""), but the disclosed natural language comprehension system 100/520/520' are able to distinguish them by means of full-text searches in the disclosed structured database 220. For example, "Andy Lau's Forget-Love Potion" (i.e., " "劉德華的忘情 水"") may be recognized as a song sung by Andy Lau since the search result is found in Record 1 of FIG. 3B, while "Days When We Were Together" (i.e., ""一起走過的日子 "") may be recognized as a song (but a song "When We Were Together" sung by the singer "Days") since there is a search result found in Record 11 of FIG. 3B. Additional information of these two comparison results (e.g., lyrics, preference, and/or popularity of "Days When We Were Together") may be obtained from Records 1 and 11. Obviously, the disclosed natural language comprehension system 100/520/520' are capable of distinguishing different requests following the same sentence pattern by employing a full-text search to the disclosed structured database 220, because the disclosed structured database 220 stores a plurality of records each further stores data collectively demonstrate to which category of the record belongs. Moreover, the disclosed natural language comprehension system 100/520/520' may be employed in different language systems (e.g., Cantonese, Shanghai dialect, or even English, Japanese . . . etc.) to distinguish different users' requests by following the same sentence pattern as long as a full-text search is performed to the disclosed structured database 220 with each record storing data collectively describing what category of the record is. The invention is not limited to those presented embodiments.

In step S606, the natural language comprehension system 520 selects at least one first report answer 511 from the candidate list and outputs a first speech response 507 associated with the first report answer 511. According to the present embodiment, the natural language comprehension system 520 arranges the report answers in the candidate list according to a priority and selects the report answer from the candidate list according to the priority, thereby outputting the first speech response 507.

For instance, if the first keyword 509 is "Romance of the Three Kingdoms", and if the natural language comprehension system 520 finds a number of records (e.g., 20) related to "Romance of the Three Kingdoms" and "books", several records related to "Romance of the Three Kingdoms" and "music" (e.g., 18), and few records related to the "Romance of the Three Kingdoms" and "TV drama" (e.g., 10), the natural language comprehension system 520 considers the "book of Romance of the Three Kingdoms" as the first report answer (the report answer with the highest priority), the "music of Romance of the Three Kingdoms" as the second report answer (the report answer with the second highest priority), and the "TV drama of Romance of the Three Kingdoms" as the third report answer (the report answer with the third highest priority). That is, the priority is determined by the gathering statistics among all searched records. Certainly, in case the first report answer corresponding to the "book of Romance of the Three Kingdoms" refers to more than one record, another priority (e.g., the number of selecting times or the largest value among all the popularity fields 316) may be used to select one record as the first report answer 511, which is already described above and thus will not be explained again.

In step S608, the speech sampling module 510 receives a second speech input 501', and the natural language comprehension system 520 parses the second speech input 501' to determine whether the selected first report answer 511 is correct. The speech sampling module 510 parses the second speech input 501' to obtain a second keyword 509' included in the second speech input 501', wherein the second keyword 509' refers to a keyword further provided by the user, such as time, intention, category or knowledge field, and so forth. When the second keyword 509' included in the second speech input 501' does not comply with the intention data in the first report answer 511, the natural language comprehension system 520 determines the previously selected first report answer 511 is incorrect. The way of determining whether the second request information 503' of the second speech input 501' "confirms" or "negates" the first speech response 507 is described above and will not be further explained here.

Specifically, the second speech input 501' parsed by the natural language comprehension system 520 may include or may not include a definite second keyword 509'. For instance, the user's input received by the speech sampling module 510 may be "I don't mean the book of Romance of the Three Kingdoms" (scenario A), "I don't mean the book of Romance of the Three Kingdoms. I do mean the TV drama of Romance of the Three Kingdoms" (scenario B), or "I do mean the TV drama of Romance of the Three Kingdoms" (scenario C). The second keywords 509' in the scenario A are "don't," "Romance of the Three Kingdoms," and "book"; the second keywords 509' in the scenario B are "don't," "Romance of the Three Kingdoms," "book," "do," "Romance of the Three Kingdoms," and "TV drama"; while the second keywords 509' in the scenario C are "do," "Romance of the Three Kingdoms," and "TV drama," for instance. For descriptive purposes, only the scenarios A, B, and C are exemplified herein, while the invention is not limited to those presented embodiments.

The natural language comprehension system 520 determines whether the relevant intention data in the first report answer 511 are correct according to the second keywords 509' included in the second speech input 501'. That is, if the first report answer 511 is determined to be "the book of Romance of the Three Kingdoms," and the second keywords 509' are "Romance of the Three Kingdoms" and "TV drama," the natural language comprehension system 520 determines that the relevant intention data (i.e., the user intends to read the "book" of Romance of the Three Kingdoms) in the first report answer 511 do not match the second keywords 509' included in the second speech input 501' (i.e., the user intends to watch the "TV drama" of Romance of the Three Kingdoms), and therefore the natural language comprehension system 520 determines that the first report answer 511 is incorrect. Similarly, if the first report answer 511 is determined to be "the book of Romance of the Three Kingdoms," and the second keywords 509' are "don't," "Romance of the Three Kingdoms," and "book," the natural language comprehension system 520 also determines that the first report answer 511 is incorrect.

After the natural language comprehension system 520 parses the second speech input 501' and determines that the first report answer 511 previously output to the user is correct, in step S610, the natural language comprehension system 520 responds to the second speech input 501'. For instance, if the second speech input 501' from the user is "yes, I mean the book of Romance of the Three Kingdoms,"

the natural language comprehension system 520 may output the second speech response 507' indicating "in the process of opening the book of Romance of the Three Kingdoms." Alternatively, while the natural language comprehension system 520 is outputting the second speech response 507', the natural language comprehension system 520 directly loads file contents of the book "Romance of the Three Kingdoms" through a processing unit (not shown).

After the natural language comprehension system 520 parses the second speech input 501' and determines the previously first speech response 507 (i.e., the report answer 511) is incorrect, in step S612, the natural language comprehension system 520 selects from the candidate list a report answer other than the first report answer and then outputs the second speech response 507' according to currently selected report answer. At this time, if the second speech input 501' provided by the user does not contain a definite second keyword 509' (e.g., the second speech input 501' in the scenario A), the natural language comprehension system 520 may, according to the priority, select from the candidate list the report answer having the second highest priority. By contrast, if the second speech input 501' contains definite second keywords 509' (e.g., the second speech inputs 501' in the scenarios B and C), the natural language comprehension system 520 may, according to the second keywords referred by the user, select corresponding report answer from the candidate list.

If the second speech input 501' provided by the user contains definite second keywords 509' (e.g., the second speech inputs 501' in the scenario B and C), but the natural language comprehension system 520 does not find any report answer corresponding to the second keywords 509 in the candidate list, the natural language comprehension system 520 then outputs the third speech response, such as "no such a book is found" or "I have no idea" to the user.

Another embodiment is further exemplified below to enable people skilled in the art to more detailed comprehend the method for correcting the speech response and the natural language dialogue system described herein.

Firstly, if the first speech input 501 received by the speech sampling module 501 is "I want to see the Romance of the Three Kingdoms" (step S602), the natural language dialogue system 520 parses the first speech input 501 to obtain the first keywords 509 "see" and "Romance of the Three Kingdoms" and acquires a candidate list with a plurality of first report answers. Each of the first report answers has relevant keywords and other data (which may be stored in the content field 306 shown in FIG. 3A/3B or may be parts of the value field 312 of each record 302) (step S604), as shown in Table 1. Here, it is assumed that the search result respectively includes one book of "the Romance of the Three Kingdoms," one TV drama of "the Romance of the Three Kingdoms," one music of "the Romance of the Three Kingdoms," and one movie of "the Romance of the Three Kingdoms."

TABLE 1

| | Candidate List | Keyword | Other Data |
| --- | --- | --- | --- |
| Report Answer A | Whether to display the book of "the Romance of the Three Kingdoms" | Book | Luo Guanzhong the Ming Dynasty Print Version |
| Report Answer B | Whether to play the TV drama of "the Romance of the Three Kingdoms" | TV Drama | TV Station Cast Number of Episodes |

TABLE 1-continued

| | Candidate List | Keyword | Other Data |
| --- | --- | --- | --- |
| Report Answer D | Whether to play the music of "the Romance of the Three Kingdoms" | Music | Vocal Lyrics |
| Report Answer E | Whether to play the film of "the Romance of the Three Kingdoms" | Film | Cast Theatrical Release Director |

The natural language comprehension system 520 then selects the desired report answer from the candidate list. If the natural language comprehension system 520 selects the report answer A as the first report answer 511 from the candidate list according to orders (e.g., from report answer A to report answer E), the natural language comprehension system 520 in step S606 outputs "whether to display the book of Romance of the Three Kingdoms" as the first speech response 507, for instance.

At this time, if the second speech input 501' received by the speech sampling module 510 is "yes," (step S608), the natural language comprehension system 520 determines the report answer A is correct. Besides, the natural language comprehension system 520 outputs another speech response 507 "please wait" (i.e., the second speech response 507') and loads the contents of the book of Romance of the Three Kingdoms through a processing unit (not shown) (step S610).

However, if the second speech input 501' received by the speech sampling module 510 is "I don't mean the book of Romance of the Three Kingdoms," (step S608), the natural language comprehension system 520 determines that said report answer A is incorrect. Next, the natural language comprehension system 520 selects another report answer as the second report answer 511' from the report answers B to E in the candidate list, e.g., "whether to play the TV drama of Romance of the Three Kingdoms" in the report answer B. If the user continues to answer "I don't mean the TV drama of Romance of the Three Kingdoms," the natural language comprehension system 520 selects one of the remaining report answers as the report answer. If all of the report answers A to E are already provided to the user by the natural language comprehension system 520 and none of these report answers corresponds to the speech input 501 from the user, the natural language comprehension system 520 may output a speech response 507 "no data are found" to the user (step S612).

According to another embodiment, in step S608, if the second speech input 501' delivered from the user to the speech sampling module 510 is "I mean the comics of Romance of the Three Kingdoms," the natural language comprehension system 520 may directly output the second speech response 507' indicating "no data are found" because no report answer regarding the comics is included in the candidate list.

In light of the foregoing, the natural language comprehension system 520 is able to output the first speech response 507 corresponding to the first speech input 501 from the user. If the first speech response 507 output by the natural language comprehension system 520 does not match the first request information 503 of the first speech input 501 from the user, the natural language comprehension system 520 may correct the answer shown in this first speech response 501 and further outputs associated second speech response 507' (that may relatively conform to the first request information 503 of the user than the previous one) according to the second speech input 501' subsequently provided by the user. Advantageously, in the event that the user is still dissatisfied with the report answer provided by the natural language comprehension system 520, the natural language comprehension system 520 may automatically correct the report answer and provide a new speech response to the user, so as to facilitate the user in dialogue with of the natural language comprehension system 520.

It should be mentioned that the natural language comprehension system 520 may arrange the report answers in the candidate list under different priority in steps S606 and S612 depicted in FIG. 6, and the natural language comprehension system 520 may select required report answer from the candidate list according to different priority and then output the speech response corresponding to the selected report answer.

For instance, the natural language comprehension system 520 may determine the priority of the first report answer 511 in the candidate list according to a public usage habit (e.g., references to values associated with the public, i.e., the values stored in the preference field 318 and the dislike field 320 shown in FIG. 3B if these fields are separated to store preferences of individual user and the public). The more often the first report answer 511 is selected and used by the public, the higher priority the report answer has. The first keyword 509 is again exemplified by using "Romance of the Three Kingdoms," and the report answers found by the natural language comprehension system 520 are assumed to be the TV drama, the book, and the music of "Romance of the Three Kingdoms." If "Romance of the Three Kingdoms" frequently refers to the book of "Romance of the Three Kingdoms" by the public (e.g, 20 records relating to book), sometimes refers to the TV drama of "Romance of the Three Kingdoms" (e.g, 18 records relating to TV drama), and scarcely refers to the music of "Romance of the Three Kingdoms" (e.g, 10 records relating to music), the values stored in the popularity field 316 shows that the public prefers to read the "book" of "Romance of the Three Kingdoms" has the largest value such that the natural language comprehension system 520 arranges the report answers in the order of "book," "TV drama," and "music" according to the priority determined by the public usage habit. That is, the natural language comprehension system 520 firstly selects "the book of Romance of the Three Kingdoms" as the first report answer 511 and outputs associated first speech response 507 according to the first report answer 511.

The natural language comprehension system 520 may also determine the priority of the report answers according to a user's habit merely (e.g., references to values associated with an individual user, i.e., the values stored in the preference field 318 and the dislike field 320 shown in FIG. 3B if these fields are separated to store preferences of individual user and the public). Particularly, the natural language comprehension system 520 may store the speech inputs (including the first speech input 501, the second speech input 501', or any other speech input) from the user into a properties database (as exemplarily shown in FIGS. 7A/7B), and the properties database may be stored in a storage device, e.g., a hard drive. The properties database may include the first keywords 509 obtained when the natural language comprehension system 520 parses the speech input 501 of the user, and the properties database may also include response records (including the user's preferences and/or habits) generated by the natural language comprehension system 520. The way of storing and capturing the user's preferences/habits will be shown below with references to FIGS. 7A/7B/8. Besides, in an embodiment, when the values stored in the popularity field 316 shown in FIG. 3B are related to the user's habit (e.g., the number of times of the matched conditions), the values stored in the popularity field 316 may be employed to determine use's preference or priority. Therefore, the natural language comprehension system 520 may select the report answer according to the priority corresponding to the recorded user's preference or other information stored in the properties database 730, and thereby output the speech response 507 relatively conforms to the speech input 501 from the user. For instance, in FIG. 3B, the values stored in the popularity field 316 in each record 8/9/10 are 2/5/8, which respectively indicates the number of times the "book," the "TV drama," and the "film" of "Romance of the Three Kingdoms" matching with the user's speech inputs is 2/5/8. Therefore, the report answer corresponding to the "film of Romance of the Three Kingdoms" is selected at first.

The natural language comprehension system 520 may select the report answer according to a user's preference. For instance, when the user talks to the natural language comprehension system 520 and he/she frequently mentions "I want to read the book of Romance of the Three Kingdoms," sometimes mentions "I want to watch the TV drama of Romance of the Three Kingdoms," and hardly mentions "I want to listen to the music of Romance of the Three Kingdoms". For example, there are 20 records regarding "the book of Romance of the Three Kingdoms" (shown in the preference field 318 in the record 8 of FIG. 3B), 8 records regarding "the TV drama of Romance of the Three Kingdoms" (shown in the preference field 318 in the record 9 of FIG. 3B), and 1 record regarding "the music of Romance of the Three Kingdoms" (not shown in FIG. 3B). The report answers in the candidate list are then arranged in the order of "the book of Romance of the Three Kingdoms," "the TV drama of Romance of the Three Kingdoms," and "the music of Romance of the Three Kingdoms". In other words, when the first keyword 509 is "Romance of the Three Kingdoms," the natural language comprehension system 520 firstly selects "the book of Romance of the Three Kingdoms" as the first report answer 511 and outputs corresponding first speech response 507 according to this selected first report answer 511.

Note that the natural language comprehension system 520 may determine the priority of the report answers according to a user's preference. Specifically, the user's dialogue database may store the keywords used by the user, such as "like," "idol," "hate," "dislike," etc. According to the number of the registered keywords, the natural language comprehension system 520 may arrange the report answers of the candidate list in a certain order. For instance, if the number of the recorded keyword "like" in a specific report answer is significant large, this specific report answer is selected firstly. Alternatively, if the number of the registered keyword "hate" in a specific report answer is significant large, associated report answer may selected later than others.

For instance, when the user talks to the natural language comprehension system 520 and he/she frequently mentions "I dislike watching the TV drama of Romance of the Three Kingdoms," sometimes mentions "I dislike listening to the music of Romance of the Three Kingdoms," and seldom mentions "I dislike reading the book of Romance of the Three Kingdoms". For example, there may be 20 records regarding "I dislike watching the TV drama of Romance of the Three Kingdoms" (shown in the dislike field 320 in the record 9 of FIG. 3B), 8 records regarding "I dislike listening to the music of Romance of the Three Kingdoms" (not shown in FIG. 3B), and 1 record regarding "I dislike reading the book of Romance of the Three Kingdoms" (shown in the dislike field 320 in the record 8 of FIG. 3B). The report answers in the candidate list are then arranged in the order of "the book of Romance of the Three Kingdoms," "the TV drama of Romance of the Three Kingdoms," and "the music of Romance of the Three Kingdoms" according to the priority. That is, if the first keyword 509 is "Romance of the Three Kingdoms," the natural language comprehension system 520 selects the book of "Romance of the Three Kingdoms" as the first report answer 511 and outputs corresponding first speech response 507 relating to the first report answer 511. According to an embodiment, a "dislike field 320" may be added to the popularity field 316 shown in FIG. 3B for recording the "degrees of dislike" of the user. In another embodiment, when a user's "dislike" information with respect to a certain record is parsed, one or another numeric value may be directly subtracted from the popularity field 316 (or the preference field 318) in corresponding record, so as to register the user's preference without any additional field. Any possible way of registering the user's preferences is applicable to an embodiment of the invention and should not be construed as a limitation to the invention. Different embodiments of providing the report answer and the speech response according to other ways of registering and employing the user's preferences as well as the user/public usage habits and preferences will be further given below with reference to FIG. 7A/7B/8.

In another aspect, the natural language comprehension system 520 may determine the priority of at least one report answer according to a user's speech input that is input before the natural language dialogue system 500 provides the report answer, i.e., before the first speech input 501 is broadcast (at this time, the user is not aware what report answer may be selected and provided by the natural language dialogue system 500). Namely, if a speech input (e.g., the fourth speech input) is received by the speech sampling module 510 earlier than the time the first speech input 501 is broadcast, the natural language comprehension system 520 is also able to parse fourth keywords in the fourth speech input, to select from the candidate list the fourth report answer corresponding to the fourth keywords according to the priority, and output the fourth speech response according to the fourth report answer.

For instance, it is assumed that the natural language comprehension system 520 receives the first speech input 501 indicating "I want to watch TV drama", and after a few seconds the natural language comprehension system 520 further receives the fourth speech input 501 indicating "Play Romance of the Three Kingdoms for me." At this time, the natural language comprehension system 520 is able to recognize the first keywords 509 "TV drama" in the first speech input 501 and then recognize the fourth keywords "Romance of the Three Kingdoms" in the fourth speech input. Finally, the natural language comprehension system 520 selects from the candidate list the report answers corresponding to "TV drama" and "Romance of the Three Kingdoms" as the fourth report answer and outputs the corresponding fourth speech response according to the fourth report answer.

As is discussed above, the natural language comprehension system 520 is able to output the speech response (corresponding to the user's speech input) in reply to the user's request information according to the public's/individual user's habits such as preferences/dislikes, or the context of the dialogue. The natural language comprehension system 520 may arrange the report answers in the candidate list according to different priorities determined by the public's/individual user's habits such as preferences/dislikes, the context of the dialogue, and so on. If the speech input from the user is unclear, the natural language comprehension system 520 is able to determine the user's intention included in the user's speech input 501 according to the public's/individual user's habits such as preferences/dislikes, or the context of the dialogue (e.g., the category/knowledge field of the keywords 509 relating to the first speech input 501). That is, if a report answer is close to the previous intention of the user or the intention mostly accepted by the public, the natural language comprehension system 520 may firstly select this report answer. Thereby, the speech response output by the natural language dialogue system 500 is more likely to correspond to the request information by the user.

According to the method for correcting the speech response and the natural language dialogue system described in the present embodiment, the natural language dialogue system is able to output the first speech response 507 corresponding to the first speech input 501 from the user. If the first speech response 507 output by the natural language dialogue system neither matches with the first request information 503 of the first speech input 507 from the user nor matches with the first keyword 509, the natural language dialogue system corrects the previously output first speech response 507 and further outputs the second speech response 507' (that may relatively conforms to the first request information 503 of the user) according to the second speech input 501' subsequently provided by the user. In addition, the natural language dialogue system may arrange report answers according to different priorities determined by the public's/individual user's habits such as preferences/dislikes, the context of the dialogue, and so on, and thereby the natural language dialogue system is able to output corresponding speech response to the user. In the event that the user is dissatisfied with the report answer provided by the natural language dialogue system, the natural language dialogue system may automatically revise the report answer according to each request information delivered by the user and then provide a new speech response to the user, so as to facilitate the user in dialogue with the natural language dialogue system.

Different embodiments of providing report answers and the speech responses according to the context of the dialogue, the public's/individual user's habits such as preferences/dislikes, will be further given below, and the structure and the components of the natural language comprehension system 100 and the structured database 220 are applied in these embodiments for the purpose of explanations.

Figure 7A:
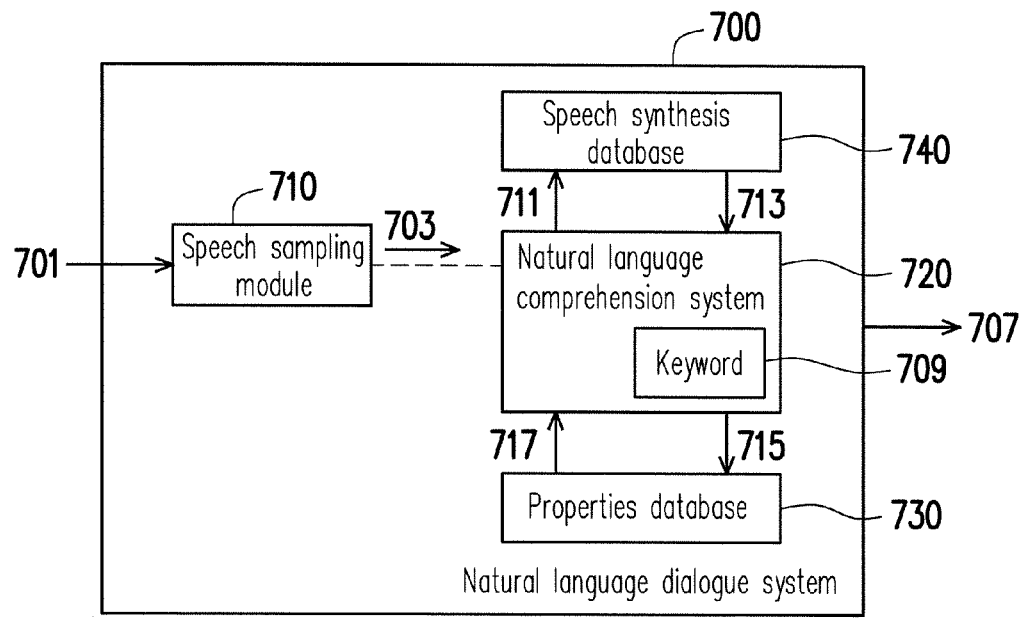
FIG. 7A is a block diagram of the invention illustrating a natural language dialogue system used for outputting report answers according to user's preferences.

FIG. 7A is a block diagram illustrating a natural language dialogue system according to an embodiment of the invention. With reference to FIG. 7A, the natural language dialogue system 700 includes a speech sampling module 710, a natural language comprehension system 720, a properties database 730, and a speech synthesis database 740. As a matter of fact, the speech sampling module 710 depicted in FIG. 7A contains the same configuration as the speech sampling module 510 shown in FIG. 5A and thus executes the same functions. Similarly, both the natural language comprehension system 720 and the natural language comprehension system 520 have the same configurations and thus execute the same functions. Besides, when the natural language comprehension system 720 parses the request information 703, the user's intention may be obtained by means of a full-text search conducting to the structured database 220 as shown in FIG. 1, which has been already described above with references to FIG. 1 and thus will not be further explained. The properties database 730 serves to store a user's preference 715 transmitted by the natural language comprehension system 720 or to provide a user's preference 717 to the natural language comprehension system 720, which will be illustrated hereinafter. The speech synthesis database 740 is equivalent to the speech synthesis database 530 for providing speech outputs to users. In the present embodiment, the speech sampling module 710 receives the speech input 701 (i.e., the first/second speech input 501/501' shown in FIG. 5A/B) from a user, and the natural language comprehension system 720 parses request information 703 (i.e., the first/second request information 503/503' shown in FIG. 5A/B) included in the speech input 701 and outputs the corresponding speech response 707 (i.e., the first/second speech response 507/507' shown in FIG. 5A/B). The components of the natural language dialogue system 700 may be configured within an identical machine, which should not be construed as a limitation to the invention.

The natural language comprehension system 720 receives the request information 703 that is parsed from speech the input 701, and the natural language comprehension system 720 generates a candidate list including at least one report answer according to one or more keywords 709 included in the speech input 701. Next, the natural language comprehension system 720 selects from the candidate list one of the report answers as the report answer 711 matching with the keyword 709 and thereby searches the speech synthesis database 740 to find the speech 713 in response to this selected report answer 711. At last, the natural language comprehension system 720 outputs a speech response 707 according to the speech 713. According to the present embodiment, the natural language comprehension system 720 may be implemented by hardware circuitry constituted by means of logic gates or computer programming codes, which should not limit claims scopes of the present invention.

Figure 7B:
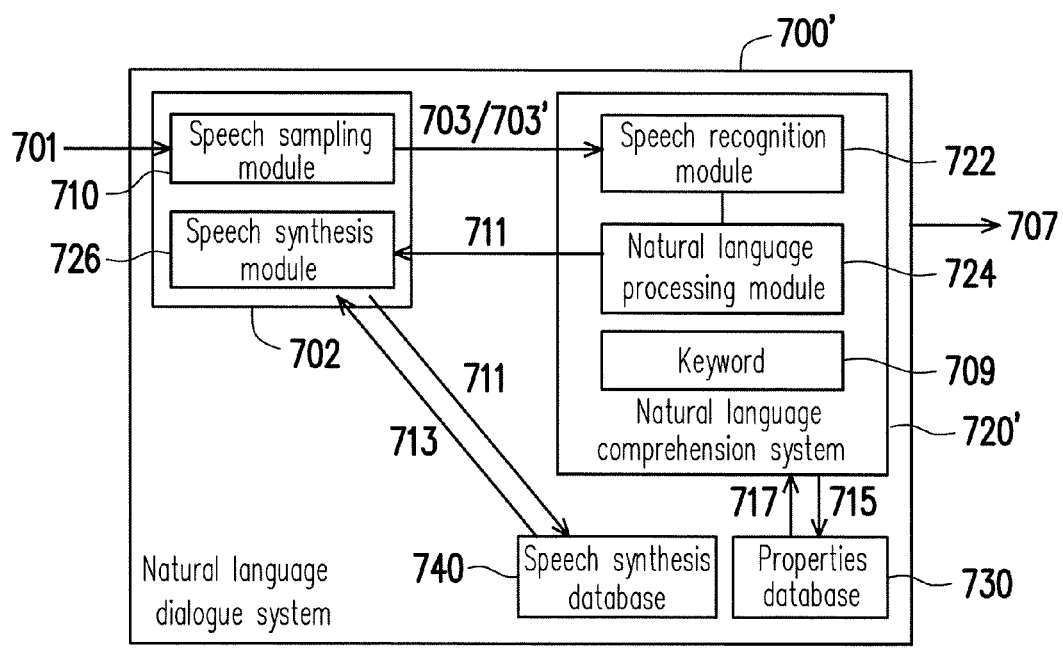
FIG. 7B is another block diagram of the invention illustrating a natural language dialogue system used for outputting report answers according to user's preferences.

FIG. 7B is a block diagram illustrating a natural language dialogue system 700' according to another embodiment of the invention. The natural language comprehension system 720' depicted in FIG. 7B may include a speech recognition module 722 and a natural language processing module 724, wherein a speech sampling module 710 and a speech synthesis module 726 may be integrated into an speech processing module 702. The speech recognition module 722 receives from the speech sampling module 710 request information 703 parsed from the speech input 701 and then converts the request information 703 into one or more keywords 709. The natural language processing module 724 processes the keywords 709 to obtain at least one candidate list and selects from the candidate list one report answer as the report answer 711 that relatively conforms to the speech input 701. The report answer 711 is parsed and obtained by the natural language comprehension system 720' internally, and therefore the parsed result must be converted as user's accessible information such as texts or speeches before outputting to the user. The speech synthesis module 726 searches the speech synthesis database 740 according to the report answer 711, wherein the speech synthesis database 740 records (mapping) relationships between texts and corresponding speech information, so as to facilitate the speech synthesis module 726 to find out associated speech 713 corresponding to the report answer 711 and thereby create the synthesized speech response 707. The synthesized speech response 707 may then be output by the speech synthesis module 726 through the speech output interface (not shown) and broadcast to the user, and the speech output interface may be a speaker, an amplifier, a headset, or another similar device. Please note the natural language comprehension system 720 in FIG. 7A embeds the speech synthesis module 726 therein, with the structural design similar to that shown in FIG. 5B (but the speech synthesis module 726 is not shown in FIG. 7A). According to the report answer 711, the speech synthesis module 726 searches the speech synthesis database 740 to obtain the speech 713 by which the synthesized speech response 707 can be created.

In the present embodiment, the speech recognition module 722, the natural language processing module 724, and the speech synthesis module 726 in the natural language comprehension system 720 may be respectively equivalent to the speech recognition module 522, the natural language processing module 524, and the speech synthesis module 526 shown in FIG. 5B, and these equivalent modules are capable of performing the same functions. Besides, the speech recognition module 722, the natural language processing module 724, the speech synthesis module 726, and the speech sampling module 710 may be configured into an identical machine. In other embodiments of the invention, the speech recognition module 722, the natural language processing module 724, and the speech synthesis module 726 may be separately arranged in different machines (e.g., a computer system, a server, or other similar devices/systems). For instance, in the natural language comprehension system 720' shown in FIG. 7B, the speech synthesis module 726 and the speech sampling module 710 may be configured in the same machine 702, while the speech recognition module 722 and the natural language processing module 724 may be configured in another machine. In FIG. 7B, the speech synthesis module 726 and the speech sampling module 710 are configured in the same machine 702, and therefore the natural language comprehension system 720' is required to transmit the report answer 711 to the machine 702, and the speech synthesis module 726 transmits the report answer 711 to the speech synthesis database 740 to find the corresponding speech 713 by which the speech response 707 is generated. In another aspect, when the speech synthesis module 726 calls the speech synthesis database 740 according to the report answer 711, the format of the report answer 711 may be converted, and the call to the speech synthesis database 740 may be made through the interface regulated by the speech synthesis database 740. This is well known to people skilled in the art and thus will not be further explained.

Figure 8A:
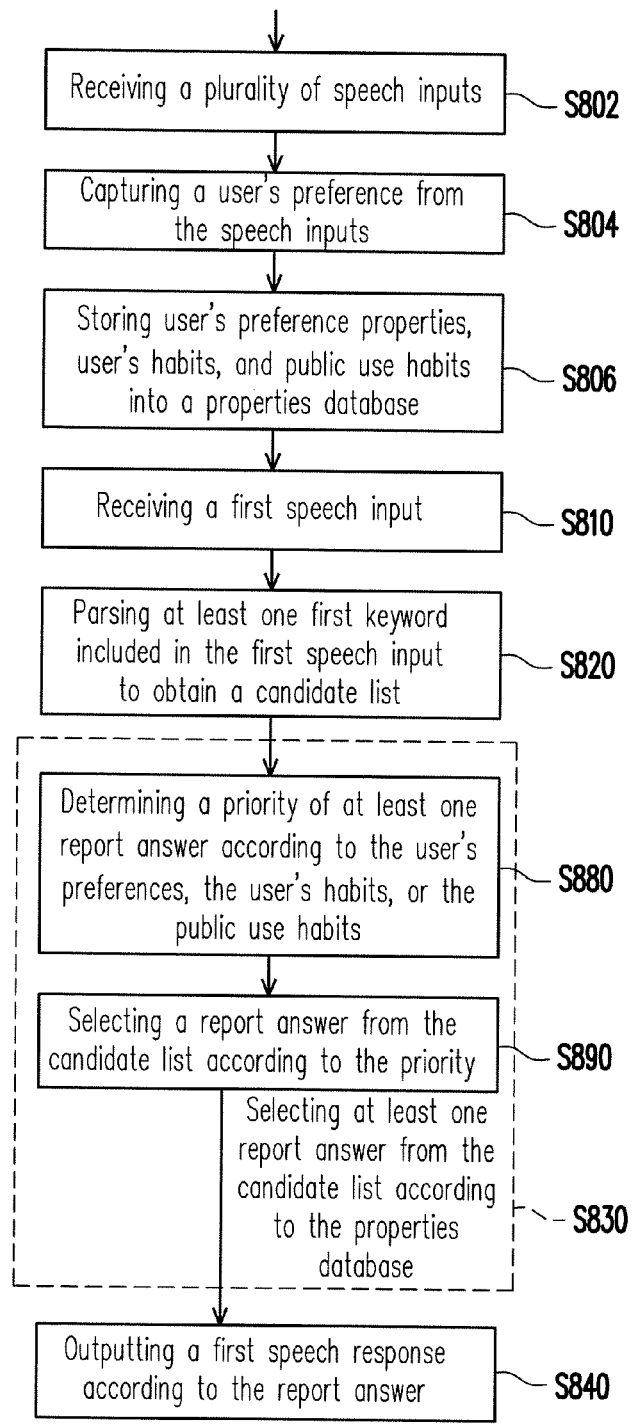
FIG. 8A is a flowchart illustrating a natural language dialogue method for outputting report answers according to user's preferences.

A natural language dialogue method will be described with reference to the natural language dialogue system 700 shown in FIG. 7A. FIG. 8A is a flowchart illustrating a natural language dialogue method according to an embodiment of the invention. For the sake of explanations, only operations within the natural language dialogue system 700 of FIG. 7A are shown, but the disclosed method is also applicable to the natural language dialogue system 700' shown in FIG. 7B. In comparison to FIGS. 5 and 6 showing the output information is automatically revised according to speech inputs from the user, FIG. 7A/7B/8A show that the user's preference 715 is recorded in the properties database 730, one report answer is selected as the report answer 711 from the candidate list according to the user's preference, and then the speech response corresponding to the report answer 711 is output to the user. In fact, those embodiments shown in FIGS. 5/6 and FIGS. 7A/7B/8 may be applied individually or collectively, which should not be construed as a limitation to the invention.

With reference to FIGS. 7A and 8A, in step S810, the speech sampling module 710 receives the speech input 701. For instance, the speech input 701 is a user's speech, and the speech input 701 may also include request information 703 from the user. Specifically, the speech input 701 from the user may be an interrogative sentence, an imperative sentence, or any sentence having other request information such as "I want to read the Romance of the Three Kingdoms," "I want to listen to the song of Forget-Love Potion," or "what is the temperature today", as mentioned above. Note that steps S802 to S806 are operations the natural language dialogue system 700 stores user preferences 715 based on user's previous speech inputs, and subsequent steps S810 to S840 are operations performed on those previously-stored user's preferences in the properties database 730. Details of the steps S802 to S806 will be shown later in the disclosure, while the steps S820 to S840 are described below.

In steps S820, the natural language comprehension system 720 parses at least one first keyword 709 included in the first speech input 701 to derive a candidate list having at least one report answer. Specifically, the natural language comprehension system 720 parses the speech input 701 to obtain one or more keywords 709 included in the speech input 701. For instance, when the user's speech input 701 indicates "I want to see the Romance of the Three Kingdoms," the keywords 709 parsed and obtained by the natural language comprehension system 720 are "Romance of the Three Kingdoms" and "see." As described above, the natural language dialogue system 700 may further determines whether the user intends to read the book, watch the TV drama, or watch the film. When the user's speech input 701 indicates "I want to listen to the song of Forget-Love Potion," the keywords 709 parsed and obtained by the natural language comprehension system 720 are "Forget-Love Potion," "listen," and "song." As described above, the natural language dialogue system 700 may further determine whether the user intends to listen to the song performed by Andy Lau or E-jun Lee. According to the keywords 709, the natural language comprehension system 720 may perform a full-text search in the structured database and obtain at least one search result (e.g., at least one record shown in FIG. 3A/3B) as the report answer in the candidate list. Since one keyword 709 may relate to different categories (such as films, books, music, or games), and the same category may be further categorized into different sub-fields (e.g., different authors of one film or one book, different singers performing one song, different versions of one game, and so on), the natural language comprehension system 720 may obtain one or more search results corresponding to the keyword 709 after parsing the user's speech input 701 (e.g., performing a full-text search in the structured database 220), and the search results not only include the keyword 709 but also contain other information as exemplified in Table 1. Therefore, if the first speech input 701 from the user has a plurality of keywords 709, it indicates that the request information 703 from the user is of high clarity, such that the natural language comprehension system 720 is able to parse the first speech input 701 and then obtain associated search results close to the request information 703. If the natural language comprehension system 720 is able to obtain a search result completely matching with the first speech input, it indicates that the correct report answer desired by the user is found.

For instance, when the keywords 709 are "Romance of the Three Kingdoms", the search results obtained by the natural language comprehension system 720 may be records related to " . . . 'Romance of the Three Kingdoms' . . . 'TV drama'" and " . . . 'Romance of the Three Kingdoms' . . . 'book'", wherein the "TV drama" and the "book" are the user's intentions indicated by the report answers. Additionally, when the keywords 709 are "'Forget-Love Potion' and 'music'", the user's intentions parsed and interpreted by the natural language comprehension system 720 may be records related to " . . . 'Forget-Love Potion' . . . 'music' . . . 'Andy Lau'" and " . . . 'Forget-Love Potion' . . . 'music' . . . 'E-jun Lee'", wherein "Andy Lau" and "E-jun Lee" are the search results representing the user's intentions. That is, after the natural language comprehension system 720 conducts the full-text search in the structured database 220, each search result may include the keyword 709 and other information (exemplified in Table 1) related to the keyword 709, and the natural language comprehension system 720 then converts the obtained search results into the candidate list including at least one report answer, so as to perform following steps.

In step S830, the natural language comprehension system 720 selects the report answer 711 from the candidate list according to the user's preference 717 sent by the properties database 730 and then outputs the speech response 707 according to the report answer 711. The user's preference 717 is obtained by organizing the user's preferences 715 stored in the properties database 730, which will be explained later. According to the present embodiment, the natural language comprehension system 720 selects the report answer 711 from the candidate list according to a priority (which will be described hereinafter). In step S840, the speech response 707 is output according to the report answer 711.

According to an embodiment of the invention, the priority may be determined by the quantity of the search results. For instance, if the keyword 709 is "Romance of the Three Kingdoms", and if the natural language comprehension system 720 finds the most records related to "Romance of the Three Kingdoms" and "books", less records related to "Romance of the Three Kingdoms" and "music", and the least records related to "Romance of the Three Kingdoms" and "TV drama", the natural language comprehension system 720 considers the "book of Romance of the Three Kingdoms" as the first report answer with the highest priority (e.g., all search results related to the "book of Romance of the Three Kingdoms" are organized to create a candidate list, and those report answers in the candidate lists are further arranged according to a priority determined by the values in the preference field 316), the "music of Romance of the Three Kingdoms" as the second report answer (the report answer with the second highest priority), and the "TV drama of Romance of the Three Kingdoms" as the third report answer (the report answer with the third highest priority). It should be mentioned that the priority is determined not only by the quantity of the search results but also by the public's/individual user's habits such as preferences/dislikes, which will be further described below.

Another embodiment is given below to enable people skilled in the art to further comprehend the natural language dialogue method and the natural language dialogue system described herein.

It is first assumed that the first speech input 701 received by the speech sampling module 710 is "I want to see the Romance of the Three Kingdoms" (step S810), the natural language dialogue system 700 parses the first speech input 701 to obtain the first keywords 709 "see" and "Romance of the Three Kingdoms" and then acquires a candidate list with a plurality of report answers. Each of the report answers has relevant keywords (step S820) and other data, as shown in the above Table 1.

The natural language comprehension system 720 then selects the desired report answer from the candidate list. If the natural language comprehension system 720 selects the report answer A (shown in Table 1) as the first report answer 711 from the candidate list, the natural language comprehension system 720 in steps S830 to S840 outputs "whether to display the book of the Romance of the Three Kingdoms" as the first speech response 707, for instance.

As described above, the natural language comprehension system 720 may arrange report answers in the candidate list according to another priority determined in a different manner and thereby output a speech response 707 corresponding to the report answer 711. For instance, the natural language comprehension system 720 may determine the user's preference according to a plurality of user's dialogue records, such as positive/negative expressions used by the user. Additionally, the natural language comprehension system 720 may determine the priority of the report answer 711 according to the user's preference 717. Before explanations of the positive/negative expressions used by the user are provided, the way of storing the preference/dislike, or the habit of the user or the public as the user's preference 715 is described.

Specifically, steps S802 to S806 are performed to store the user's preference 715. In an embodiment of the invention, before the current speech input 701 is received (in step S810), a plurality of previous speech inputs 701 (i.e., those previous dialogue records) are received in step S802, associated user's preferences 715 are captured according to those previous speech inputs 701 (step S804), and the captured user's preferences 715 are stored in the properties database 730. As a matter of fact, the user's preference 715 may also be stored into the structured database 220, and the properties database 730 may be integrated into the structured database 220. For instance, in an embodiment of the invention, the user's preference may be registered in the popularity field 316 shown in FIG. 3B. Since the way of registering information in the popularity field 316 is already explained above (e.g., once a specific record 302 is matched, the value in the popularity field increases one automatically), no further explanation is provided hereinafter. Certainly, additional field may be configured in the structured database 220 to store the user's preference 715. For instance, a keyword (e.g., "Romance of the Three Kingdoms") and user's preferences (e.g., when the user mentions "like" or other positive expressions and "dislike" or other negative expressions, the values in the preference field 318 and the dislike field 320 in FIG. 3B may increase one, respectively) may be integrated so as to calculate the quantity of the user's preferences (e.g., calculate the quantity of positive expressions and the quantity of negative expressions). When the natural language comprehension system 720 searches the user's preference 717 in the structured database 200, the natural language comprehension system 720 may directly search the values in the preference field 318 and/or the dislike field 320 (e.g., search the quantities of positive expressions and negative expressions, respectively) and thereby determine the user's preferences (i.e., the calculated quantities of positive expressions and negative expressions may be considered as the user's reference 717 and transmitted to the natural language comprehension system 720).

The following description relates to the condition on which the user's preference 715 is stored into the properties database 730, i.e., the properties database 730 is not integrated into the structured database 220. According to an embodiment of the invention, the user's preference 715 may be stored by using keywords and in accompanied with the "degrees of preference" of the keywords. For example, the user's personal preference and dislike with respect to a specific set of keywords are registered directly in the preference field 852 and the dislike field 862 shown in FIG. 8B, and the preference field 854 and the dislike field 864 may be applied to register the public preference and dislike with respect to the specific set of keywords. For instance, in FIG. 8B, the keywords "Romance of the Three Kingdoms" and "book" stored in the record 832 correspond to values 20 and 1 respectively in the corresponding preference field 852 and the corresponding dislike field 862. The keywords "Romance of the Three Kingdoms" and "TV drama" stored in the record 834 correspond to the values 8 and 20 respectively in the corresponding preference field 852 and the corresponding dislike field 862. The keywords "Romance of the Three Kingdoms" and "music" stored in the record 836 correspond to the values 1 and 8 respectively in the corresponding preference field 852 and the corresponding dislike field 862. These all represent the degrees of the user's personal preference and dislike with respect to the specific set of keywords (e.g., a large value in the preference field 852 indicates the user's preferences for the corresponding keyword, while a large value in the dislike field 862 indicates the user's dislikes for the corresponding keyword). Besides, the values in the preference field 854 and the dislike field 864 corresponding to the record 832 are 5 and 3. Values in the preference field 854 and the dislike field 864 corresponding to the record 834 are 80 and 20. The values in the preference field 854 and the dislike field 864 corresponding to the record 836 are 2 and 10. These all represent the degrees of the public preferences and dislikes with respect to specific sets of keywords (referred to as "preference indication"). According to the user's preference, the values in the preference field 852 and the dislike field 862 may be increased. Therefore, if the user's speech input indicates "I want to watch the TV drama of Romance of the Three Kingdoms," the natural language comprehension system 720 may integrate the keywords ("Romance of the Three Kingdoms" and "TV drama") and a "preference indication" of increasing the value in the preference field 852 as the user's preference 715. The user's preference 715 is then directed to the properties database 730, and finally the properties database 730 may increase one to the value in the preference field 852 of the record 834 (since the user's intention is to watch the "TV drama" of "Romance of the Three Kingdoms" indicates the increase in the degrees of user's preference). In view of the way of registering user's preferences, if the user subsequently inputs relevant keywords, e.g., if the user's input indicates "I want to see the Romance of the Three Kingdoms," the natural language comprehension system 720 may, according to the keywords "Romance of the Three Kingdoms," find three records 832, 834, and 836 related to "Romance of the Three Kingdoms" in the properties database 730 as shown in FIG. 8B, and the properties database 730 considers the values in the preference field 852 and the dislike field 862 as the user's preference 717 and finally transfer this user's preference 717 back to the natural language comprehension system 720. Thereby, the natural language comprehension system 720 may employ the user's preference 717 as the basis for determining the user's personal preference. Undoubtedly, the properties database 730 may also consider the values in the preference field 854 and the dislike field 864 as the user's preference 717 and then transmits this user's preference 717 back to the natural language comprehension system 720. Thereby, the natural language comprehension system 720 may employ the user's preference 717 as the basis of determining the public preference. The way of employing the user's preference 717 to indicate the user's personal preferences or the public preferences should not be construed as a limitation to the invention.

In another embodiment, the values in the preference field 852 and the dislike field 862 may also determine the user's or the public's usage habits. For instance, after the natural language comprehension system 720 receives the user's preference 717, the natural language comprehension system 720 may determine the differences in the values of the preference fields 852 and 854 and/or the dislike fields 862 and 864. If the difference in the values of the preference field and the dislike field is larger than a certain threshold, it implies the user is accustomed to a specific dialogue manner. For instance, if the value in the preference field 852 is larger than the value of the dislike field 862 by 10, the user may prefer to the uses of "positive expressions" (i.e., one way of registering the "user's habit" aforementioned). In this situation, the natural language comprehension system 720 may merely select the report answer according to the value in the preference field 852. If the natural language comprehension system 720 employs the values of the preference field 854 and the dislike field 864 stored in the properties database 730, which indicates the preference records of all users are applied for determinations and associated determination results may be used as references of the public usage habits. Note that the user's preference 717 from the properties database 730 back to the natural language comprehension system 720 may simultaneously include user's personal preference (e.g., the values in the preference field 852 and the dislike field 862) and the public's preference (e.g., the values in the preference field 854 and the dislike field 864), which should not be construed as a limitation to the invention.

During the step S820 of generating the candidate list (regardless of the results being completely or partially matched), the natural language dialogue system 700 may store the user's preference 715 obtained from user's speech inputs. For instance, in step S820, once a keyword has a match with at least one record of the structured database 220, which implies the user prefers the matched record(s) (in other words, the matched record(s) may meet his/her requirement), and therefore the "keyword" and the "preference indication" may be sent to the properties database 730. After a corresponding record is found in the properties database 730, the values in the corresponding preference field 852/854 and the corresponding dislike field 862/864 in corresponding records may be changed (e.g., when the user inputs "I want to read the book of Romance of the Three Kingdoms," the value of the preference field 852/854 in the record 832 shown in FIG. 8B may increase one automatically). According to yet another embodiment, in step S830, the natural language dialogue system 700 may store the user's preference 715 after the user select one report answer. Besides, if no corresponding keyword is found in the properties database 730, a new record may be established to store the user's preference 715. For instance, if the user inputs "I want to listen to Forget-Love Potion by Andy Lau," and corresponding keywords "Andy Lau" and "Forget-Love Potion" are derived. If no corresponding keyword is found in the properties database 730 in the step of storing the user's preference, a new record 838 may be created in the properties database 730, and one may be registered as the value of the corresponding preference field 852/854. Timing and the way of storing the user's preference 715 shown aforementioned are merely exemplary, and people skilled in the art may make modifications and variations to the embodiments provide herein without departing from the spirit and scope of the invention.

Although the formats of the records 832 to 838 stored in the properties database 730 shown in FIG. 7B are different from those in the structured database 220 (as shown in FIG. 3A/3B/3C), the formats of the stored records are not limited in the invention. Besides, the way of storing data into the preference field 852/854 or the dislike field 862/864 and the way of using the stored data are described in the previous embodiments, in another embodiment of the invention, additional fields 872/874 may be further established in the properties database 730 to respectively store user's/the public's additional usage habits, e.g., those times of downloading, citing, recommending, commenting, or referring to the data associate with the record. In yet another embodiment, the times of downloading, citing, recommending, commenting, or referring to the data may also be stored in the preference fields 852/854 and/or the dislike field 862/864. For instance, as long as the user provides positive comments on a certain record or refer a certain record as others' references, the values of the preference fields 852/854 may increase one automatically. If the user provides negative comments on a certain record, the values of the dislike fields 862/864 may increase one automatically. The way of registering the number of records and the values in the fields aforementioned are not limited to those described herein. People skilled in the field should be aware that the preference field 852, the dislike field 862, and additional field 872 shown in FIG. 8B . . . etc., are merely related to the user's personal selection and preference. Accordingly, the user's personal choice/preference/dislike information may be stored into the user's mobile communication apparatus, and the data in the preference field 854, the dislike field 864 and additional field 874 and other data related to all users (or at least a specific group of users) may be stored in the server. Thereby, the storage space on the server may be economized, and the privacy of the user's personal preference may be guaranteed.

User's actual usage conditions are further described below with reference to FIG. 7A and FIG. 8B. In view of the dialogue contents in a lot of speech inputs 701, when the user talks to the natural language comprehension system 720 and he/she frequently mentions "I dislike watching the TV drama of Romance of the Three Kingdoms," sometimes mentions "I dislike listening to the music of Romance of the Three Kingdoms," and scarcely mentions "I dislike reading the book of Romance of the Three Kingdoms," e.g., there are 20 records regarding "I dislike watching the TV drama of Romance of the Three Kingdoms" (i.e., the number of the negative expressions with respect to "Romance of the Three Kingdoms" and "TV drama" shown in FIG. 8B is 20 (Record 834)) in the properties database 730, 8 records regarding "I dislike listening to the music of Romance of the Three Kingdoms" in the properties database (i.e., the number of the negative expressions with respect to "Romance of the Three Kingdoms" and "music" shown in FIG. 8B is 8 (Record 836)), and 1 record regarding "I dislike reading the book of Romance of the Three Kingdoms" (i.e., the number of the negative expressions with respect to "Romance of the Three Kingdoms" and "book" shown in FIG. 8B is 1 (Record 832)) in the properties database, the natural language comprehension system 720 sequentially arrange the report answers in the candidate list in the order of "the book of Romance of the Three Kingdoms," "the music of Romance of the Three Kingdoms," and "the TV drama of Romance of the Three Kingdoms" according to the priority.

Note that the user's preference 717 transmitted from the properties database 730 includes quantities of the three negative expressions (i.e., 20, 8, and 1). That is, if the keyword 709 is "Romance of the Three Kingdoms," the natural language comprehension system 720 selects the book of "Romance of the Three Kingdoms" as the report answer 711 and outputs corresponding speech response 707 according to the report answer 711. Although the priority described above is determined merely by the calculated quantities of the negative expressions used by the user, it should be mentioned that the calculated quantities of user's positive expressions may be independently employed to determine the priority (e.g., if the value in the preference field 852 is larger than the value in the dislike field 862 by a certain threshold).

Note that the natural language comprehension system 720 may also determine the priorities of the report answers according to both the quantities of the positive expressions and the negative expressions used by the user. In particular, the properties database 730 may store the keywords used by the user, such as "like," "idol," "hate," "dislike," etc., wherein the former two expressions are positive, while the latter two are negative. Hence, the natural language comprehension system 720 not only may compare the difference in the number of using the expression "like" and the number of using the expression "dislike", but also may directly arrange the report answers according to the priority determined by the numbers of using the positive/negative expressions corresponding to the keywords, i.e., the natural language comprehension system 720 may compare the citing number relating to positive expressions with the citing number relating to negative expressions. For instance, if the citing number relating to expression "like" in a specific report answer is significant (i.e., the citing number of the positive expressions is significantly larger, or the value in the preference field 852 is significantly larger than that in the dislike field 862), this specific report answer is selected firstly. Alternatively, if the citing number of the expression "dislike" of a specific report answer is significant (i.e., the citing number for the negative expressions is significant larger, or the value of the preference field 852 is significantly smaller than that of the dislike field 862), this specific report answer is later selected. Thereby, the natural language comprehension system 720 is able to organize the report answers so as to create a candidate list according to the priority. Some users may prefer to use positive expressions (e.g., the value in the preference field 852 is relative large), while the others may prefer to use negative expressions (the value in the dislike field 862 is relative large). Advantageously, in the previous embodiment, the user's preference 717 reflects the user's personal usage habit, and thus the report answer conforming to the user's habit may be provided for user's selections.

In addition, the natural language comprehension system 720 may also determine the priority of the report answer 711 in the candidate list according to the public's usage habits. The more often the report answer 711 is selected and used by the public, the higher priority the report answer owns (e.g., the popularity field 316 shown in FIG. 3C, or the preference/dislike fields 854/864 of FIG. 8B may be applied to keep records). The keywords 709 are exemplified as "Romance of the Three Kingdoms" here, and the report answers found by the natural language comprehension system 720 are assumed to be the TV drama, the book, and the music of "Romance of the Three Kingdoms." If "Romance of the Three Kingdoms" mentioned by the public frequently refers to the TV drama of "Romance of the Three Kingdoms," sometimes refers to the film of "Romance of the Three Kingdoms," and seldom refers to the book of "Romance of the Three Kingdoms" (e.g., when the values of the relevant records stored in the preference field 854 shown in FIG. 8B are 8, 40, and 5, respectively), the natural language comprehension system 720 arranges the report answers 711 in the order of "TV drama," "film," and "book" according to the priority determined by the public usage habit. That is, the natural language comprehension system 720 firstly selects "the TV drama of Romance of the Three Kingdoms" as the report answer 711 and then outputs corresponding speech response 707 according to the report answer 711. Please note that the popularity field 316 shown in FIG. 3C (or the preference/dislike fields 854/864 of FIG. 8B) applying to keep records may be employed as the way of arranging the report answers according to the priorities determined by the public usage habit aforementioned, and how to keep records is already provided in previous paragraphs with reference to FIG. 3C (8B) and thus will not be further described below.

The natural language comprehension system 720 may also determine the priorities of the report answers 711 according to a user's usage frequencies. Specifically, the natural language comprehension system 720 is able to register those received user's speech inputs 701 in the properties database 730, and the properties database 730 may register those keywords 709 obtained when the natural language comprehension system 720 parses the user's speech inputs 701 and may also register all the report answers 711 generated by the natural language comprehension system 720. Afterwards, the natural language comprehension system 720 may find the report answer 711 relatively conformable to the user's intention (determined by the user's speech input) according to the priority, so as to find the corresponding speech response finally. The recorded information mentioned here may include the user's preferences/dislikes/habits and even the public preferences/dislikes/habits. Please note that the popularity field 316 shown in FIG. 3C (or the preference/dislike fields 852/862 of FIG. 8B) applying to keep records may be used as the way of determining the priorities of the report answers 711 according to the user's habits described above, and how to keep records is already provided in previous paragraphs with reference to FIG. 3C (8B) and thus will not be further described below.

Briefly, the natural language comprehension system 720 may store user's preferences (e.g., positive and/or negative expressions), user's usage habits, and the public's usage habits into the properties database 730 in step S806. That is, in steps S802, S804, and S806, user's preferences 715 are learned from user's historical dialogue records (registered in the properties database 730), and the user's preferences 715 are stored into the properties database 730 (by means of the user's preference 717 feeding into the properties database 730 to modify the user's/the public's preferences). Besides, the user's/the public's usage habits are also stored into the properties database 730. Thereby, a large quantity of information in the properties database 730 (e.g., via the user's preference 717 stored into the properties database 730) may be utilized by the natural language comprehension system 720 for providing speech responses accurately.

Step S830 is further demonstrated hereinafter. After the speech input is received in step S810 and after the keywords 709 included in the speech input are parsed to derived required candidate list in step S820, the natural language comprehension system 720 in step S830 determines the priority of at least one report answer according to the user's preference 717 (step S880) which includes the user's preferences, the user's usage habits, or the public usage habits. As is described above, the priority may be determined by using the search/citing numbers, the user's or the public's positive/negative expressions, and so on. In step S890, a report answer 711 is selected from the candidate list according to a priority, and the selected report answer 711 may be the one most matched with keywords or have the highest priority. In step S840, the speech response 707 is output according to the report answer 711.

On the other hand, the natural language comprehension system 720 may determine the priority of at least one report answer according to the user's previous speech input 701. That is, if another speech input 701 (e.g., the fourth speech input) is received by the speech sampling module 710 at the time earlier than that when the speech response 707 is broadcast, the natural language comprehension system 720 is also able to parse the keyword (i.e., the fourth keyword) in the speech input 701 (i.e., the fourth speech input), select from the candidate list the report answer corresponding to the keyword as the report answer 711 according to the priority, and output the speech response 707 according to the report answer 711.

For instance, it is assumed that the natural language comprehension system 720 receives a speech input 701 "I want to watch TV drama", and after few seconds the natural language comprehension system 720 further receives another speech input 701 "play Romance of the Three Kingdoms for me." The natural language comprehension system 720 is able to recognize the keyword "TV drama" (the first keyword) from the first speech input 701; however, the natural language comprehension system 720 may recognize the keywords "Romance of the Three Kingdoms" (i.e., the fourth keywords) later. Therefore, the natural language comprehension system 720 selects the report answer corresponding to the user's intention with respect to "Romance of the Three Kingdoms" and "TV drama" from the candidate list and outputs the speech response 707 to the user according to this report answer 711.

As is discussed above, the natural language comprehension system 720 is able to output the speech response 707 (relatively conformable to the user's speech input 701) in reply to the user's request information 703 according to the public's/the user's preferences, the user's/the public's usage habits, or dialogue contexts. The natural language comprehension system 720 may sequentially arrange the report answers in the candidate list according to different priorities determined by the public's usage habits, the user's preferences, the user's personnel usage habits, the dialogue contexts, and so on. If the speech input 701 from the user is unclear, the natural language comprehension system 720 is able to refer to the user's intention included in the user's speech input 701 according to the public's usage habits, the user's preferences, the user's personnel usage habits, or the dialogue context (e.g., the category/knowledge field of the keywords 709 contained in the speech input 701). That is, the natural language comprehension system 720 may firstly select this report answer 711 having intention close to those intentions the user/public used/described/showed previously. Thereby, the speech response 707 output by the natural language comprehension system 720 may more likely correspond to the request information 703 from the user.

The properties database 730 and the structured database 220 are independently described above, while these two databases may be integrated, and any people skilled in the art may determine his/her database structure according to practical applications and/or actual demands.

Summarily, the natural language dialogue method and the natural language dialogue system are provided herein, and the natural language dialogue system is able to output speech responses corresponding to speech inputs from the user. The natural language dialogue system described herein may also select a proper report answer according to a priority determined by the public's usage habits, the user's preferences, the user's personnel usage habits, or the dialogue contexts, and thereby the natural language dialogue system may output adaptive speech responses to the user, so as to facilitate the use of the natural language dialogue system.

In the following embodiment, the components and structure of the natural language comprehension system 100 and the structured database 220 are employed to determine whether operations/applications are directly activated according to file data type associated user's request information or wait for user's further instructions, according to the number of the report answers obtained by parsing the request information included in the user's speech input. In case there is only one report answer is left, operations/applications associated with file data type indicated by this report answer may be directly activated. Under such a user-friendly interface, the system does not filter the report answers but directly provides the candidate list including all report answers for user's selections. Any user may self-determine the to-be-executed application or the desired service by selecting corresponding report answer.

Figure 9:
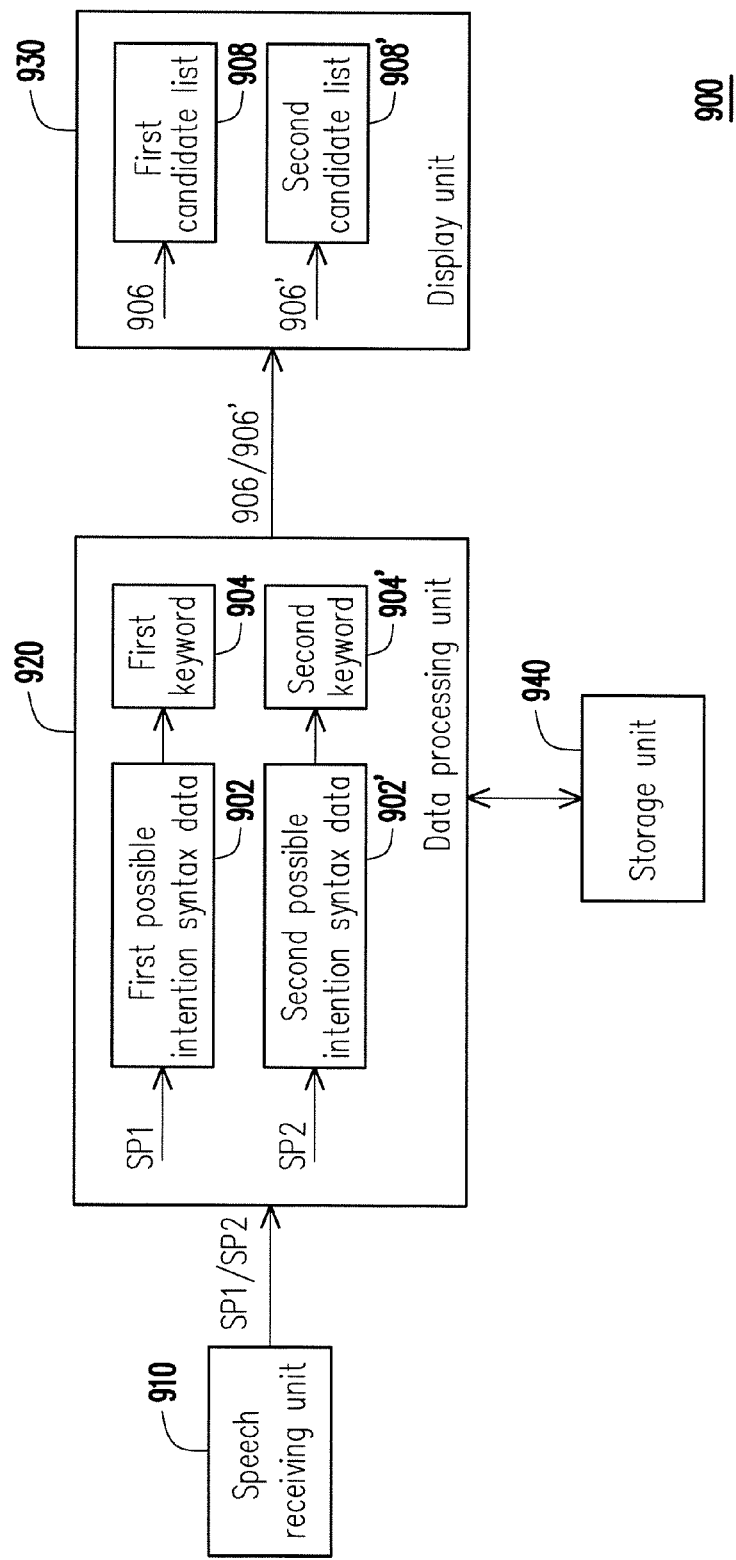
FIG. 9 is a schematic diagram illustrating a mobile terminal apparatus according to an embodiment of the invention.

FIG. 9 is a schematic diagram illustrating a system of a mobile terminal apparatus according to an embodiment of the invention. With reference to FIG. 9, in the present embodiment, the mobile terminal apparatus 900 includes a speech receiving unit 910, a data processing unit 920, a display unit 930, and a storage unit 940. The data processing unit 920 is coupled to the speech receiving unit 910, the display unit 930, and the storage unit 940. The speech receiving unit 910 is configured to receive and then transmit a first speech input SP1 and a second speech input SP2 to the data processing unit 920. The first/second speech input SP1/SP2 described herein may refer to the speech inputs 501/501' and 701/701'. The display unit 930 is subject to the controls of the data processing unit 920 and thereby displays a first/second candidate list 908/908'. The storage unit 940 is configured to store data including those data stored in the structured database 220 and/or stored in the properties database 730, which will not be further described hereinafter. Besides, the storage unit 940 may be any type of storage unit in a server or a computer system, such as a dynamic random access memory (DRAM), a static random access memory (SRAM), a flash memory, a read-only memory (ROM), and so on. This should not be construed as a limitation to the invention, and people skilled in the art should be able to make proper modifications based on actual requirements.

In the present embodiment, the functions of the data processing unit 920 are similar to those of the natural language comprehension system 100 depicted in FIG. 1. That is, the data processing unit 920 recognizes the first speech input SP1 to generate the first request information 902, which is parsed and a natural language processing process is performed on the first request information 902 so as to generate a first keyword 904 corresponding to the first speech input SP1. According to the first keyword 904 derived from the first speech input SP1, a first report answer 906 (e.g., equivalent to the first report answer 511/711) is selected from the data stored in the storage unit 940 (e.g., through conducting a full-text search to the structured database 220 by the search engine 240 according to the keyword 108). When the number of the selected first report answer 906 is 1, the data processing unit 920 may directly activate an application in accompanied with file data indicted by the first report answer 906. When the number of the selected first report answers 906 is more than 1, the data processing unit 920 organizes those first report answers 906 into a first candidate list 908 and controls the display unit 940 to display the first candidate list 908 for user's further selection. At this time, the data processing unit 920 receives and recognizes the second speech input SP2 to generate second request information 902', performs a natural language processing process on the second request information 902' to generate a second keyword 904' corresponding to the second speech input SP2, and then selects a part of report answers from the first candidate list 908 according to the second keyword 904'. The first keyword 904 and the second keyword 904' may be respectively constituted by a lot of keywords. The way of parsing the second speech input SP2 to generate the second request information 902' and the second keyword 904' may refer to the way of parsing the second speech input as shown in FIGS. 5A and 7A and therefore will not be further elaborated.

Similarly, if the number of the second report answer 906' is 1, the data processing unit 920 may directly perform a corresponding operation, such as activating an application running file data associated with the second report answer 906'. When the number of the second report answers 906' is larger than 1, the data processing unit 920 organizes the second report answers 906' as a second candidate list 908' and controls the display unit 940 to display the second candidate list 908'. Consecutively, corresponding report answer(s) is(are) selected according to the user's next speech input, and associated operation(s) is(are) performed according to the number of the subsequently selected report answer(s) (i.e., generating more candidate list displaying to the user for further selection, or activating associated operation associated with the only one report answer). This may be deduced from the above descriptions and thus will not be further explained hereinafter.

To be specific, the data processing unit 920 compares a lot of records 302 (e.g., the value data in each sub-field 308 of the title field 304) in the structured database 220 with the first keyword 904 corresponding to the first speech input SP1, as described in previous paragraphs and depicted in FIGS. 1, 3A, 3B, and 3C. When one of the records 302 in the structured database 220 at least partially matches the first keyword 904, the record 302 is deemed as a matched result (e.g., the matched result as depicted in paragraphs relating to FIGS. 3A and 3B) generated according to the first speech input SP1. In one embodiment, if the file data type associated the matched record relates to music, the record 302 may include a song title, a singer's name, an album title, release time, a playlist, and so forth; if the file data type associated the matched record relates to films, the record 302 may include a film title, release time, staff (including the cast), and so forth; if the file data type associated the matched record relates to webpages, the record 302 may include the name of a web site, a webpage type, a corresponding user's account, and so on; if the file data type associated with the matched record relates to pictures, the record 302 may include the name of a picture, information of the picture, and so on; if the file data type relates to business cards, the record 302 may include the name of a contact person, the phone number thereof, the address thereof, and so forth. The records 302 described above are exemplary and may be defined according to practical applications and/or requirements, and therefore the records should not be construed as limitations to the invention.

The data processing unit 920 then determines whether the second keyword 904' corresponding to the second speech input SP2 includes a term indicating an order (e.g., "I want the third option" or "I select the third one"). If the second keyword 904' corresponding to the second speech input SP2 includes an ordinal term (i.e., a term indicating an order), the data processing unit 920 selects data at related position from the first candidate list 908 according to the order term. If the second keyword 904' corresponding to the second speech input SP2 does not include the ordinal term, the user may directly select a specific first report answer 906 from the first candidate list 908. The data processing unit 920 may compare the second keyword 904' with each record 302 corresponding to each one of the first report answers 306 in the first candidate list 908, and the data processing unit 920 may then determine which of the first report answers 906 in the first candidate list 908 corresponds to the second speech input SP2 based on comparison results. In an embodiment of the invention, the data processing unit 920 may determine whether any of the first report answers 906 in the first candidate list 908 corresponds to the second speech input SP2 according to the comparison result (e.g. completely match or partially match), thereby simplifying the selection processes. One of the first report answers 906 is selected as the first report answer 906 associated with the second speech input SP2 by the data processing unit 920 if it is the most matching one with the second speech input SP2 currently.

For instance, if the first speech input SP1 is "what is the weather today", the first keywords 904 corresponding to the first speech input SP1 is identified to include "today" and "weather" after the first speech input SP1 is recognized and manipulated under the rules of natural language processing. Accordingly, the data processing unit 920 reads data corresponding to today's weather and then controls the display unit 930 to display the weather data in the first candidate list 908. If the second speech input SP2 is "I want to read the third data" or "I select the third data", and the second keyword 904' corresponding to the second speech input SP2 is identified to include "the third" (which may be interpreted as a term indicating an order) after the first speech input SP1 is recognized and manipulated under the rules of natural language processing. Accordingly, the data processing unit 920 reads the third data in the first candidate list 908 (i.e., the third first report answer 906 in the first candidate list 908) and controls the display unit 930 to display the corresponding weather data. Alternatively, if the second speech input SP2 is "I want to see the weather in Beijing" or "I select the weather in Beijing" and after the second speech input SP2 is recognized and manipulated under the rules of natural language processing, the second keywords 904' corresponding to the second speech input SP2 may include "Beijing" and "weather". Accordingly, the data processing unit 920 reads data corresponding to Beijing in the first candidate list 908. When only one selected first report answer 906 is left, the corresponding weather information may be directly displayed on the display unit 930. Additionally, when there are more than one selected first report answers 906, a second candidate list 908 (including at least one second report answer 906') is displayed for user's further selection.

In another example, if the first speech input SP1 is "I want to make a phone call to Mr. Chang" and after the first speech input SP1 is recognized and manipulated under the rules of natural language processing, the first keywords 904 corresponding to the first speech input SP1 may include "phone" and "Chang". Accordingly, the data processing unit 920 reads data of the contact people with the last name "Chang" (e.g., through a full-text search conducting to the structured database 220 to obtain the detailed data corresponding to the record 302) and controls the display unit 930 to display the data of the contact people (i.e., the first report answer 906) in the first candidate list 908. Afterwards, if the second speech input SP2 is "the third Mr. Chang" or "I select the third", and after the second speech input SP2 is recognized and manipulated under the rules of natural language processing, the second keyword 904' corresponding to the second speech input SP2 may include "the third", which may be interpreted as an ordinal term. Accordingly, the data processing unit 920 reads the third data in the first candidate list 908 (i.e., the third first report answer 908) and dials the phone number according to the selected data. Alternatively, if the second speech input SP2 is "I select the number starting from 139" and after the second speech input SP2 is recognized and manipulated under the rules of natural language processing, the second keywords 904' corresponding to the second speech input SP2 may include "139" and "starting". Please note "139" is not interpreted as an ordinal term, and accordingly the data processing unit 920 reads the data of the contact person with the phone number starting from 139. If the second speech input SP2 is "I want the Mr. Chang in Beijing" and after the second speech input SP2 is recognized and manipulated under the rules of natural language processing, the second keywords 904' corresponding to the second speech input SP2 may include "Beijing" and "Chang", and accordingly the data processing unit 920 reads those contact persons' data with addresses in Beijing. When there is only one first report answer 906 is left, the data processing unit 920 directly dials the number according to the first report answer 906 (i.e., an application of dialing phone number associated with this first report answer 906 is performed). Additionally, when more than one selected first report answers 906 are found, those selected first report answers 906 are considered as the second report answers 906' which are further organized into a second candidate list 908'. The second candidate list 908' is displayed to the user for further selection.

If the first speech input SP1 is "I want to look for a restaurant" and after the first speech input SP1 is recognized and manipulated under the rules of natural language processing, the first keyword 904 corresponding to the first speech input SP1 may include "restaurant". Accordingly, the data processing unit 920 reads all of the first report answers 906 corresponding to "restaurant". Since such an instruction is not clear enough, the first candidate list 908 including all of the first report answers 906 corresponding to "restaurant" is still displayed on the display unit 930 waiting for user's further instruction. After that, if the second speech input SP2 from the user is "the third restaurant" or "I select the third" and after the second speech input SP2 is recognized and manipulated under the rules of natural language processing, the second keyword 904' may include "the third" which may be interpreted as an ordinal term. Accordingly, the data processing unit 920 reads the third data in the first candidate list 908 and displays associate data on the display unit 930. Alternatively, if the second speech input SP2 is "I select the nearest" and after the second speech input SP2 is recognized and manipulated under the rules of natural language processing, the second keyword 904' may include "nearest," and accordingly the data processing unit 920 reads the address and relevant data of the restaurant closest to the user. If the second speech input SP2 is "I want a restaurant in Beijing" and after the second speech input SP2 is recognized and manipulated under the rules of natural language processing, the second keywords 904' may include "Beijing" and "restaurant", and accordingly the data processing unit 920 reads the data of the restaurant with the address in Beijing. When only one selected first report answer 906 is left, the data processing unit 920 directly displays the selected data (e.g., related information of this only one restaurant) through the display unit 930. And, when there are more than one selected first report answers 906, those selected first report answers 906 are then considered as the second report answers 906' which are further organized as a second candidate list 908', which is displayed to the user for further selection.

In view of the foregoing, the data processing unit 920 may perform an application according to the selected first report answer 906 (or the selected second report answer 906'). For instance, if the application data type associated with the selected first report answer 906 relates to music, the data processing unit 920 plays associated music file according to the selected data; if the application data type relates to films, the data processing unit 920 plays associated film file according to the selected data; if the application data type relates to webpages, the data processing unit 920 displays associated webpage on the display unit 930 according to the selected data; if the application data type relates to pictures, the data processing unit 920 displays associated picture on the display unit 930 according to the selected data; and if the application data type relates to business cards, the data processing unit 920 dials corresponding phone number according to the selected data.

Figure 10:
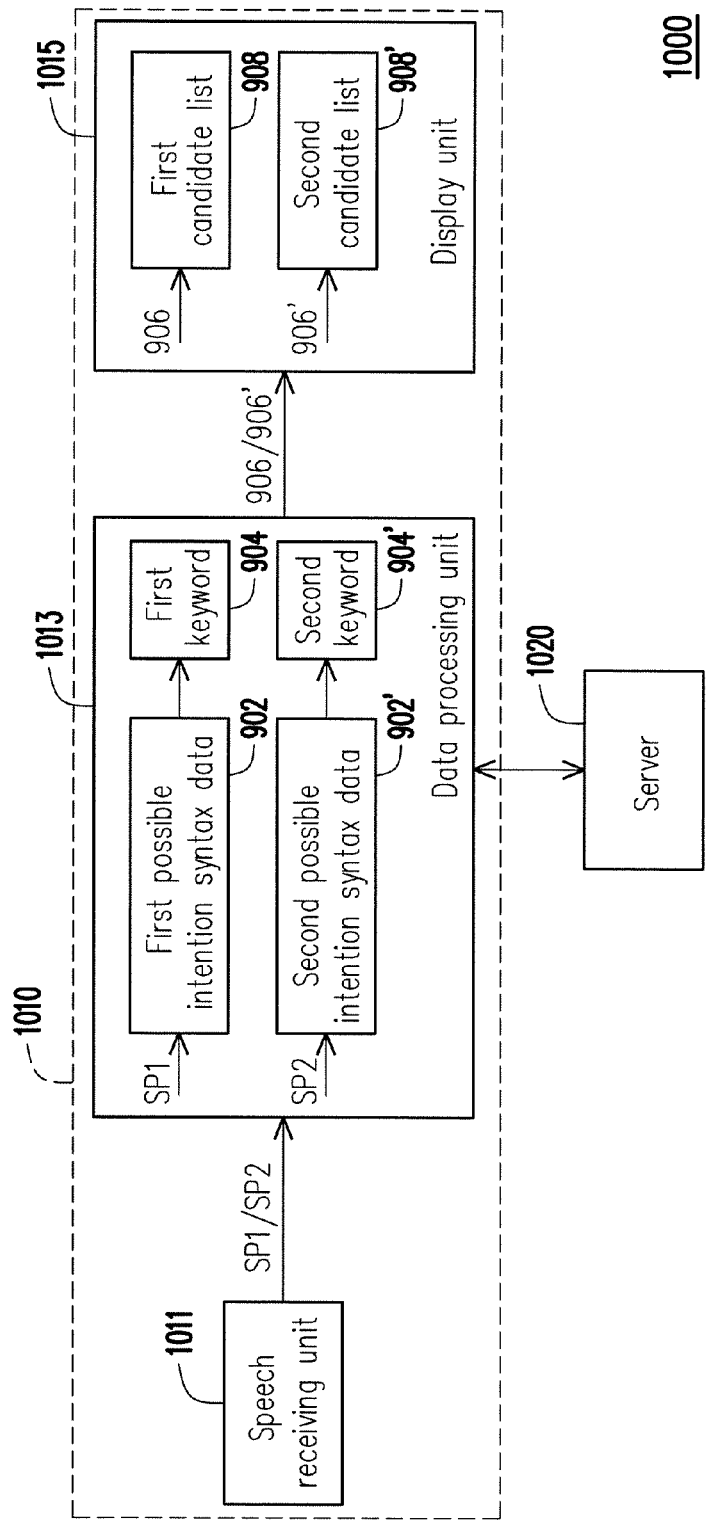
FIG. 10 is a schematic diagram illustrating an information system according to an embodiment of the invention.

FIG. 10 is a schematic diagram illustrating an information system according to an embodiment of the invention. With references to FIGS. 9 and 10 of the present embodiment, the information system 1000 includes a mobile terminal apparatus 1010 and a server 1020, wherein the server 1020 may be a cloud server, a LAN server, or any other similar device, which should however not be construed as a limitation to the invention. The mobile terminal apparatus 1010 includes a speech receiving unit 1011, a data processing unit 1013, and a display unit 1015. The data processing unit 1013 is coupled to the speech receiving unit 1011, the display unit 1015, and the server 1020. The mobile terminal apparatus 1010 may be a cell phone, a PDA phone, a smart phone, or any other mobile communication apparatus, which should neither be construed as a limitation to the invention. The functions of the speech receiving unit 1011 are similar to those of the speech receiving unit 910, and the functions of the display unit 1015 are similar to those of the display unit 930. The server 1020 is configured to store a plurality of data, and the server has a speech recognition function.

In the present embodiment, the data processing unit 1013 recognizes the first speech input SP1 through the server 1020 to generate the first request information 902. A natural language processing process is performed on the first request information 902 to generate a first keyword 904 corresponding to the first speech input SP1. According to the first keyword 904, the server 1020 conducts a full-text search in the structured database 220 to find a first report answer 906 and then delivers the first report answer 906 to the data processing unit 1013. When the number of the first report answer 906 is 1, the data processing unit 1013 may directly perform an application with associated file data indicated by the first report answer 906. When the number of the first report answers 906 is larger than 1, the data processing unit 1013 organizes the first report answers 906 as the first candidate list 908 and inform the display unit 1015 to display the first candidate list 908 to the user for his/her further instruction. If the user further inputs an instruction, the data processing unit 1013 recognizes the second speech input SP2 through the server 1020 to generate second request information 902'. The second request information 902' is parsed, and then a natural language processing process is performed on the second request information 902' to generate a second keyword 904' corresponding to the second speech input SP2. According to the second keyword 904' derived from the second speech input SP2, the server 1020 selects one or more first report answer 906 from the first candidate list 908 as the second report answer 906' and transmits the second report answer 906' to the data processing unit 1013. Similarly, when there is only one second report answer 906' left, the data processing unit 1013 may directly perform an operation with file data associated with the second report answer 906'. Additionally, when the number of the second report answers 906' is larger than 1, the data processing unit 1013 arranges the second report answers 906' into a second candidate list 908' and controls the display unit 1015 to display the second candidate list 908' to the user for his/her further selection. The server 1020 then selects report answers according to the user's next speech input, and the data processing unit 1013 performs corresponding operation according to the number of the subsequently selected data. These functions have been described above and thus will not be further explained hereinafter.

In an embodiment, if there is only first report answer 906 according to the first keyword 904 is selected, an operation (in accompanied with associated file data) corresponding to the selected data may be directly performed. Besides, in another embodiment, a hint may be output to inform the user that the operation corresponding to the selected first report answer 906 is performed. In yet another embodiment, if there is only one second report answer 906 according to the second keyword 904' is selected, an operation (also in accompanied with associated file data) corresponding to the selected data may be directly performed. In yet another embodiment, a hint may also be output to inform the user that the operation corresponding to the selected first report answer 906 is performed. This should not be construed as a limitation to the invention.

To be specific, the server 1020 compares each record 302 in the structured database 220 with the first keyword 904 corresponding to the first speech input SP1. When one of the records 302 in the structured database 220 at least partially matches the first keyword 904, the record 302 is considered as the matched result corresponding to the first speech input SP1, and the record 302 then serves as one of the first report answers 906. If the number of the first report answer 906 selected according to the first keyword 904 is more than one, the user may further input his/her instruction by way of the second speech input SP2. The user's instruction input by way of the second speech input SP2 may include an order (that indicates the order of displaying the data). The user may also directly select one of the displayed data (e.g., the user may directly indicate the content of certain information). Alternatively, the user's intention may be determined according to the user's instruction (e.g., if the user selects the nearest restaurant, the "nearest" restaurant is displayed to the user). Afterwards, the server 1020 determines whether the second keyword 904' corresponding to the second speech input SP2 includes an ordinal term indicating an order. If the second keyword 904' corresponding to the second speech input SP2 includes the ordinal term, the server 1020 selects the first report answer 906 at a position from the first candidate list 908 according to the ordinal term. By contrast, if the second keyword 904' corresponding to the second speech input SP2 does not include any ordinal term, the server 1020 compares the second keyword 904' corresponding to the second speech input SP2 with each first report answer 906 in the first candidate list 908 to decide a match degree between each of the first report answers 906 and the second speech input SP2, and then the server 1020 determines which of the first report answers 906 in the first candidate list 908 corresponds to the second speech input SP2 according to those match degrees. In an embodiment of the invention, the server 1020 may determine whether any of the first report answers 906 in the first candidate list 908 corresponds to the second speech input SP2 according to the match degree between each of the first report answers 906 and the second keyword 904', thereby simplifying the selection process. The server may select the first report answers 906 having the largest match degree with the second speech input SP2 as the corresponding one.

Figure 11:
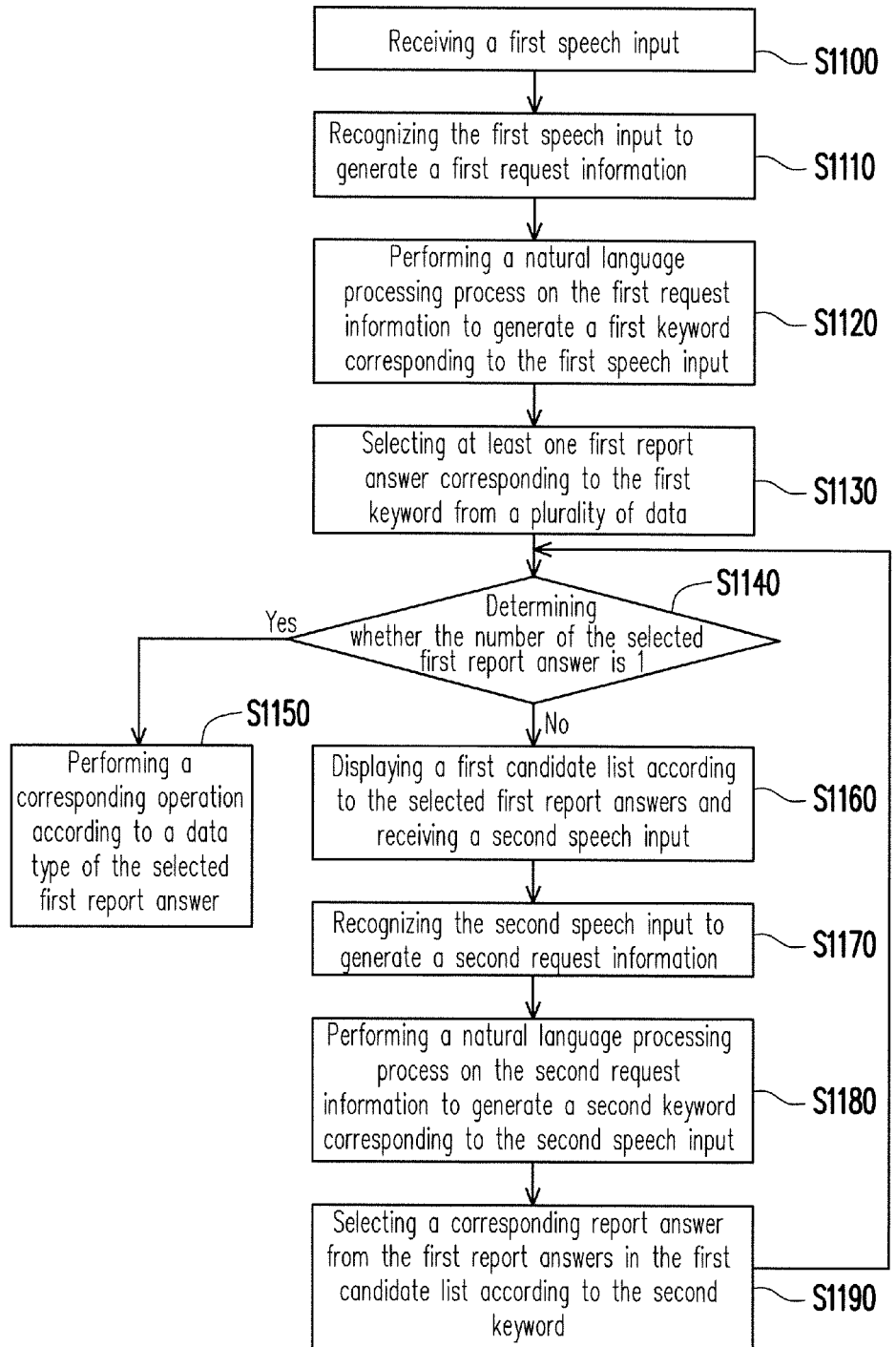
FIG. 11 is a flowchart illustrating a selection method based on speech recognition according to an embodiment of the invention.

FIG. 11 is a flowchart illustrating a selection method based on speech recognition according to an embodiment of the invention. With reference to FIG. 11, a first speech input SP1 is received in step S1100, and the first speech input SP1 is recognized to generate the first request information 902 in step S1110. In step S1120, the first request information 902 is parsed and a natural language processing process is performed thereon so as to generate a first keyword 904 corresponding to the first speech input SP1. At least one first report answer 906 corresponding to the first keyword 904 is selected from a plurality of data (step S1130), and the server 1020 determines whether there is only one first report answer 906 left (step S1140). If there is only one selected first report answer 906, i.e., the determination result in step S1140 is "yes," an operation/application is performed on the file data indicated by the first report answer 906 (step S1150). If the number of the selected first report answers 906 is larger than one, i.e., the determination result in step S1140 is "no," a first candidate list 908 is displayed according to the selected first report answers 906, and then a second speech input SP2 is received (step S1160). The second speech input SP2 is recognized to generate second request information 902' (step S1170), and the second request information 902' is parsed and a natural language processing process is performed thereon to generate a second keyword 904' corresponding to the second speech input SP2 (step S1180). In step S1190, corresponding report answer(s) is(are) selected from the first report answers 906 in the first candidate list 908 according to the second request information 902'. After that, the process goes back to step S1140 to determine whether there is only one first report answer 906 is selected again. The order of performing the steps in the selection method is merely exemplary and should not be construed as a limitation to the invention. The details of these steps may be referred to as those described in the embodiments shown in FIGS. 9 and 10 and thus will not be further explained hereinafter.

As is discussed above, in the selection method based on speech recognition, the mobile terminal apparatus, and the information system, the first speech input and the second speech input are recognized and then a natural language processing process is performed thereon, so as to obtain the keywords corresponding to the first and second speech inputs. A selection of the report answers is then made according to the keywords derived from the first and second speech inputs, so as to facilitate users' conveniences in operations.

An embodiment which applies the structure and the components of the natural language comprehension system 100 and the structured database 220 with an activation assisting apparatus will be given below.

Figure 12:
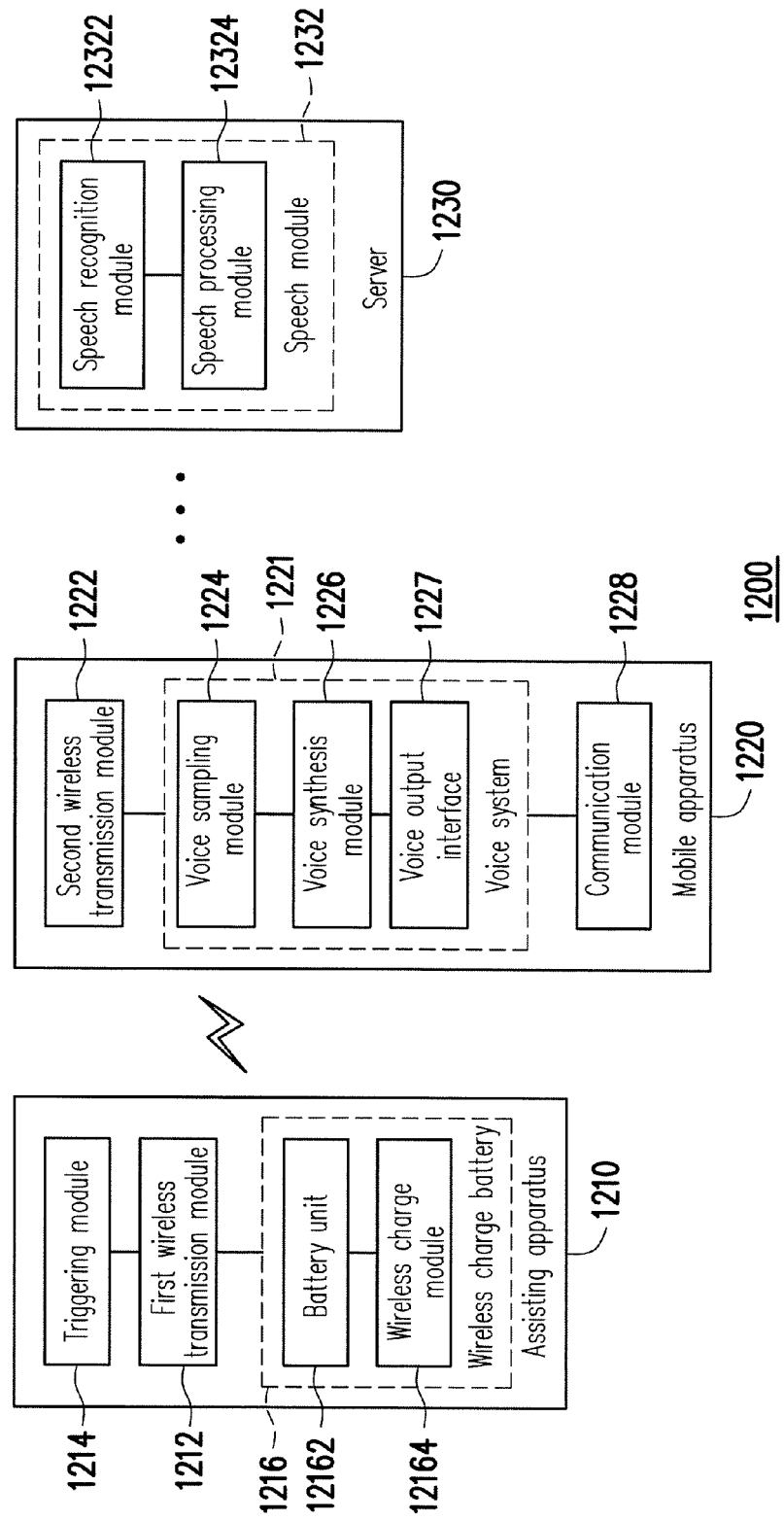
FIG. 12 is a block diagram illustrating a speech control system according to an embodiment of the invention.

FIG. 12 is a block diagram illustrating a speech control system according to an embodiment of the invention. With reference to FIG. 12, the speech control system 1200 includes an activation assisting apparatus 1210, a mobile terminal apparatus 1220, and a server 1230. In the present embodiment, the activation assisting apparatus 1210 activates a speech system of the mobile terminal apparatus 1220 through a wireless transmission signal, such that the mobile terminal apparatus 120 may communicate with the server 1230 according to a speech signal.

Specifically, the activation assisting apparatus 1210 includes a first wireless transmission module 1212 and a triggering module 1214 coupled to the first wireless transmission module 1212. The first wireless transmission module 1212 may be a device supporting a wireless communication protocol, such as wireless fidelity (Wi-Fi), worldwide interoperability for microwave access (WiMAX), Bluetooth, ultra-wideband (UWB), or radio-frequency identification (RFID), and the first wireless transmission module 1212 is capable of transmitting a wireless transmission signal, so as to correspond to and establish a wireless connection with another wireless transmission module. The triggering module 1214 is, for instance, a button or a key. In the present embodiment, when the triggering module 1214 is pressed by a user and generates a triggering signal, the first wireless transmission module 1212 receives the triggering signal and is thereby activated. At this time, the first wireless transmission module 1212 generates the wireless transmission signal and transmits the wireless transmission signal to the mobile terminal apparatus 1220. According to an embodiment of the invention, the activation assisting apparatus 1210 may be a Bluetooth headset.

Although some existing hands-free headsets/microphones have features designed for activating the mobile terminal apparatus 1220, the activation assisting apparatus 1210 described in another embodiment of the invention may be different from the above-mentioned hands-free headsets/microphones. Specifically, unlike the headsets/microphones on the mobile terminal apparatus 1220, the existing hands-free headsets/microphones are connected to the mobile terminal apparatus for performing the reception and communication functions, and the activation function is merely auxiliary; however, the activation assisting apparatus 1210 described herein is "only" configured to activate the speech system of the mobile terminal apparatus 1220 and does not have the reception and communication functions. Hence, the interior circuit design of the activation assisting apparatus 1210 may be simplified, and the costs of the activation assisting apparatus 1210 may also be reduced. In other words, compared to the above hands-free headsets/microphones, the activation assisting apparatus 1210 is an independent apparatus, i.e., the user may simultaneously have the hands-free headsets/microphones and the activation assisting apparatus 1210 described herein.

In addition, the activation assisting apparatus 1210 may be made in form of portable objects that are readily available for the user, e.g., a ring, a watch, a pair of earrings, a necklace, a pair of glasses, or other accessories; alternatively, the activation assisting apparatus 1210 may be made in form of installation components, e.g., vehicle accessories configured on the steering wheel. The invention is not limited thereto. That is, the activation assisting apparatus 1210 is an apparatus that "goes into our lives," and the interior system design of the activation assisting apparatus 1210 allows the user to easily touch the triggering module 1214, so as to activate the speech system. For instance, when the activation assisting apparatus 1210 is in form of a ring, the user may easily trigger the triggering module 1214 by moving his/her finger to press the ring. On the other hand, when the activation assisting apparatus 1210 is an accessory to a car, the user may also easily trigger the triggering module 1214 while he or she is driving. In addition, wearing the headsets/microphones may cause discomfort. However, the activation assisting apparatus 1210 described herein is capable of activating the speech system in the mobile terminal apparatus 1220 and even further performing a sound amplifying function (described hereinafter), such that the user can pick up the phone or talk on the phone through the mobile terminal apparatus 1220 in no need of wearing the headsets/microphones. As far as the user is concerned, the activation assisting apparatus 1210 that "goes into our lives" are accessories to be worn or used, and thus the user does not need to get used to wearing or using the activation assisting apparatus 1210. For instance, when the user cooks in the kitchen and needs to make a phone call through a mobile phone placed in the living room, if the user wears the activation assisting apparatus 1210 in form of a ring, a necklace, or a watch, the user may touch the ring, the necklace, or the watch to activate the speech system to ask a friend for the details in a menu. Although some existing headsets/microphones having the activation functions may also complete said task, it is not necessary for the user to call a friend every time during cooking, and therefore it is rather inconvenient for the user to constantly wear the headsets/microphones during cooking for fear of not being able to control the mobile terminal apparatus if necessary.

In another embodiment, the activation assisting apparatus 1210 may also be equipped with a wireless charge battery 1216 for driving the first wireless transmission module 1212. More specifically, the wireless charge battery 1216 includes a battery unit 12162 and a wireless charge module 12164 that is coupled to the battery unit 12162. Here, the wireless charge module 12164 is capable of receiving energy from a wireless power supply apparatus (not shown) and converting the energy into electricity to charge the battery unit 12162. As a result, the first wireless transmission module 1212 of the activation assisting apparatus 1210 may be charged conveniently by the wireless charge battery 1216.

On the other hand, the mobile terminal apparatus 1220 is, for instance, a cell phone, a PDA phone, a smart phone, a pocket PC with communication software, a tablet PC with communication software, or a notebook computer with communication software. In brief, the mobile terminal apparatus 1220 may be any portable mobile apparatus capable of performing communication functions, and the type of the mobile terminal apparatus 1220 is not limited in the invention. Besides, said electronic apparatuses may be operated by an Android operating system, a Microsoft operating system, a Linux operating system, and so forth, which should not be construed as a limitation to the invention.

The mobile terminal apparatus 1220 includes a second wireless transmission module 1222. The second wireless transmission module 1222 matches the first wireless transmission module 1212 in the activation assisting apparatus 1210 and is subject to the corresponding wireless communication protocol, such as Wi-Fi, WiMAX, Bluetooth, UWB, or RFID, so as to establish a wireless connection with the first wireless transmission module 1212. It should be mentioned that the "first" wireless transmission module 1212 and the "second" wireless transmission module 1222 indicate that these wireless transmission modules are configured in different apparatuses, respectively, and the terms "first" and "second" should not be construed as limitations to the invention.

In another embodiment, the mobile terminal apparatus 1220 further includes a speech system 1221. The speech system 1221 is coupled to the second wireless transmission module 1222; therefore, after the user triggers the triggering module 1214 in the activation assisting apparatus 1210, the speech system 1221 may be activated in a wireless manner through the first wireless transmission module 1212 and the second wireless transmission module 1222. In an embodiment of the invention, the speech system 1221 may include a speech sampling module 1224, a speech synthesis module 1226, and a speech output interface 1227. The speech sampling module 1224 is configured to receive speech signals from the user. Here, the speech sampling module 1224 is a microphone or another device that receives audio signals, for instance. The speech synthesis module 1226 may conduct a search in a speech synthesis database that records texts and corresponding speech information, for instance, such that the speech synthesis module 1226 is allowed to find out the speech corresponding to certain text information and thereby create a synthesized speech based on the text information. The synthesized speech may then be output by the speech synthesis module 1226 through the speech output interface 1227 and broadcast to the user. The speech output interface 1227 is, for instance, a speaker or a headset.

The mobile terminal apparatus 1220 may further include a communication module 1228. The communication module 1228 is, for instance, a device (e.g., a radio-frequency transceiver) that can transmit and receive wireless signals. To be specific, the communication module 1228 allows the user to receive or make a phone call or enjoy other services provided by telecommunication service providers via the mobile terminal apparatus 1220. According to the present embodiment, the communication module 1228 may receive response information from the server 1230 through the Internet and establish a communication connection between the mobile terminal apparatus 1220 and at least one electronic apparatus according to the response information. Here, the electronic apparatus is, for instance, another mobile terminal apparatus (not shown).

Figure 13:
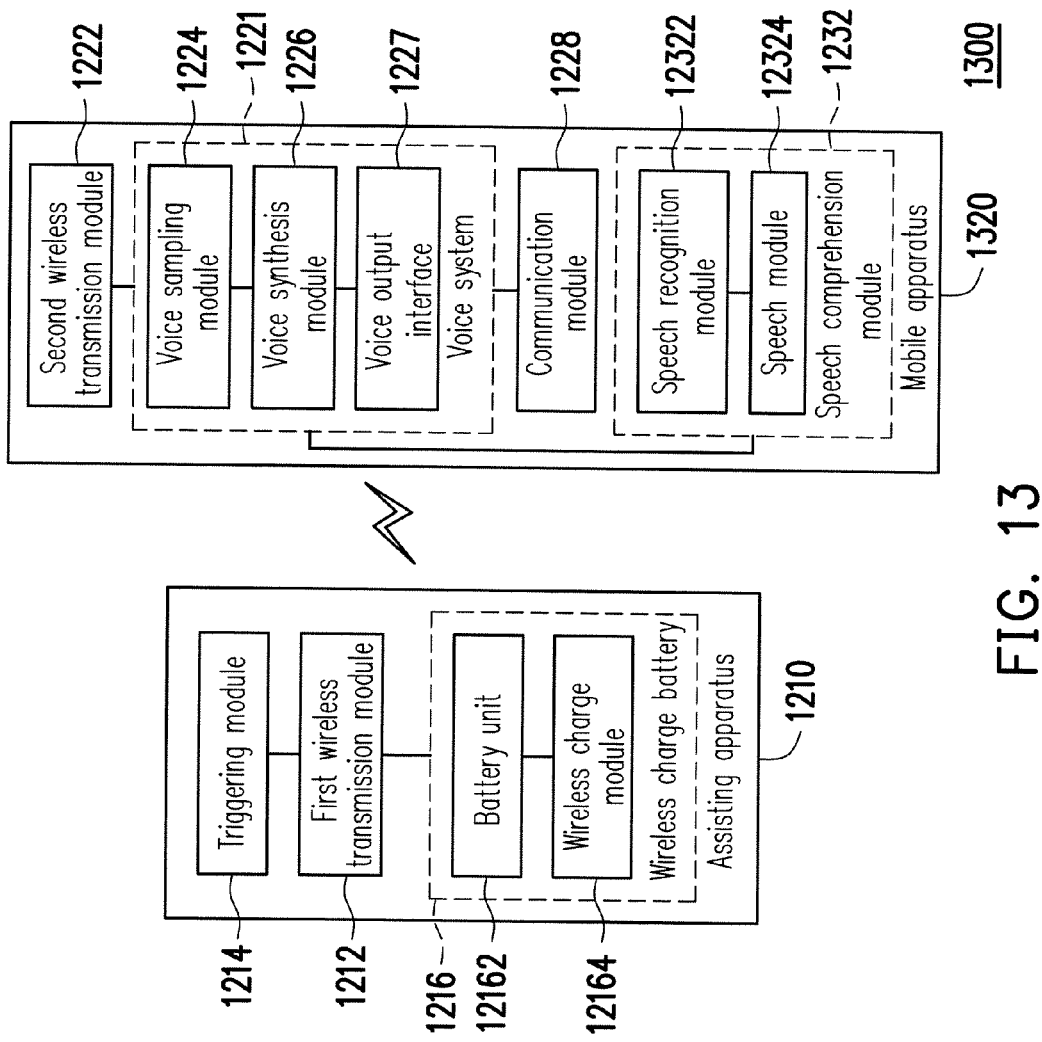
FIG. 13 is a block diagram illustrating a speech control system according to another embodiment of the invention.

The server 1230 is, for instance, a network server or a cloud server, and the server 1230 has a speech comprehension module 1232. In the present embodiment, the speech comprehension module 1232 includes a speech recognition module 12322 and a speech processing module 12324 coupled to the speech recognition module 12322. The speech recognition module 12322 receives the speech signal transmitted from the speech sampling module 1224 and converts the speech signal into a plurality of semantic segments (e.g., keywords or phrases). The speech processing module 12324 may parse the semantic segments to learn their meanings (e.g., intentions, time, places, and so forth) and further determine the meaning of the speech signal. In addition, the speech processing module 12324 may generate the corresponding response information according to the result of parsing the semantic segments. According to the present embodiment, the speech comprehension module 1232 may be implemented by hardware circuits constituted by one or several logic gates or computer programming codes. In another embodiment, note that the speech comprehension module 1232 may be configured in the mobile terminal apparatus 1320, such as the speech control system 1300 shown in FIG. 13. The operations of the speech comprehension module 1232 in the server 1230 may be referred to as those of the natural language comprehension system 100 shown in FIG. 1A and those of the natural language dialogue system 500/700/700' shown in FIG. 5A/7A/7B.

Figure 14:
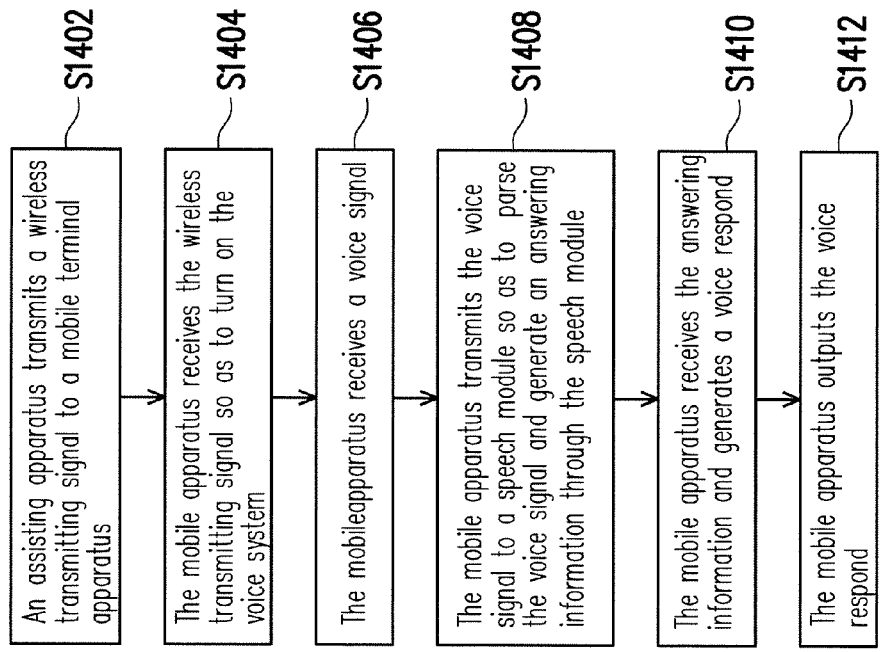
FIG. 14 is a block diagram illustrating a speech control method according to an embodiment of the invention.

A speech control method is described hereinafter with reference to the above-mentioned speech control system 1200. FIG. 14 is a block diagram illustrating a speech control method according to an embodiment of the invention. With reference to FIG. 12 and FIG. 14, in step S1402, the activation assisting apparatus 1210 transmits a wireless transmission signal to the mobile terminal apparatus 1220. Specifically, when the first wireless transmission module 1212 of the activation assisting apparatus 1210 receives a triggering signal and is accordingly triggered, the activation assisting apparatus 1210 transmits the wireless transmission signal to the mobile terminal apparatus 1220. To be more specific, when the triggering module 1214 of the activation assisting apparatus 1210 is pressed by the user, the triggering module 1214 is triggered because of its triggering signal, such that the first wireless transmission module 1212 transmits the wireless transmission signal to the second wireless transmission module 1222 in the mobile terminal apparatus 1220, and that the first wireless transmission module 1212 can be connected to the second wireless transmission module 1222 through the wireless communication protocol. The activation assisting apparatus 1210 merely serves to activate the speech system in the mobile terminal apparatus 1220 and does not have the reception and communication function; therefore, the interior circuit design of the activation assisting apparatus 1210 may be simplified, and the costs of the activation assisting apparatus 1210 may also be reduced. In other words, compared to the hands-free headsets/microphones attached to the normal mobile terminal apparatus, the activation assisting apparatus 1210 is an independent apparatus, i.e., the user may simultaneously have the hands-free headsets/microphones and the activation assisting apparatus 1210 described herein.

Note that the activation assisting apparatus 1210 may be made in form of portable objects that are readily available for the user, e.g., a ring, a watch, a pair of earrings, a necklace, a pair of glasses, or other accessories; alternatively, the activation assisting apparatus 1210 may be made in form of installation components, e.g., vehicle accessories configured on the steering wheel. The invention is not limited thereto. That is, the activation assisting apparatus 1210 is an apparatus that "goes into our lives," and the interior system design of the activation assisting apparatus 1210 allows the user to easily touch the triggering module 1214, so as to activate the speech system 1221. Accordingly, the activation assisting apparatus 1210 described herein is capable of activating the speech system 1221 in the mobile terminal apparatus 1220 and even further performing a sound amplifying function (described hereinafter), such that the user can pick up the phone or talk on the phone through the mobile terminal apparatus 1220 in no need of wearing the headsets/microphones. As far as the user is concerned, the activation assisting apparatus 1210 that "goes into our lives" are accessories to be worn or used, and thus the user does not need to get used to wearing or using the activation assisting apparatus 1210.

Both the first wireless transmission module 1212 and the second wireless transmission module 1222 may run in a sleep mode or a working mode. In the sleep mode, the wireless transmission modules are in a turned-off state, i.e., the wireless transmission modules neither receive nor detect the wireless transmission signal and thus are not able to be connected to other wireless transmission modules. In the working mode, the wireless transmission modules are in a turned-on state, i.e., the wireless transmission modules continuously detect the wireless transmission signal or transmit the wireless transmission signal at any time, and thus the wireless transmission modules are able to connect to other wireless transmission modules. If the triggering module 1214 is triggered when the first wireless transmission module 1212 runs in the sleep mode, the triggering module 1214 wakes up the first wireless transmission module 1212, so that the first wireless transmission module 1212 enters the working mode and transmits the wireless transmission signal to the second wireless transmission module 1222. Thereby, the first wireless transmission module 1212 is connected to the second wireless transmission module 1222 of the mobile terminal apparatus 1220 according to the wireless communication protocol.

On the other hand, in order to prevent excessive power consumption caused by the first wireless transmission module 1212 that is kept running in the working mode, during a predetermined time (e.g., 5 minutes) after the first wireless transmission module 1212 runs in the working mode, if the triggering module 1214 is not triggered again, the first wireless transmission module 1212 in the working mode enters the sleep mode, and the connection between the first wireless transmission module 1212 and the second wireless transmission module 1222 of the mobile terminal apparatus 1220 is terminated.

In step S1404, the second wireless transmission module 1222 of the mobile terminal apparatus 1220 receives the wireless transmission signal to activate the speech system 1221. In step S1406, when the second wireless transmission module 1222 detects the wireless transmission signal, the mobile terminal apparatus 1220 activates the speech system 1221, and the speech sampling module 1224 in the speech system 1221 starts to receive the speech signal, such as "what is the temperature today," "make a phone call to Mr. Wang," "please search a phone number," etc.

In step S1408, the speech sampling module 1224 transmits the speech signal to the speech comprehension module 1232 in the server 1230 to parse the speech signal and generate the response information through the speech comprehension module 1232. Particularly, the speech recognition module 12322 in the speech comprehension module 1232 receives the speech signal from the speech sampling module 1224 and divides the speech signal into several semantic segments. The speech processing module 12324 then proceeds to understand the meanings of the semantic segments, so as to generate the response information corresponding to the speech signal.

In another embodiment, the mobile terminal apparatus 1220 may further receive the response information generated by the speech processing module 12324 and output the contents of the response information through the speech output interface 1227 or execute the commands issued by the response information. In step S1410, the speech synthesis module 1226 of the mobile terminal apparatus 1220 receives the response information generated by the speech comprehension module 1232, conducts speech synthesizing according to the contents of the response information (e.g., words or phrases) to generate a corresponding speech response. In step S1412, the speech output interface 1227 receives and outputs the speech response.

For instance, when the user presses the triggering module 1214 of the activation assisting apparatus 1210, the first wireless transmission module 1212 transmits the wireless transmission signal to the second wireless transmission module 1222, such that the mobile terminal apparatus 1220 activates the speech sampling module 1224 in the speech system 1221. Here, the speech signal from the user is assumed to be an interrogative sentence, e.g., "what is the temperature today?" and the speech sampling module 1224 receives and transmits the to-be-parsed speech signal to the speech comprehension module 1232 in the server 1230. After the speech signal is parsed, the speech comprehension module 1232 transmits response information corresponding to the parsed speech signal back to the mobile terminal apparatus 1230. If the response information generated by the speech comprehension module 1232 indicates "30° C.", the speech synthesis module 1226 converts the information "30° C." into a synthesized speech response, and the speech output interface 1227 broadcasts the synthesized speech response to the user.

In another embodiment of the invention, the speech signal from the user is assumed to be an imperative sentence, e.g., "make a phone call to Mr. Wang", and the speech comprehension module 1232 may recognize this imperative sentence as "a request for making a phone call to Mr. Wang." The speech comprehension module 1232 may further generate a new response information, e.g., "please confirm whether to call Mr. Wang or not," and the speech comprehension module 1232 transmits this new response information to the mobile terminal apparatus 1220. Here, the speech synthesis module 1226 may convert the new response information into a synthesized speech response and output the synthesized speech response to the user through the speech output interface 1227. More specifically, if the response from the user is affirmative (e.g., "yes"), the speech sampling module 1224 may receive and transmit the speech signal (e.g. "yes") to the server 1230, such that the speech comprehension module 1232 may parse the speech signal. After the speech comprehension module 1232 completes the parsing process on the speech signal, the speech comprehension module 1232 may generate dial command information stored in the response information and transmit the response information to the mobile terminal apparatus 1220. At this time, the communication module 1228 may search and find the phone number of "Mr. Wang" according to the contact information stored in a phone number database, so as to establish a communication connection between the mobile terminal apparatus 1220 and another electronic apparatus. That is, the communication module 1228 makes a phone call to "Mr. Wang".

According to other embodiments of the invention, in addition to the speech control system 1200 described above, the speech control system 1300 or other similar system may be applicable when said speech control method is conducted, and the invention is not limited thereto.

To sum up, in the speech control system and the speech control method described herein, the speech function of the mobile terminal apparatus may be activated by the activation assisting apparatus in a wireless manner. In addition, the activation assisting apparatus may be made in form of portable objects that are readily available for the user, e.g., a ring, a watch, a pair of earrings, a necklace, a pair of glasses, or other accessories; alternatively, the activation assisting apparatus may be made in form of installation components, e.g., vehicle accessories configured on the steering wheel. The invention is not limited thereto. Unlike wearing the existing hands-free headsets/microphones which causes discomfort, using the activation assisting apparatus 1210 to activate the speech system in the mobile terminal apparatus 1220 is rather convenient.

Note that the server 1230 that includes the speech comprehension module may be a network server or a cloud server, and the cloud server may lead to issues regarding the user's privacy. For instance, the user has to upload the complete contact information to the cloud server for making a phone call, sending information, or performing other operations that may require the uploaded contact information. Even though the cloud server employs encrypted connections, and no cache file is saved, the user's concerns about security cannot be alleviated. Therefore, another speech control method and a corresponding speech interaction system are provided, so that the mobile terminal apparatus is capable of providing the speech interaction service with the cloud server on the condition that the complete contact information is not required to be uploaded. In order to make the invention more comprehensible, embodiments are described below as the examples to prove that the invention can actually be realized.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A natural language comprehension system comprising:
   a natural language processor configured to parse request information from a user to obtain at least one possible intention syntax data, each of the at least one possible intention syntax data comprising at least one keyword and intention data;
   a knowledge comprehension assistance module coupled to the natural language processor and configured to obtain confirmative intention syntax data from the at least one possible intention syntax data, so as to demonstrate a user's intention included in the request information; and
   a search system comprising:
   a structured database configured to store a plurality of records having a data structure; and
   a search engine configured to conduct a full-text search in the structured database, wherein the data structure comprises a title field, the title field comprises at least one sub-field, each of the at least one sub-field consists of an indication field and a value field, the indication field stores indication data consisting of at least one letter of alphabet, and the value field stores value data consisting of at least one of at least one letter of alphabet, at least one comma and at least one number,
   wherein the knowledge comprehension assistance module transmits the at least one keyword to the search system and obtains the confirmative intention syntax data from the search system.

2. The natural language comprehension system as recited in claim 1, wherein the data structure further comprises a content field, wherein the content field stores detailed content data of a corresponding one of the records.

3. The natural language comprehension system as recited in claim 1, wherein a first special character is stored to separate data stored in the sub-fields and the data of each of the sub-fields, and a second special character is stored to separate data in the indication field and data in the value field.

4. The natural language comprehension system as recited in claim 1, wherein a digit number of each of the at least one sub-field in the title field is fixed.

5. The natural language comprehension system as recited in claim 1, further comprising a search interface unit coupled to the search engine and the knowledge comprehension assistance module to receive the at least one keyword and transfer the at least one keyword to the search engine, whereby the search engine conducts the full-text search in the title field of each of the records and outputs at least one matched record in response to a matched result obtained by the search engine, wherein the knowledge comprehension assistance module compares the indication data stored in the title field in the at least one matched record with the intention data included in the at least one possible intention syntax data to determine the user' intention included in the request information.

6. The natural language comprehension system as recited in claim 1, wherein at least one matched record is a completely matched record completely matching all of the at least one keyword or a partially matched record partially matching at least one of the at least one keyword.

7. The natural language comprehension system as recited in claim 6, wherein the completely matched record and the partially matched record are sequentially output, and a priority of the completely matched record is higher than a priority of the partially matched record.

* * * * *